United States Patent
Burkle

(10) Patent No.: US 10,851,759 B2
(45) Date of Patent: *Dec. 1, 2020

(54) RENEWABLE ENERGY GENERATION BASED ON WATER WAVES

(71) Applicant: EIP TECHNOLOGIES, INC., Yachats, OR (US)

(72) Inventor: Steve Burkle, Yachats, OR (US)

(73) Assignee: EIP TECHNOLOGIES, INC., Yachats, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/684,909

(22) Filed: Nov. 15, 2019

(65) Prior Publication Data

US 2020/0240387 A1    Jul. 30, 2020

Related U.S. Application Data

(63) Continuation of application No. 16/364,074, filed on Mar. 25, 2019, now Pat. No. 10,480,481, which is a
(Continued)

(51) Int. Cl.
*F03B 13/12* (2006.01)
*H02P 9/04* (2006.01)
(Continued)

(52) U.S. Cl.
CPC ........... *F03B 13/12* (2013.01); *F03B 13/10* (2013.01); *F03B 13/142* (2013.01);
(Continued)

(58) Field of Classification Search
CPC ........ F03B 13/12; F03B 13/10; F03B 13/142; F03B 13/1845; F03B 13/24; H02K 35/02; H02P 9/04
See application file for complete search history.

(56) References Cited

U.S. PATENT DOCUMENTS

| 299,563 A | 6/1884 | Martin |
|---|---|---|
| 1,586,914 A | 6/1926 | Palm |

(Continued)

FOREIGN PATENT DOCUMENTS

| CN | 1462500 A | 12/2003 |
|---|---|---|
| CN | 1950600 A | 4/2007 |

(Continued)

OTHER PUBLICATIONS

Examiner's Report for Australian Patent Application No. 201589392, dated Jan. 20, 2017, 2 pages.
(Continued)

*Primary Examiner* — Viet P Nguyen
(74) *Attorney, Agent, or Firm* — Perkins Coie LLP

(57) ABSTRACT

Methods, systems, and devices are disclosed for wave power generation. In one aspect, a wave power generator device includes a stator assembly and a rotor assembly encased within a tube frame. The stator assembly includes an array of inductor coils in a fixed position within a cavity of the tube frame and a plurality of bearings coupled to the tube frame. The rotor assembly includes a turbine rotor having a central hub and peripheral blades coupled to a high inertia annular flywheel that is moveably engaged with the bearings of the stator assembly, and an array of magnets arranged to be evenly spaced and of alternating axial polarity from one another extending from the annular flywheel into the cavity between the array of inductor coils, such that electric currents are produced based on magnetic field interaction of the magnets with the inductor coils during the rotation of the annular flywheel.

26 Claims, 28 Drawing Sheets

Related U.S. Application Data continuation of application No. 15/514,464, filed as application No. PCT/US2015/052491 on Sep. 25, 2015, now Pat. No. 10,253,746.

(60) Provisional application No. 62/055,141, filed on Sep. 25, 2014.

(51) Int. Cl.
*H02K 35/02* (2006.01)
*F03B 13/18* (2006.01)
*F03B 13/10* (2006.01)
*F03B 13/14* (2006.01)
*F03B 13/24* (2006.01)
*F03B 15/00* (2006.01)

(52) U.S. Cl.
CPC .......... *F03B 13/1845* (2013.01); *F03B 13/24* (2013.01); *H02K 35/02* (2013.01); *H02P 9/04* (2013.01); *F03B 15/00* (2013.01); *F05B 2220/7068* (2013.01); *Y02E 10/32* (2013.01); *Y02E 10/38* (2013.01)

(56) References Cited

U.S. PATENT DOCUMENTS

| | | | |
|---|---|---|---|
| 4,520,273 A | | 5/1985 | Rowe |
| 4,533,292 A | * | 8/1985 | Sugihara ............... F03B 13/142 415/211.1 |
| 4,720,640 A | * | 1/1988 | Anderson ............. F03B 13/083 290/43 |
| 5,005,357 A | | 4/1991 | Fox |
| 5,191,225 A | * | 3/1993 | Wells ........................ E02B 9/08 290/53 |
| 5,463,257 A | | 10/1995 | Yea |
| 5,696,419 A | | 12/1997 | Rakestraw et al. |
| 5,770,893 A | * | 6/1998 | Youlton ................ F03B 13/142 290/42 |
| 5,818,115 A | | 10/1998 | Nagao |
| 6,404,089 B1 | | 6/2002 | Tomion |
| 6,943,461 B2 | | 9/2005 | Kaploun |
| 7,385,302 B2 | | 6/2008 | Jonsson |
| 7,780,411 B2 | | 8/2010 | Yan |
| 7,816,802 B2 | | 10/2010 | Green |
| 7,942,624 B1 | | 5/2011 | Erb |
| 8,829,704 B2 | | 9/2014 | Grigg |
| 9,115,685 B2 | | 8/2015 | Ross |
| 9,803,623 B2 | * | 10/2017 | Burkle ................... F03D 3/061 |
| 10,253,746 B2 | * | 4/2019 | Burkle ................... F03B 13/10 |
| 10,352,303 B2 | * | 7/2019 | Burkle ................... H02K 1/141 |
| 10,480,481 B2 | * | 11/2019 | Burkle ............... F03B 13/1845 |
| 10,570,884 B2 | * | 2/2020 | Burkle ................... F03D 3/005 |
| 2002/0109358 A1 | | 8/2002 | Roberts |
| 2003/0029269 A1 | | 2/2003 | Gabrys |
| 2003/0122380 A1 | | 7/2003 | Harbison |
| 2006/0076782 A1 | | 4/2006 | Yeh et al. |
| 2006/0214428 A1 | | 9/2006 | Altemark et al. |
| 2006/0275105 A1 | | 12/2006 | Roberts et al. |
| 2007/0296219 A1 | | 12/2007 | Nica |
| 2008/0309089 A1 | | 12/2008 | Lin |
| 2009/0278357 A1 | | 11/2009 | Williams |
| 2009/0302611 A1 | | 12/2009 | Masters et al. |
| 2009/0317230 A1 | * | 12/2009 | Tease ...................... F03B 13/24 415/1 |
| 2010/0007147 A1 | | 1/2010 | Coulson |
| 2010/0117365 A1 | * | 5/2010 | Ortiz ..................... F03B 13/142 290/53 |
| 2010/0148515 A1 | | 6/2010 | Geddry et al. |
| 2010/0209236 A1 | * | 8/2010 | Freeman ................. F01D 5/145 415/208.1 |
| 2011/0272945 A1 | * | 11/2011 | Ortiz ..................... F03B 13/142 290/53 |
| 2011/0286832 A1 | | 11/2011 | Ortiz |
| 2012/0119504 A1 | | 5/2012 | Vigaev |
| 2012/0251349 A1 | | 10/2012 | Ortiz |
| 2012/0262023 A1 | | 10/2012 | Platon et al. |
| 2012/0280504 A1 | | 11/2012 | Reddy |
| 2013/0049372 A1 | | 2/2013 | Lagerweij et al. |
| 2013/0099496 A1 | * | 4/2013 | Solheim ................ F03B 13/142 290/44 |
| 2013/0145753 A1 | * | 6/2013 | Becker .................. F03B 11/004 60/327 |
| 2013/0294886 A1 | | 11/2013 | Martino |
| 2014/0021723 A1 | | 1/2014 | Christy |
| 2014/0077504 A1 | | 3/2014 | Epstein et al. |
| 2014/0086749 A1 | | 3/2014 | Grigg |
| 2014/0112606 A1 | | 4/2014 | Greenfield et al. |
| 2014/0353974 A1 | * | 12/2014 | Chen ..................... F03B 13/12 290/53 |
| 2016/0108885 A1 | | 4/2016 | Falcao |
| 2016/0290310 A1 | * | 10/2016 | Bhende ................... F03B 13/10 |

FOREIGN PATENT DOCUMENTS

| | | |
|---|---|---|
| CN | 103560633 A | 2/2010 |
| CN | 201461230 U | 5/2010 |
| CN | 103633751 A | 3/2014 |
| GB | 185939 A | 9/1922 |
| WO | 2014048468 A1 | 4/2014 |

OTHER PUBLICATIONS

Extended European Search Report for European Patent Application No. 15821442.9, dated Sep. 8, 2017, 10 pages.
First Office Action for Chinese Patent Application No. 201580050011.3, dated Aug. 31, 2018, 33 pages.
International Search Report and Written Opinion for PCT Application No. PCT/US2015/041204, dated Oct. 23, 2015, 9 pages.
International Search Report and Written Opinion for PCT Application No. PCT/US2015/052491, dated Dec. 18, 2015, 17 pages.
Office Action for European Patent Application No. 15821442.9, dated Jul. 10, 2018, 6 pages.

* cited by examiner

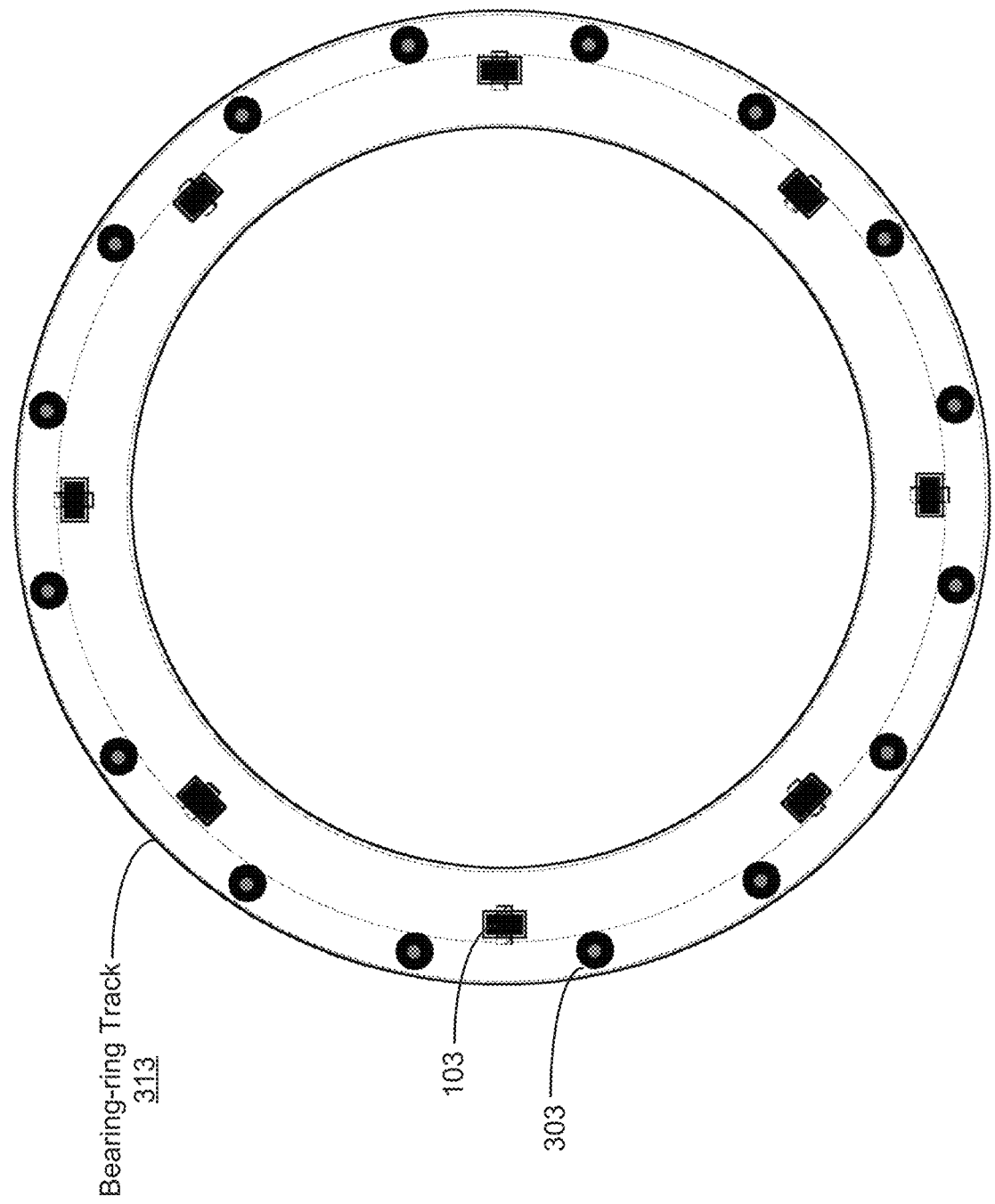

RENEWABLE ENERGY GENERATION BASED ON WATER WAVES

CROSS-REFERENCE TO RELATED APPLICATIONS

This patent document is a continuation of U.S. patent application Ser. No. 16/364,074, entitled "RENEWABLE ENERGY GENERATION BASED ON WATER WAVES", filed on Mar. 25, 2019, now U.S. Pat. No. 10,480,481, which is a continuation of U.S. patent application Ser. No. 15/514,464, entitled "RENEWABLE ENERGY GENERATION BASED ON WATER WAVES", filed on Mar. 24, 2017, now U.S. Pat. No. 10,253,746, which is a 371 National Phase Application of PCT Application No. PCT/US2015/052491, entitled "RENEWABLE ENERGY GENERATION BASED ON WATER WAVES", filed on Sep. 25, 2015, which claims the benefits and priority of U.S. Provisional Patent Application No. 62/055,141, entitled "RENEWABLE ENERGY GENERATION BASED ON WATER WAVES," filed on Sep. 25, 2014. The entire contents of the aforementioned patent applications are incorporated by reference as part of the disclosure of this application.

TECHNICAL FIELD

This patent document relates to systems, devices, and processes that generate energy from wave power in a large body of water such as oceans, rivers or lakes.

BACKGROUND

Water waves carry kinetic energy and can be converted into electricity or other form of energy for proper use. Examples of usable water waves for energy conversion includes ocean surface waves, waves in rivers, lakes or reservoirs, or other large bodies of water.

SUMMARY

In some instances, wave power is used in water desalination processes or water pumping processes, e.g., into reservoirs. Currently, wave power is not widely employed on a large scale. For wave power energy solutions to be widely adopted, new types of scalable systems are needed to provide an alternative to fossil fuels, offering several advantages to fossil fuels including availability and renewability as an energy source, lack of greenhouse gas or pollutant emissions, and the capability of being widely distributed along coastlines, among others.

Techniques, systems, and devices are disclosed for power generation based on water waves.

In one aspect, a wave power generator device to interface to an oscillating water column for converting marine wave power into electricity includes a tube including a support base on each end of the tube; a stator assembly including a circular array of inductor coils fixed in position in a cavity of the support base, an annular ring track coupled to the support base in the cavity and configured to provide a circular track around which the circular array of inductor coils is located, and bearings placed on a circular annular bearing-ring track attached to the support base, the bearings operable to roll to allow a surface in contact with the bearings to move with respect to the annular bearing-ring track; and a rotor assembly including an annular cylinder flywheel structured to form a hollow interior and an outer cylindrical wall having a wide thickness to provide the annular cylinder flywheel with a high inertia, a turbine rotor attached to the annular cylinder flywheel at a particular plane along the hollow interior, the turbine rotor structured to include a disk and a plurality of blades protruding from the disk that pass through the outer cylinder wall of the annular cylinder flywheel into a cavity, and an array of magnets arranged to be evenly spaced and of alternating axial polarity from one another protruding from the outer cylindrical wall of the annular cylinder flywheel such that the magnets move through the circular array of inductor coils as the annular cylinder flywheel rotates with respect to the annular ring track so that the relative motion between the magnets and the inductor coils causes generation of electric currents in the inductor coils, in which the rotor assembly is engaged to the bearings on the circular annular bearing-ring track so that the annular cylinder flywheel is operable to rotate relative to the annular ring track by rolling motion of the bearings when airflow from wave energy enters the hollow interior of the rotor assembly and causes the turbine rotor to rotate for conversion of the wave energy into the electric currents in the inductor coils, and in which the tube encases the rotor assembly and the stator assembly.

In one aspect, a wave power generator device includes a tube frame including a hollow interior and a first support base and a second support base on each end of the tube frame, in which the first and second support bases are arranged to form a cavity along the peripheral of the tube frame; an array of inductor coils positioned at in the cavity for each of the first and second support bases; a plurality of bearings coupled to each of the first and second support base operable to roll to allow a surface in contact with the bearings to move with respect to the inductor coils; an annular flywheel structured to include an outer cylindrical wall adjacent to the first and second support bases, the outer cylinder wall having a wide thickness to provide the annular flywheel with a high inertia; a turbine rotor attached to the annular flywheel at a particular plane of the hollow interior, the turbine rotor structured to include a disk and a plurality of blades protruding from the disk, in which the turbine rotor is coupled to the outer cylinder wall of the annular flywheel; and an array of magnets arranged to be evenly spaced and of alternating axial polarity from one another, the array of magnets coupled to and protruding from the outer cylinder wall of the annular flywheel and located in the cavity of each of the first and second support bases in a gap between the inductor coils, in which rotation of the annular flywheel causes the magnets to move through gap between the inductor coils such that the relative motion between the magnets and the inductor coils causes generation of electric currents in the inductor coils, in which the wave power generator device is structured to be interfaced with an oscillating water column, such that airflow expelled from the oscillating water column caused from wave energy is able to enter the hollow interior of the wave power generation device and affect rotation of the turbine rotor for conversion of the wave energy into the electric currents in the inductor coils.

In one aspect, a method for generating electricity from water wave energy is disclosed. The method includes receiving water waves into an oscillating water column to produce an outward airflow from the oscillating water column as a result of the received water waves. The method includes receiving the outward airflow into an interior region of a wave power generator device. The wave power generator device includes (i) a stator assembly and (ii) a rotor assembly encased within a tube structure having a base frame at each end of the tube structure. The stator assembly includes a circular array of inductor coils in a fixed position with respect to the base frame in the cavity and a plurality of bearings coupled to the base frame. The rotor assembly includes a turbine rotor having a central hub and peripheral blades coupled to an annular flywheel that is moveably engaged with the bearings of the stator assembly. The rotor assembly also includes an array of magnets arranged to be evenly spaced and of alternating axial polarity from one another protruding outwardly from the annular flywheel and between the circular array of inductor coils. The method includes generating electrical power at the wave power generator based on rotation of the annular flywheel on the bearings at least initially caused by oscillating airflow into and out of the interior region of the rotor assembly to initiate rotation of the turbine rotor in one direction, such that electric currents are produced based on the interaction of magnetic fields from the magnets with the inductor coils during the rotation of the annular flywheel. The rotation steadily continues in absence of or reduced wave energy from the water waves.

Those and other aspects, features and implementations are described in greater detail in the drawings, the detailed description, and the claims.

BRIEF DESCRIPTION OF THE DRAWINGS

FIG. 3H shows a diagram depicting an exemplary bearing ring as viewed from the flywheel.

FIG. 3I shows a diagram showing a closer view of exemplary bearings and how they attach to the bearing ring.

DETAILED DESCRIPTION

Figure 1A:
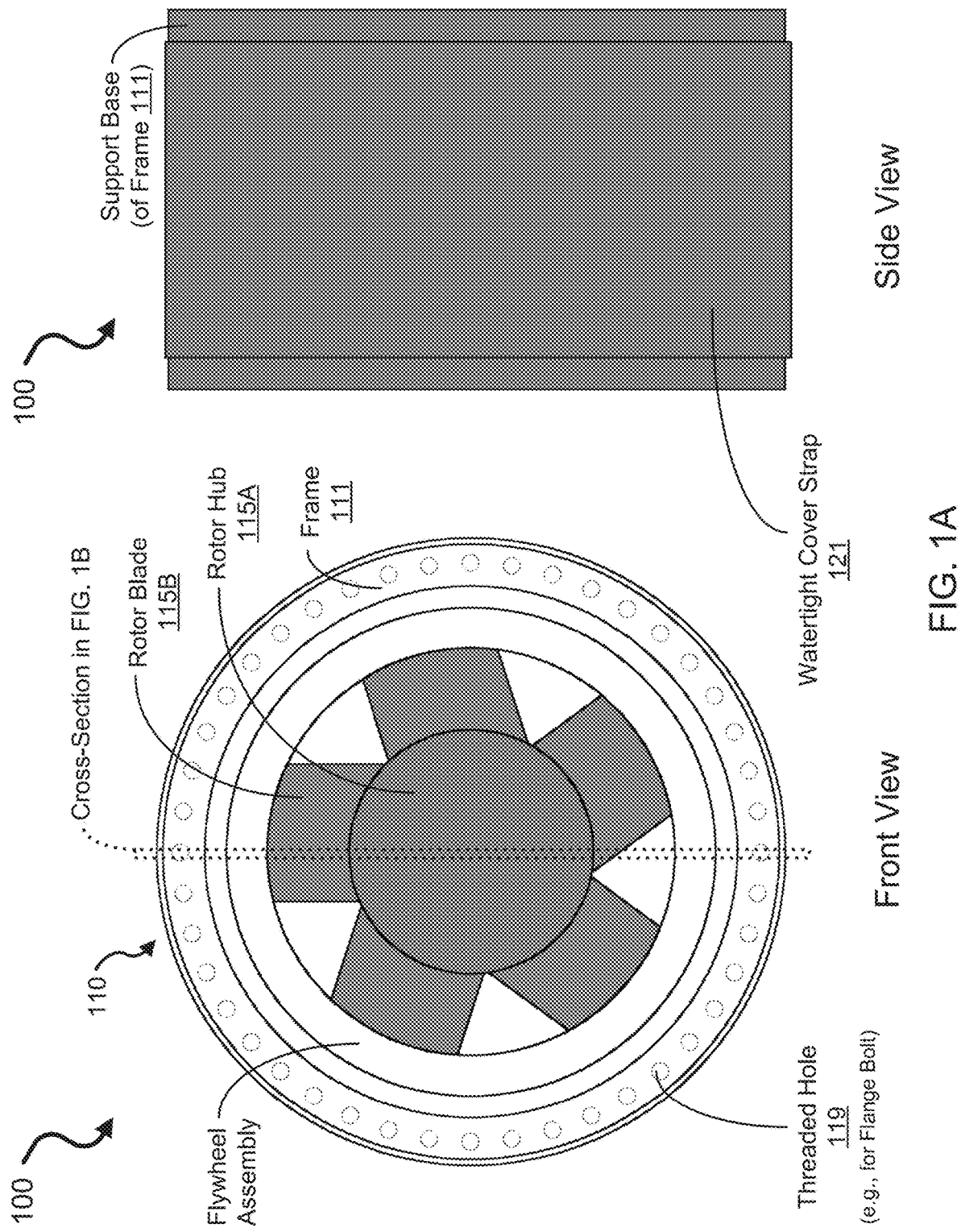
FIG. 1A shows a diagram of an exemplary EiP wave machine (front and side views).

Techniques, systems, and devices are disclosed for marine wave power generation. In some implementations, a wave machine includes an integrated turbine and generator converting oscillating airflow from wave energy into usable electric power.

Marine renewable energy conversion devices of a certain type, extract power from the oscillating water column (OWC) of breaking waves. The moving mass of the water column in a confined space (plenum) compresses air through a relatively narrow opening (venturi), where a turbine connected to an electrical generator shaft makes power from the airflow. Using a Wells turbine, the water column rises and falls with each wave as airflow periodically reverses direction, while the rotor spins in one direction.

In quarter-scale models operating in wave tanks, the direct drive turbo generator appears to operate quite efficiently. However, when a Wells turbine is scaled up to full size and power, a slower rotating shaft with massive mechanical torque becomes unsuitable for efficient electrical generation, presenting a road block to utility-scale OWC power.

To extract power from a slow rotor with high mechanical torque, the generator implements many magnetic poles, along with corresponding amounts of steel core and copper windings. The generator radius is set to be sufficiently large to accommodate all the poles, but this comes with a trade-off as shearing forces on the central shaft limit size and torque. If steel cores are used for greater efficiency with a brushless permanent magnet rotor, magnetic attraction across a large radius increases starting torque. So, direct drive generators must compromise power output for less than optimal electromagnetic torque as size increases.

Moreover, direct OWC power is naturally unsteady, with short peaks of wave energy followed by longer gaps of no energy. To be truly "wave to wire", the turbine/generator must produce steady electrical output. Even though the wave cross section is sinusoidal, low turbine efficiency combined with the physics of electrical generation produce only brief surges of electric power during each wave cycle.

The disclosed technology provides a total solution for utility-scale OWC power. For example, the disclosed technology provides: (i) efficient electrical generation for a large Wells turbine, using an electrical machine of modular structure that is adaptable and scalable to high torque at slow speed; (ii) permanent magnet brushless design with wide gap tolerance and low magnetic friction between steel cores and rotor magnets; (iii) high-speed electronic power control that leverages high rotor inertia for ride-through between wave peaks, delivering useful power under intelligent network control; and/or (iv) reliable and fault-tolerant design, with a modular and redundant architecture, so component failures cause only reduced power output while the machine keeps running; failed components are replaced during scheduled service intervals.

Disclosed are methods, systems, and devices of the present technology for converting wave energy to electricity using a wave machine of the present technology to operate as a super-efficient turbine and generator for any size rotor. The disclosed wave power generators are also referred in this patent document to as the electronic inertial power (EiP) wave machine. The EiP wave machine provides a platform for direct generation, storage, and stabilization of electric power from a single moving mass, which can be caused to move based on fluid wave power.

In one aspect, a wave power generator device to interface to an oscillating water column for converting marine wave power into electricity. The wave power generator device includes a sealed tube including a support base on one or both ends of the tube; a stator assembly; and a rotor assembly, in which the sealed tube encases the rotor assembly and the stator assembly. The stator assembly includes a circular array of inductor coils fixed in position over the support base, an annular ring track coupled to the base support and configured to provide a circular track around which the circular array of inductor coils is located, and bearings placed in the circular track of the annular ring track to roll in the circular track to move around the annular ring track. The rotor assembly includes an annular cylinder rotor structured to form a hollow interior and outer cylindrical wall having a wide thickness to provide the annular cylinder rotor with a high inertia, a turbine rotor attached to an interior surface of the annular cylinder rotor at a particular plane along the hollow interior, the turbine rotor structured to include a disk and a plurality of blades protruding from the disk, and an array of magnets arranged to be evenly spaced and of alternating axial polarity from one another on the outer cylindrical wall of the annular cylinder rotor such that the magnets to move through the circular array of inductor coils as the annular cylinder rotor rotates over the annular ring track so that the relative motion between the magnets and the inductor coils causes generation of electric currents in the inductor coils, in which the rotor assembly is positioned over the annular ring track and engaged to the bearings in the circular track so that the annular cylinder rotor is operable to rotate relative to the annular ring track by rolling motion of the bearings in the circular track when airflow from wave energy enters the hollow interior of the rotor assembly and causes the turbine rotor to rotate for conversion of the wave energy into the electric currents in the inductor coils.

The disclosure of this patent document is organized with the following top-level headings:

Section 1: Introduction. This section includes a general overview of the EiP wave machine and exemplary applications.

Section 2: Operation Principles. This section includes a description of how the disclosed technology works, and presents mathematical models for various aspects of operation.

Section 3: Mechanical Specification. This section includes a description of exemplary embodiments of the EiP wave machine physical form and function.

Section 4: Electronics Hardware Specification. This section includes a description of exemplary embodiments of the EiP electronic architecture.

Section 5: System Architecture. This section includes a description of exemplary system integration and networking concepts.

Section 6: Programming Considerations. This section includes a description of an exemplary EiP wave machine software interface, including programming of EiP machine networks.

1. Introduction 1.1. EiP Wave Machine Overview

Disclosed are electronic inertial power generation devices, systems, and methods that produce electrical energy from environmental sources such as waves, wind, and other 'clean' or 'green' energy sources. Various embodiments and implementations of the disclosed electronic inertial power generation technology (or EiP technology) are described, particularly wave power generators that are scalable on a local scale, e.g., referred to as the EiP wave machine. The EiP wave machine can interface to an oscillating water column (OWC) for converting marine wave power into high velocity airflow, capable of driving the EiP wave machine rotor for energy conversion for a wide range of wave conditions without mechanical adjustment. The disclosed EiP technology adapts direct electrical generation to a Wells-type rotor, so power can be extracted from fluctuating changes in wave power (e.g., high tide to low tide) in random directions to produce steady useable electrical power output.

The EiP wave machine is an energy conversion device, which efficiently transforms mechanical torque with high inertia to electromagnetic torque, producing useful power within a fraction of rotation, e.g., and can do this with one moving part. The EiP wave machine includes a permanent magnet generator with many poles and core windings integrated with the aerodynamics of a Wells-type rotor. For high inertia, a thick-walled cylinder attaches to the blade tips. The outside of the cylinder becomes the "shaft" for generator magnetics populating the circumference. With no central shaft and main bearing, unlimited torque response is possible.

In implementations of wave energy to electrical energy conversion using the disclosed technology, an exemplary EiP wave machine is interfaced to an oscillating water column (OWC) or wave energy capture device. For example, there are typically two types of OWC wave energy capture devices. One example of an OWC device includes a hollow air chamber with an opening in the sea water and an exit to the atmosphere to expel air from the chamber. The outward airflow (e.g., expelled from a channel or the chamber) of the OWC device can be interfaced with a pipe flange that fits the wave power generator device, e.g., such as the EiP wave machine of the present technology, as discussed here. When the water wave peaks occur, the air is compressed and forced out of the OWC and into free air through the EiP wave machine. In the EiP wave machine, for example, the rotor responds by turning in a certain direction (e.g., depending on which end of the EiP wave machine is attached to the OWC pipe flange) as the compressed air flows out through the EiP wave machine. As the water wave recedes, the air chamber of the OWC is decompressed and air is drawn back through the EiP wave machine as the rotor continues to spin in its current direction. Successive wave motions create an oscillating air flow in and out, while the rotor continues to spin in a constant direction, at a regulated speed fortified by the rotor flywheel mass and electronic interactions to create steady power output.

Another example of an OWC wave energy capture device uses dual airbags attached to the seafloor with a tube from each airbag, which are attached at one end of the wave power generator device, e.g., such as the EiP wave machine, as discussed here. As a wave passes over the airbags of the OWC device, air is forced from one bag to the other through the EiP wave machine and back again, producing rotor motion in one direction supported by flywheel inertia and electronic interactions. The outward airflow (e.g., expelled from tube) of the OWC device can be interfaced with a pipe flange that fits the EiP wave machine. The disclosed the EiP wave machine maintains rotor speed in between wave peaks for achieving a steady electrical output. FIG. 1C shows an illustrative diagram of an oscillating water column interfaced with an exemplary EiP wave machine 100 to convert the airflow out of the OWC, caused by the rising and falling water waves in/out of the OWC, into the electrical energy by the EiP wave machine 100. The EiP wave machine 100 can be configured with other examples of OWC devices, systems, and structures, such that the airflow output of the OWC is interfaced with the hollow interior of the EiP wave machine 100 to affect the rotation of the rotor assembly. For example, FIG. 1D shows another illustrative diagram of an oscillating water column interfaced with the EiP wave machine 100, in which the EiP wave machine is oriented perpendicular to that shown in FIG. 1C.

Figure 1B:
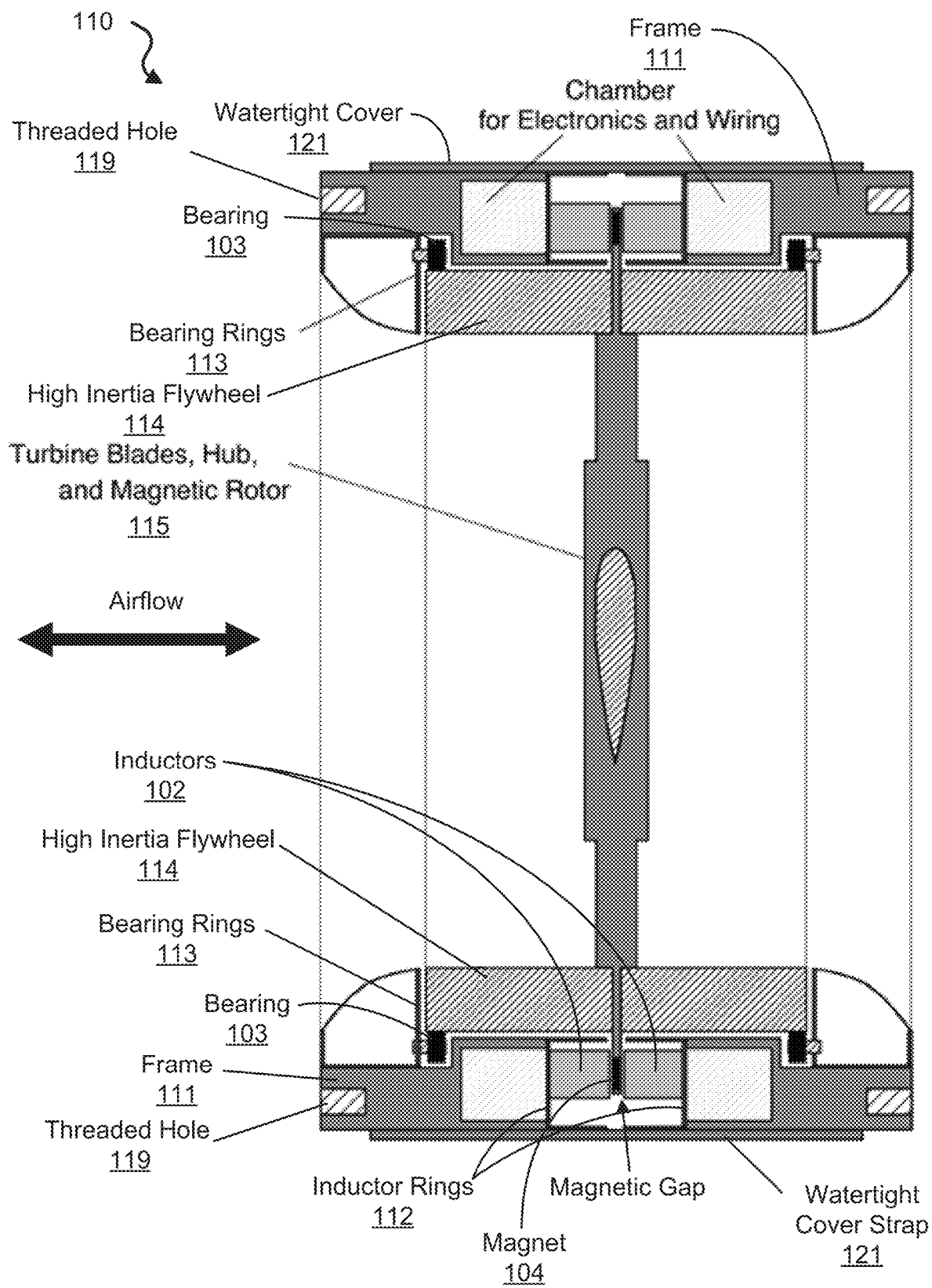
FIG. 1B shows a diagram illustrating a cross sectional view of the exemplary EiP wave machine including its internal components.
Figure 1C:
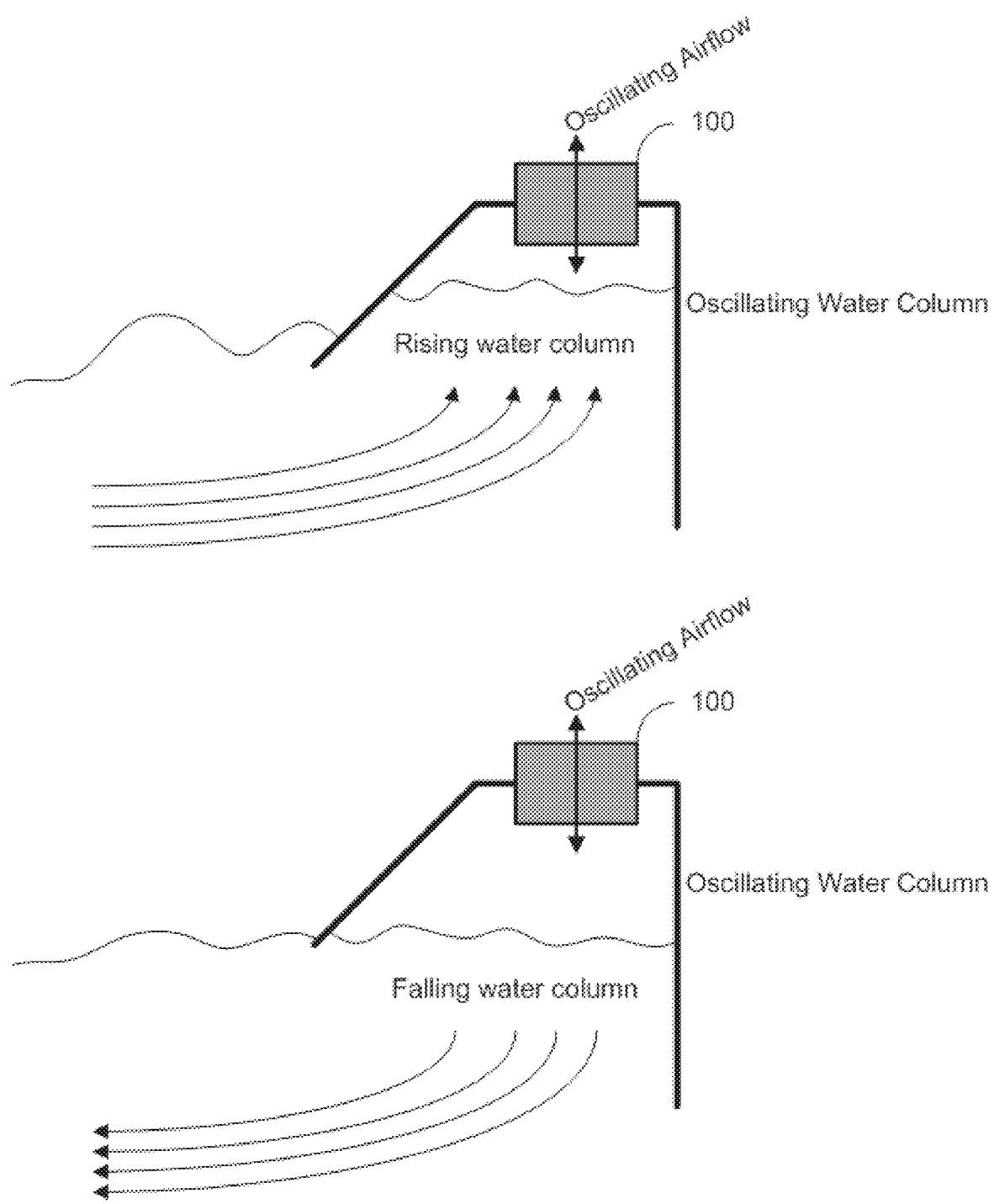
FIGS. 1C and 1D show illustrative diagrams of an oscillating water column interfaced with an exemplary EiP wave machine to convert the airflow out of the OWC, caused by the rising and falling water waves in/out of the OWC, into the electrical energy by the EiP wave machine.
Figure 1D:
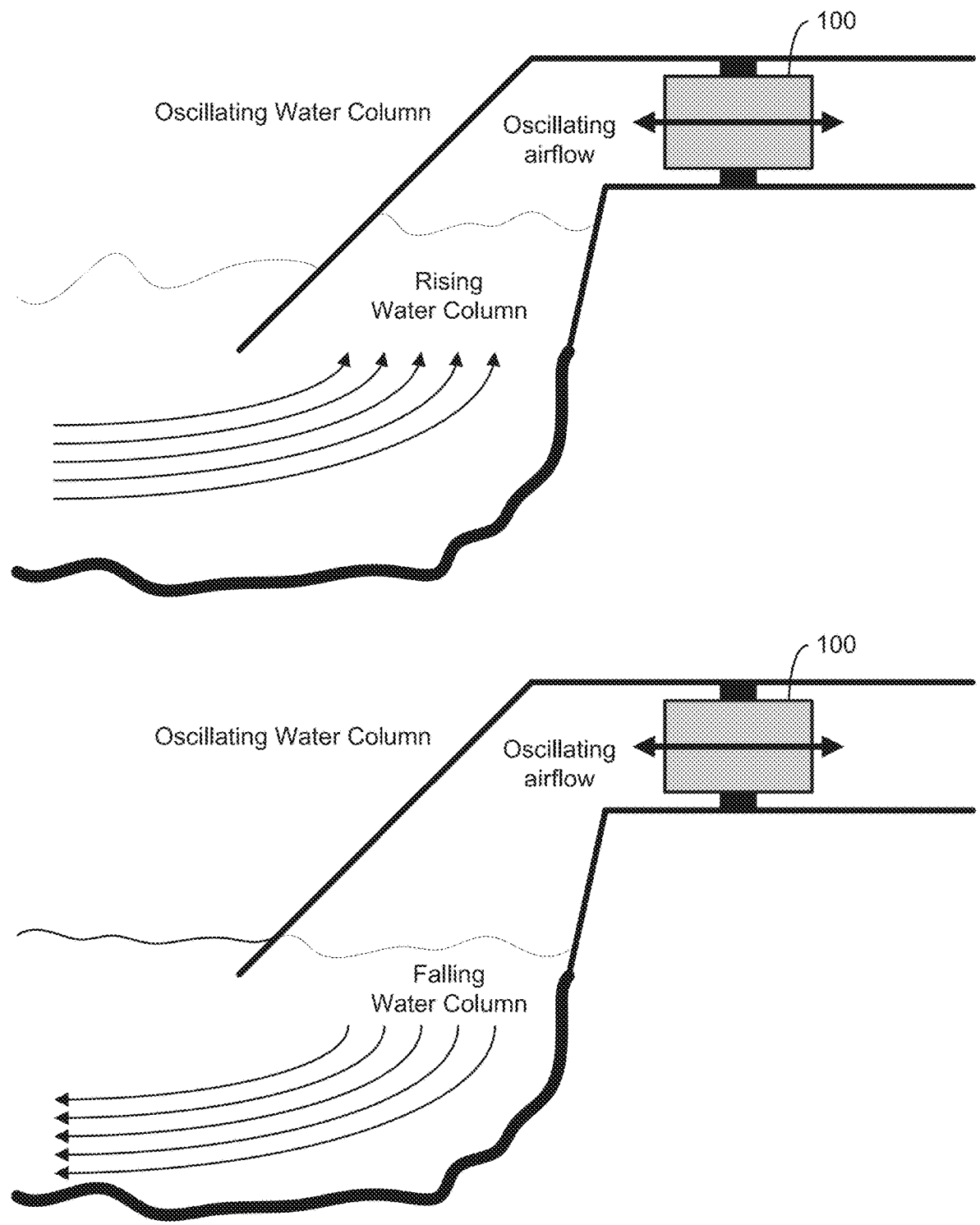

FIG. 1A shows a diagram illustrating front and side views of an exemplary EiP wave machine 100. FIG. 1B shows a diagram illustrating a cross sectional view of the EiP wave machine 100 showing at least some of its internal components. From input to output, the structure is symmetrical and identical with respect to inflow and outflow of air from the OWC wave energy capture device. The EiP wave machine 100 featured in FIGS. 1A and 1B is configured to have a circular geometry with respect to the front view and a one meter diameter of the rotor assembly; but the EiP wave machine 100 can be configured to other curved geometries and larger or smaller dimensions. The EiP wave machine 100 includes an electronic inertial power generation unit 110 of the disclosed technology. The electronic inertial power generation unit 110 includes a frame 111 structured to form a sealed tube including a support base at each end of the tube. The frame 111 includes watertight covers 121 (e.g., also referred to as watertight cover straps) at the ends of the tube that attach the support base of the frame 111 forming a tight seal to prevent water or fluids to leak inside the tube interior of the electronic inertial power generation unit 110. In some embodiments, the frame 111 includes threaded holes 119 along an outer surface of the support base configured to fit a standard pipe flange bolt pattern. In some implementations, for example, EiP wave machine 100 can include an external casing 120 that encloses, at least partially, the electronic inertial power generation unit 110 in the external casing 120. In such embodiments including the external casing 120, the casing 120 may include an exterior shell having one or more openings to access various regions of the interior, in which the openings can be covered by a watertight covers (e.g., such as the watertight cover straps 121).

The electronic inertial power generation unit 110 includes a stator assembly. The stator assembly includes an array of inductor coils 102 (e.g., also referred to as 'inductors') located in a cavity of the support base and fixed in position with respect to the support base of the frame 111. The stator assembly includes an annular inductor ring track 112 (e.g., also referred to as 'inductor rings') coupled to the support base in the cavity and configured to provide a circular track around which the circular array of inductor coils 102 is located. The stator assembly includes an array of bearings 103 (e.g., also referred to as 'bearings', which may include vertical support bearings and/or side support bearings) arranged in a fixed position with respect to the support base of the frame 111 and coupled to an annular bearing ring track 113 (e.g., also referred to as 'bearing rings') attached to the support base, such that the bearings 103 are able to move (e.g., roll) around the annular bearing ring track, e.g., providing a circular track around which a flywheel assembly may rotate. Bearings in the radial direction support the rotor, while bearings in the axial direction restrict lateral motion of the rotor.

The electronic inertial power generation unit 110 includes a rotor assembly. The rotor assembly includes an annular cylinder flywheel 114 structured to form a hollow interior and outer cylindrical wall having a wide thickness to provide the annular cylinder flywheel 114 with a high inertia. The rotor assembly includes a turbine rotor 115 attached to the annular cylinder flywheel 114 at a particular plane along the hollow interior, the turbine rotor structured to include a disk or hub 115A and a plurality of blades 115B protruding from the disk 115A that pass through the outer cylinder wall of the annular cylinder flywheel 114 into the cavity of the support base. The rotor assembly includes an array of magnets 104 arranged to be evenly spaced and of alternating axial polarity from one another on an array of outer protrusions stemming from the outer cylindrical wall of the annular cylinder flywheel 114. The array of magnets 104 are arranged such that, when the annular cylinder flywheel 114 rotates with respect to the stator assembly, the magnets 104 moves through the circular array of inductor coils 102 as the annular cylinder flywheel 114 rotates on the bearings 103 over the annular bearing-ring track 113 so that the relative motion between the magnets 104 and the inductor coils 102 causes generation of electric currents in the inductor coils 102.

The rotor assembly is positioned with respect to the annular ring track 112 and engaged to the bearings 103 in a circular track so that the annular cylinder flywheel 114 is operable to rotate relative to the annular ring track 112 by rolling motion of the bearings 103 in the circular track when airflow from the OWC wave energy capture device passes into and out of the hollow interior of the rotor assembly through the pipe flanges and causes the turbine rotor to rotate for conversion of the wave energy into the electric currents in the inductor coils.

An example embodiment is described, also with reference to FIGS. 1A and 1B. At the center of the EiP wave machine 100 includes a hub disk 115A with five airfoil blades 115B to form an ideal "high solidity" Wells rotor, e.g., which can be configured without a rotary shaft. In this example, the rotor is configured to be at least one meter in diameter. The blade tips are attached midway inside a hollow cylinder, which adds the high inertia flywheel 114 to the Wells rotor, riding on the ring 113 of bearings 103 at each end. Protruding from the outside of the flywheel is an annular ring containing the permanent magnets 104 of alternating axial polarity. As the rotor spins, rapidly rotating lines of magnetic flux generate electric power as they pass through a magnetic gap between stationary inductor pairs, organized as modular synchronous machines around the circumference of the rotor. A watertight cover 121 and frame 111 encases the inductor array 102, rotor turbine, magnets 104 and flywheel 114, and bearings 103, while also providing standard pipe flange interface to the OWC air plenum. For example, two wires (e.g., DC positive and negative) and fiber-optic cable can attach to an onshore aggregation point, where DC power is combined under network control and prepared for grid transmission.

The exemplary EiP wave machine is a mechanical device that can include one moving part: the rotor. The rotor includes a cylinder with thick walls for high inertia (e.g., the flywheel). On the inside, halfway between cylinder ends, for example, a Wells turbine rotor is attached. On the outside, in the same plane with the Wells rotor, for example, is the magnetic rotor annulus, including a ring of magnets forming a magnetic track around the outside of the cylinder of magnet thickness. A tube frame encapsulates the rotor in a sturdy structure with pipe flanges that provides a framework for stationary inductors (stators) paired on either side of the magnetic rotor. The transition between pipe flange diameter and inner flywheel surface creates a venturi for the Wells-type rotor. As the rotor slowly spins, magnetic flux circulates at high speed through stator pairs, instantly generating pure sinewave AC power, with voltage and frequency increasing with rotor speed (synchronous power). Synchronous power from a modular array of stators is connected to electronics located behind the inductors in a sealed compartment, each module is wired together in series for high voltage DC output.

In one example embodiment, the EiP wave machine rotor can be configured to be about 1.4 meters in diameter, supporting eighty magnetic pole pairs (e.g., 160 magnets). The following figures in this patent document are based on this exemplary design, and demonstrate implementations of the present technology for marine renewable energy generation. This exemplary embodiment of the EiP wave machine represents a minimum practical size of EiP wave machine 100. The disclosed technology includes various designs of the EiP wave machines that are naturally scalable to much larger sizes, e.g., to match the power of any OWC site.

1.1.1. Enhanced Wells Turbine Performance

For example, some main differences between a Wells turbine and an EiP wave machine are the integrated flywheel and lack of central rotary shaft. Positive aerodynamic side effects include the elimination of stalling under high air flows, and improved internal pressure difference. The inner flywheel surface straightens out turbulence entering the rotor, and cuts off air leakage around blade tips, directed toward higher working pressure on the intake side. The hub disk with no shaft allows turbulent flow on the back side of rotor blades to organize into a wake vortex that increases the pressure drop for increased mechanical power to overcome stall conditions.

The greatest failing of a Well turbine is high startup speed. EiP technology starts and maintains rotor speed, enhancing flywheel inertia using one module dedicated to motoring. In combination with flywheel effect, average rotor inertia remains constant between wave peaks as EiP speed regulation injects timely bursts of motoring thrust as a control mechanism.

1.1.2. Utilizing the Inertia of a Massive Rotor

A larger radius Wells rotor provides a dramatic increase in mechanical power, although at slower rotation speed. Inertia and torque increase with the square of the radius, along with overall weight. In a standard Wells turbine, a large diameter rotor cannot efficiently run a generator on a central shaft for two reasons: slow rotation speed and excessive torque. Slow speed requires many generator poles, which requires a large generator radius to accommodate all of the coils and magnets. High mechanical torque from the rotor limits the electromagnetic torque response because of shaft stress. EiP technology converts power directly on the radius, not the center, where enough electromagnetic components can produce maximum power production at low rotor speed without breaking the rotary shaft.

Energy storage flywheels typically use a rotor of small radius and operate at high speed, because energy storage potential increases exponentially with speed. In EiP technology, the flywheel is a heavy rotating cylinder with a large radius; even at low speed, accumulated inertia becomes significant, magnifying the energy potential of small changes of angular velocity. EiP technology recirculates power from excess inertia toward controlling inertia, further enhancing the flywheel storage time by promoting speed up and retarding slow down in response to operating conditions.

High inertia delivers peak power output resembling a massive battery bank. EiP wave machines eliminate the need for batteries and other temporary storage. For example, in the short term, high inertia is leveraged to stabilize power output between wave peaks. For long-term storage onshore, the battery bank could be replaced by fuel cells, for example, allowing inertia to handle load peaks.

1.1.3. Modular Architecture

EiP technology enhances power production from less weight and cost of materials, through parallelism with a modular architecture. EiP technology breaks down a massive amount of magnets, iron, copper, and silicon into efficient modules that produce more power in aggregate than a monolithic design. EiP technology includes a new three-phase generator module, stacked around the rotor edge, where thrust force is amplified by the rotor radius. In other words, the equivalent electrical input for a rotary machine is multiplied by the radius upon which the EiP module operates.

Each module is a linearized three-phase machine that receives excitation from a magnetic track around the rotor, instead of a rotary shaft. Using three split inductors, half on one side and half on the other, with eight rotor magnets passing between at any moment, EiP technology defines a specific physical layout for magnets and stators that enforces three-phase synchronous operation between any three adjacent stators. Each module is synchronous, and compatible with standard three-phase electronic rectifiers and industrial drive circuitry.

In some embodiments representing the most minimal configuration, for example, three modules are arranged around the rotor one hundred twenty degrees apart. For more power, four can be arranged ninety degrees apart in quadrature. Six can form a star configuration with sixty degrees of separation. The number can be expanded geometrically. In the EiP wave machine, the entire circumference is fully populated with generator modules wired in series, for maximum voltage to drive the long cable run to shore where power is combined with other EiP wave machines.

1.1.4. Direct Conversion of Electromagnetic Torque to Power

Synchronous generation allows a sensorless technique that reads timing cues directly from raw DC power, using digital signal processing. Electromagnetic torque control occurs faster than changes in rotor torque, so peak energy from a violently breaking wave is smoothly absorbed as slow change in rotor speed.

Smooth torque control gently speeds up the rotor, storing excess energy as inertia, which accumulates dramatically with speed. One generator module is selected to operate as a motor to boost rotor inertia as a regulation mechanism that responds faster than resource and load changes. Essentially, the EiP machine contains many smaller electrical machines sharing and combining power on a DC network. For speed control, one module acts as a motor while the others generate. The motoring module maintains speed under load by injecting bursts of thrust applied to the rotor radius. At a certain speed, energy from inertia exceeds the load and electrical/mechanical overhead, creating a condition referred to as "overhauling", from which power is harvested by reverse motoring, when the motoring module intermittently becomes a generator.

1.1.5. Energy Storage By Electronic-Mechanical Oscillation

EiP technology combines energy from waves and inertia with electronic actions, to spawn the EiP oscillation. Rotational inertia allows the rotor to resist changes in speed: acceleration with a sudden blast of energy, or deceleration under changes in electrical load. The EiP oscillation amplifies inertial effects in a positive direction: increasing the uptake of wave power from a heavy rotor while reducing slowdown from peak loading. In effect, multiplying rotor flywheel energy storage time using only the tiny amount of power required to keep electronics running.

1.1.6. Cleaner and More Efficient Power Generation

When all of the windings of a large generator are stitched together, they pick up stray magnetic fields leaking out of the rotor. The resulting AC output is ragged, full of rotor harmonics, which produce heat, not useful power. Each synchronous generator module produces pure sine waves. EiP technology breaks up and isolates core elements as compact segments, using a novel electronic/magnetic design that concentrates stray magnetic fields. The result is a modular synchronous power with low harmonic content, converted to DC and combined with other modules at maximum efficiency.

With a tiny amount power from the grid, the EiP wave machine rotor stays spinning. In "standby" mode, rotor inertia and aerodynamics plus electronic speed control hyper-sensitize the uptake of energy. While power from the grid trickles in, the EiP wave machine delivers power backed by rotor inertia and electronics, with vast surge potential. High surge power stabilizes peaks and dips for solid grid-quality power.

1.1.7. Simple Electrical and Control Interface

The EiP wave machine presents a simple interface to onshore power: high voltage DC power and ground. Embedded intelligence in the EiP wave machine can be controlled by a direct fiber optic cable. For example, such electrical and optical communications connections can include copper wire and/or fiber optic cables, which may all share a single buried conduit from the EiP wave machine to shore, where power from other machines can be combined and fed to the grid. Onshore, the EiP network can be managed to extract maximum output from an entire network of EiP wave machines in a marine renewable energy array.

1.2. Reliable and Scalable Modular Design

One of the greatest failings of all turbines with a central shaft is scalability to larger sizes. Smaller models seem to work great in the laboratory, but when the radius is expanded the speed of rotation slows and mechanical torque increases to a point where efficient electric power production is impossible. In the disclosed EiP wave machine technology, electric power generation naturally expands with rotor size. Slowness is not a problem, since as the radius expands, more space is created for more power generating parts at a higher magnetic frequency. The EiP design principles are scalable, expandable for maximum energy uptake and power output for an EiP wave machine of very large size.

1.2.1. Fault Tolerant Design

For reliability, the EiP wave machine has only one moving part; mechanical systems can be replaced with magnets, coils, and electronics. Direct drive requires no mechanical gearboxes, slip rings, or commutation, for example.

Main bearing failure causes the most downtime in conventional generators. In contrast, for the EiP machine, the hollow center eliminates the main bearing, using multiple smaller bearings that spread the load around the rotor circumference, where the load is shared by redundant bearings. For example, if a bearing should fail, overall operation is unaffected.

1.2.2. Generator Modules

The second highest source of downtime is electrical failure. The EiP wave machine splits the generator into discrete inductors, e.g., organized as three-phase modules sharing a common DC connection. Integrated rectifiers convert three-phase AC into DC, isolating each generator module from the next. If one should fail, for example, the machine keeps running under reduced power output, not total shutdown.

1.2.3. Low Cost and Manufacturable Design

Through EiP technology, the size of all electromagnetic elements are optimized, fine-tuned for maximum power production at least weight and cost, replicated in a modular design. The EiP wave machine can be built from common materials, e.g., like stainless steel, aluminum, copper, epoxy resin, and magnets. Structural parts can be fabricated from laser cut plate stock and machined castings. Other parts, like magnets, inductor cores, coils, electronics, and bearings, can be selected from a wide range of original equipment manufacturer (OEM) sources. A prime directive of EiP technology is to build locally, assembling EiP wave machines near the place of installation, using non-exotic facilities, skills, and fabrication techniques.

1.3. EiP Spontaneous Networking Technology

The disclosed technology specifies a network interface in various media (e.g., wireless, wired, or fiber optic). In the exemplary EiP wave machine, fiber optics are chosen for monitoring and control of the EiP wave machine from a convenient location. Using this interface, multiple EiP wave machines can operate as "spontaneous" networks, linked by location and responsive to real-time power demands. Power conditioning is a byproduct of EiP wave machine architecture, stabilizing delivery of marine renewable energy at a local level. EiP wave machines on spontaneous networks of OWC arrays capture the vast energy potential in large swells. For example, every EiP wave machine on the network can be configured to share its status to all others, tapping into a real-time stream of wave and grid conditions, through which all EiP wave machines can synchronize power storage and regulation. For example, as excess power is created by one machine, another instantly absorbs it, working with all other EiP wave machines on the array to locally balance power demands.

1.3.1. Local Solution for Backup and Energy Storage

Spontaneous EiP wave machine networks transparently take over when grid power sources falter. The heavy rotor combined with high speed networking, provides enough energy to ride through wave peaks. In combination with onshore power from EiP wind machines and solar panels, EiP technology delivers the solution for sharing locally generated renewable energy, with low cost and minimal impact. It is envisioned that widespread adoption of EiP technology will eliminate the need for large distant power-plants, huge transformers, and long inefficient transmission systems. When many EiP wave and wind machines are combined on the network, for example, their combined electromagnetic torque represents tremendous instantaneous power capacity to meet load demands, or back down gently when resources are low.

1.3.2. Pathway to 100% Renewable Power Grid

Through EiP technology, distant hydropower and wind farms can be used to power the long-range transmission system, e.g., allowing power to naturally fluctuate while local EiP wave and wind farms, and rooftop solar, actually deliver power and maintain energy reserves. It is envisioned that EiP technology can provide the pathway to one hundred percent renewable grid power systems, where sidecar powerplants are eliminated, allowing renewable resources to ebb and flow, as spontaneous networks of EiP machines provide seamless power delivery.

2. Operation Principles

EiP technology includes a specific arrangement of magnetics plus embedded electronic control (e.g., electronics) for a modular three-phase linear synchronous machine. Modules (e.g., identical modules) are combined around the rotor circumference to create a large permanent magnet generator, e.g., with one module dedicated to motoring operations for rotor inertia control. The magnetic circuit design guarantees three-phase excitation for any three adjacent stators, for example, which can be equally spaced around a magnetic track in the rotor. Each module generates full power at fractional rotor speed. Modules combine to form an EiP machine, duplicated around the rotor in groups, presenting massive electromagnetic torque potential. Total power is the sum all modules, for example, like locomotives on a circular track, thrust force from each one acts upon the rotor radius for maximum torque response to rotor mechanical power. The EiP machine delivers electromagnetic torque more quickly and powerfully than conventional generators and transmissions.

2.1. EiP Wave Machine: Ultra High Efficiency Axial Flux Generator

Axial magnetic flux, in parallel with the center of the rotor, provides a simple way to generate power. Most permanent magnet designs use only copper coils with surface mounted magnets that rotate around. This eliminates the effects of magnetic drag from attraction to steel inductor cores, reducing the minimum air speed for startup. However, this design fails to efficiently concentrate rotor flux toward electric power production.

EiP technology provides a new electrical energy generation machine: a modular high torque slow speed axial flux generator, with interior permanent magnetic poles, and no central shaft. EiP technology advances axial flux generator design far beyond normal limits, concentrating all magnetic flux toward synchronous power, maximizing electromagnetic torque from the least amount of copper and steel, unlimited by shearing stress on a central shaft.

The EiP machine combines three-phase modular magnetics with embedded EiP oscillator electronics, to convert sudden fluctuations in mechanical torque to stable electric power backed by rotor inertia. The modular approach provides the best way to adapt efficient power generation to a large and slow-moving Wells rotor.

2.1.1. No Drive Shaft, Unlimited Torque

One primary difference between the EiP machine and other large generators is greater electromagnetic torque potential because of no central shaft, where shear strength limits thrust on a large radius. The EiP technology includes modular magnetics match mechanical torque at the rotor's edge with overwhelming thrust force, e.g., instead of twisting and breaking a shaft. Also, for example, the bearing load is spread around rather than centralized, for fault-tolerance and high-reliability.

2.1.2. Load Controlled Rotor Speed

EiP technology includes regulation of the rotor speed by electrical loading on the DC output, or by motoring operations using a dedicated module in parallel with generating ones. Loading slows the rotor, while air power speeds it up. Using instantaneous bursts of forward and reverse motoring, total inertia is maintained as speed changes occur in a controlled fashion.

2.1.3. Enhanced Flywheel Storage Through Exemplary Oscillator Electronics

The EiP magnetic rotor represents the ideal flywheel for high torque at slow speed, naturally bolstering air power uptake. Embedded EiP oscillator electronics inject motoring thrust response in a fraction of rotation, faster than mechanical speed changes. This converts a wide dynamic range of wave and load conditions to gradual rotor speed changes.

When load is less than airflow plus inertia, electronic interactions extend inertial storage time beyond the flywheel storage effect. As rotor speed goes up and down in a relaxation oscillation, it directs power from airflow from wave energy and inertia toward electrical loads plus rotor speed regulation. A small change in rotor speed corresponds to a large change in energy potential.

For even greater storage time, for example, clusters of EiP wave machines linked by EiP spontaneous networking bounce power from excess inertia between machines. Over a wide geographical area, storage time expands, providing the foundation for 100% local renewable power.

2.2. Magnetics Design

Compromises in generator magnetics design are required by direct drive Wells machines to overcome the following limitations to efficiency. For example, slow rotor speed means more magnetic poles, so the generator radius must be larger. Stator cores must be near the poles; magnetic attraction acting on a large radius creates excessive cogging force, forcing higher start up air speed. Stator windings and monolithic core must encapsulate the rotor circumference, which produces an excessively heavy machine. Long stator windings generate harmonics from magnetic rotor leakage flux. Massive electromagnetic torque acting on a large radius can destroy a central shaft.

The disclosed EiP magnetics design conquers these limitations without reducing efficiency. Cores are segmented and arranged to form discrete permanent magnet synchronous machines. The arrangement of cores vs. magnets reduces the cogging force. Segmented cores exhibit less heat loss from eddy currents at higher frequency than a monolithic core.

Synchronous power is clean, producing pure sinewave output. In some embodiments, for example, an exemplary EiP modular design specifies a three-phase magnetics architecture with integrated electronics that isolates and concentrates stray rotor flux. Magnetic flux rotates between core elements using a linear design requiring no driveshaft or gearbox.

2.2.1. Permanent Magnet Synchronous Power

A synchronous generator produces sine wave AC power, of increasing voltage with rotor speed (n). The frequency (f) increases as well; how quickly depends on the number of magnetic poles (p), as shown in the following Equation 2-1: Synchronous Power Frequency and Magnetic Poles.

$$f = p\ n/60 \qquad \text{(Eq. 2-1)}$$

In the exemplary EiP machine, pairs of magnets are embedded with alternating polarity, to form one generator "pole pair". Using the above formula on the EiP wave machine rotor, e.g., with 160 magnets forming 80 pole pairs, spinning at one revolution per second (e.g., 60 RPM), produces AC power at 80 Hz (e.g., three quarters rotor speed=60 Hz). At 1.5 revolutions per second, the nominal operating frequency is 120 Hz. Since each stator interacts with two pole pairs, four magnets pass between in one cycle, doubling the frequency of the induced voltage. While the mechanical angle between stators and magnets is 30 degrees, the electrical angle is 60 degrees. This is an advantageous design choice, which doubles the electrical excitation of the stators at slow rotor speed.

The exemplary EiP magnetics design partitions a massive steel core into isolated silicon steel cores, with thin laminations to reduce eddy current loss, organized as modular three-phase machines around the rotor. The synchronous design guarantees production of smooth pure sine waves (non-trapezoidal) in proper phase by concentrating all magnetic flux, axial, transverse, and leakage, toward the fundamental generator frequency, for low losses. Electronic rectifiers isolate stator windings that share a common DC link. Distributed core elements with integrated rectifier, and modular three-phase format, present a new magnetic design, e.g., for maximum power with highest efficiency, at the finest level of control possible. Modules can be combined to match the EiP wave machine configuration.

2.2.2. EiP Permanent Magnet Linear Synchronous Machine (PMLSM)

When rotary four-pole three-phase stators and magnets are laid out inline, the EiP permanent magnet linear synchronous machine (PMLSM) is defined. Relative size and placement of magnets and stator cores minimize cogging torque and enforce three-phase operation between any three adjacent stator pairs, drawing excitation from rotating magnetic fields of eight magnets passing between. In the rotary and linear models, a thirty-degree mechanical relationship between inductor core faces and pole pairs produces an electrical angle between phases of sixty degrees. Wye connection between the stators provides one hundred twenty degree three phase operation.

Figure 2A:
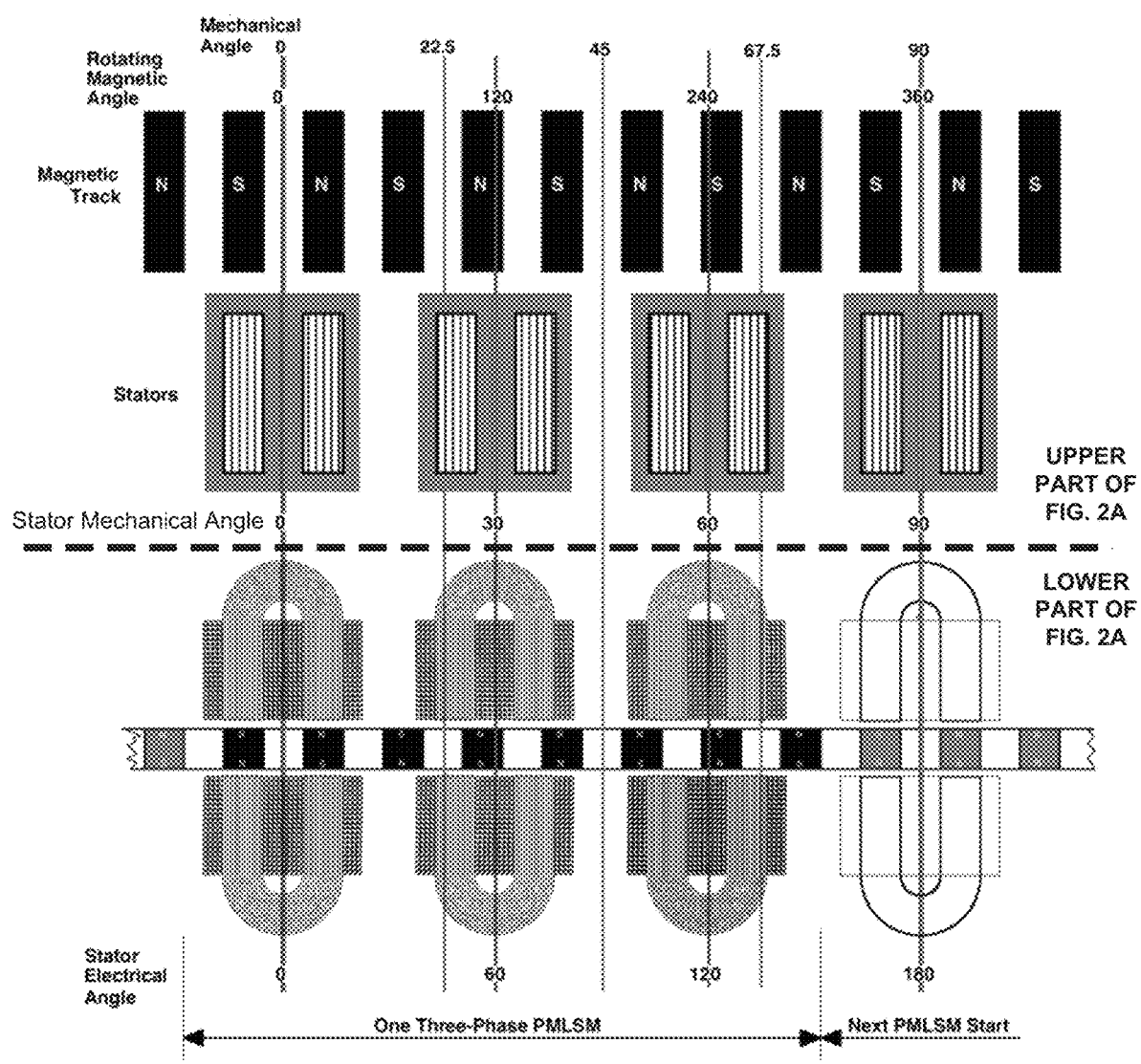
FIG. 2A shows a diagram illustrating an exemplary EiP permanent magnet linear synchronous machine (PMLSM).

FIG. 2A shows a diagram illustrating an exemplary EiP permanent magnet linear synchronous machine (PMLSM), which shows the relationships between magnets and stationary inductors (stators) depicting the magnetic vs. mechanical cycle of an example three-phase grouping. The diagram of FIG. 2A shows top and side views of the linear arrangement of components in the EiP PMLSM, on a short section of magnetic track, which corresponds to one three-phase magnetic cycle. The diagram shows how the physical layout of this exemplary embodiment translates to dynamic three-phase operations. The upper half of the diagram shows the top layer of stators opened up like book pages to indicate the pattern of magnetic poles to stator legs. The lower half shows the view at the rotor edge. The physical placement of stators vs. magnets is compact, with a narrow mechanical angle. The electrical angle fits the three-phase model, twice the mechanical angle because magnetic poles are built from oppositely polarized pairs of magnets. Excitation from rotating magnetic fields with respect to stator cores is twice the electrical angle, for full three-phase wye operation.

For example, each EiP PMLSM is like a linear positioner optimized for power production, with 3 stators forming the "mover", and four magnetic poles embedded in slots around the rotor circumference acting as the "track". Permanent magnets are equal in width and thickness, in alternating axial polarity, separated by magnet width. Stators pole faces match the footprint of two magnets, on "C" cores made from 3% silicon steel laminations. Two C cores on opposite sides of the rotor, with equal windings on each leg, wired in series above and below the rotor magnets, form one stator. A given rotor circumference supports a certain number of stators and magnets equally spaced around the rotor, partitioned into three-phase groups. Magnet size defines stator dimensions, and the total number that fit around the magnetic track. The ratio of four magnetic poles to three inductor cores, evenly spaced, minimizes cogging (torque ripple), where magnetic pull on one inductor/pole pair is balanced by three magnet pairs pulling on two inductor cores.

2.2.3. EiP Synchronous Generator Magnetic Circuit

The disclosed EiP magnetic circuit uses C cores to concentrate magnetic fields from rotor flux to synchronous AC power. Rotor harmonics reinforce the fundamental frequency, for optimum efficiency. The C cores are basically a split transformer core, with an extended gap to accommodate the magnetic rotor in between.

Figure 2B:
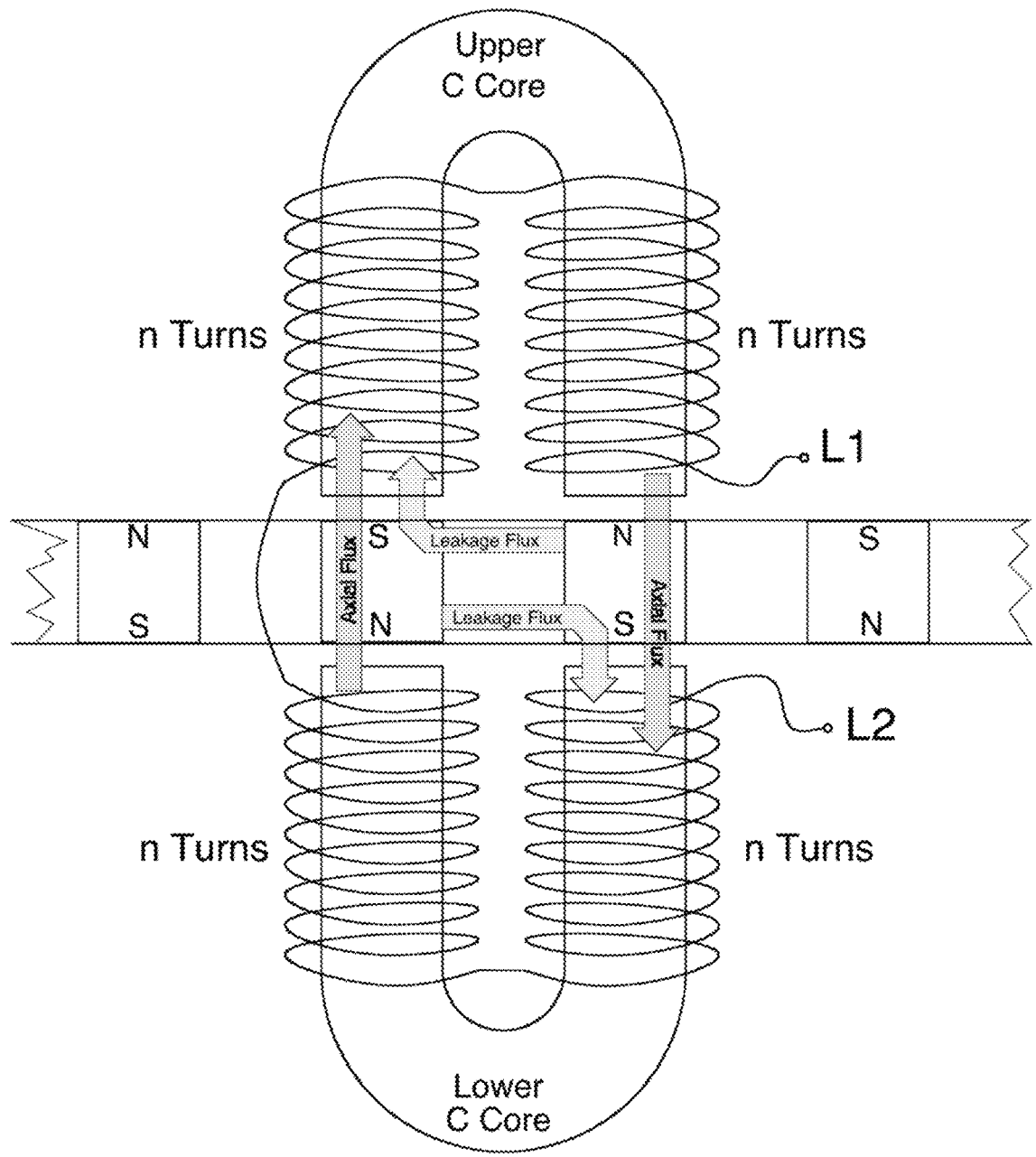
FIG. 2B shows a diagram of an exemplary EiP synchronous generator magnetic circuit.

FIG. 2B shows a diagram of an exemplary EiP synchronous generator magnetic circuit of the present technology for one leg in the three-phase EiP machine, as viewed from the side. In the diagram of FIG. 2B, magnetic lines of flux from permanent magnets follow the path of least resistance from north (N) to south (S). Axial flux is conducted by magnetic steel, strengthening as core faces line up, eventually to saturation. Embedded rotor magnets of opposite axial polarity, separated by a distance equal to width and thickness, provide a secondary magnetic circuit for leakage flux. In combination with the relative motion of C cores, this secondary circuit concentrates rotor leakage magnetic fields toward synchronous power.

At minimum gap, e.g., where core faces line up with magnets, maximum flux density saturates upper and lower core halves through four coils, wired in series for maximum voltage at leads L1 and L2. L1 connects to one leg of the three-phase wye (U, V, or W), L2 is the common connection (C). Each coil is wound with an identical number of insulated motor wire turns, of gauge and length appropriate for a given winding area. Voltage drops to zero as the core lines up with space between magnets, then full negative as cores align with magnets of opposite polarity, producing one AC cycle.

In this example design, the C core saturates easily in direct proximity with a magnetic pole pair, flipping rapidly with rotor motion. This means a narrow magnetic gap is not required for full voltage, which allows for looser mechanical constraints on rotor motion. This enhances the fault tolerance of the EiP wave machine, and reduces manufacturing costs.

2.2.4. Trapping and Concentrating Stray Rotor Flux

Peak axial flux linkage occurs at the moment of core saturation. Magnetic attraction between adjacent magnets produces a weaker magnetic field in both radial directions that traps radial flux at the rotor edge. Once the rotor is moving, leakage from fringing flux around the gap is swept up in this magnetic field by the C cores passing by, in phase with axial flux. Track curvature also creates a slight amount of transverse flux. C core laminations of different length oriented perpendicular to the movement of magnets, concentrates this relatively small amount of transverse flux. All leakage flux components, radial, fringing, and transverse, combine in sync with axial flux on every cycle, eliminating rotor harmonics at the magnetic circuit level. Magnetic fields synchronous with magnet poles rotate with respect to stator cores. Each C core in the stator pair concentrates flux and completes the magnetic circuit with respect to magnet pairs, producing pure three-phase sinewave AC with no harmonics.

Unlike other large PM machines with distributed windings, stray rotor magnetic fields and harmonics are not an issue when PMLSMs are combined because they connect at the DC link, with all AC components electronically filtered out. All rotor flux is concentrated at the PMLSM level, allowing the construction of a very large PM generator by adding modules, unlimited in efficiency by induction of stray magnetic fields.

When motoring, switchmode electronic inverting produces a waveform that is not purely sinusoidal. However, the aluminum rotor that holds the magnets is conductive, and a low-current non-sinusoidal potential exists between rotor and stator, which increases with speed. A contact (e.g., brush contact) is required that dynamically connects to chassis ground during all operations. The exemplary EiP wave machine uses two spring metal brushes mounted on copper attached to the inductor support frames, which remain in contact with the rotor at all times with low friction. This allows all non-sinusoidal motoring currents to follow the common ground path away from DC power output.

2.2.5. Exemplary Three-Phase Magnetic Circuit

Figure 2C:
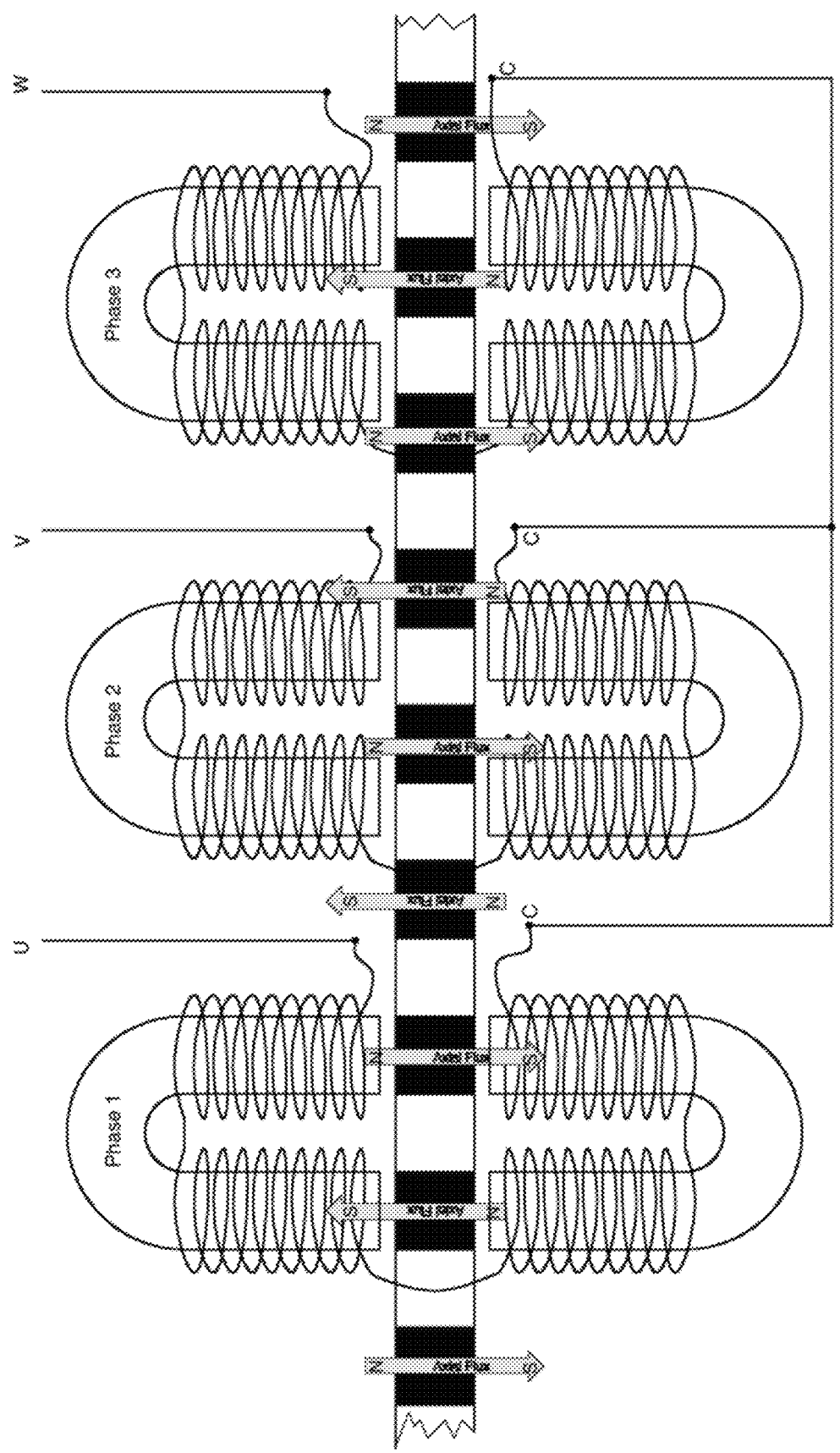
FIG. 2C shows a diagram illustrating an exemplary PMLSM three-phase magnetic circuit.

FIG. 2C shows a diagram illustrating an exemplary PMLSM three-phase magnetic circuit of the present technology. The diagram of FIG. 2C shows how three adjacent stators connect as a wye to form one PMLSM, and how they line up with axial rotor flux. The lower leg of each magnetic circuit is connected to a common point (C). Each upper leg of the wye (U, V, and W), attaches to EiP oscillator electronics (e.g., shown in Section 4).

2.3. Exemplary EiP Wave Machine Sizing and Expansion

EiP technology is naturally scalable to produce a very large interior permanent magnet generator. Self-similarity in structure at the modular, machine, and networked machine levels, supports a fractal pathway to expansion. This section describes some example design rules for EiP machine components, where a finite number of parts are replicated in certain patterns for expansion of EiP wave machine size and power. A key aspect of EiP technology is cost minimizing by simplification: producing more power from a small set of parts, replicated in specific ways to build the EiP wave machine. The most dramatic increase in power can occur when the radius is expanded.

Described here are how the exemplary sizing of the inductor core and windings is determined. Then, based on the optimum size of inductors and magnets, overall machine size expansion is described.

2.3.1. Magnet and C Core Design

The selection of magnet dimensions affects the size of EM components, which determines electrical power for one PMLSM. The rotor radius affects the number of magnetic poles for a given size of magnet. A rotor contains a certain number of magnets and layout, for example, for which EiP technology specifies the following design rules.

1. Eight magnets per three C cores, above and below.
2. C core faces match the footprint of one magnet pair.
3. The length of core legs is at least three times the space between.
4. The space between magnets around the rotor circumference equals magnet width.
5. Magnet length equals three times the width.
6. Magnet thickness equals width (and thickness of the magnetic rotor plate).
7. Magnets are polarized through their thickness, arranged in opposite axial pairs.

For example, an exemplary EiP wave machine can be configured to have a magnetic track built using 160 NdFeB magnets. The magnet size is 2 inches long polarized through ½ inch thickness, embedded around the rotor separated by ½ inch. C core faces are 2 by ½ inch, with ½ inch between 1½ inch legs. The arrangement of magnets results in a rotor diameter of 55 inches, supporting enough inductors for 20 three-phase PMLSMs. Section 3 of this patent document provides more information on the magnetic rotor physical characteristics.

For example, both magnets and C cores are commodity items, chosen for lower cost and optimal motor magnetics. The EiP magnetic design captures and concentrates leakage and fringing flux that results from using low cost magnetics, with optimum efficiency.

2.3.2. Inductor Core Windings and Fill Factor

The number of stator core windings can be determined by the absolute amount of insulated copper wire that can be fit around C-core legs. For example, using mean length of turns (MLT) method for a given wire type, total inductance (and power) is determined by number of windings, the length of each defined by core dimensions. Long wire length at a certain thickness offers higher DC resistance, which impedes magneto-motive force. To reduce these effects, a larger gauge wire must be chosen. Since the winding area is finite, the optimum number of windings depends on the fill factor: the relative amount of bare copper in the winding window divided by the window cross-sectional area.

Figure 2D:
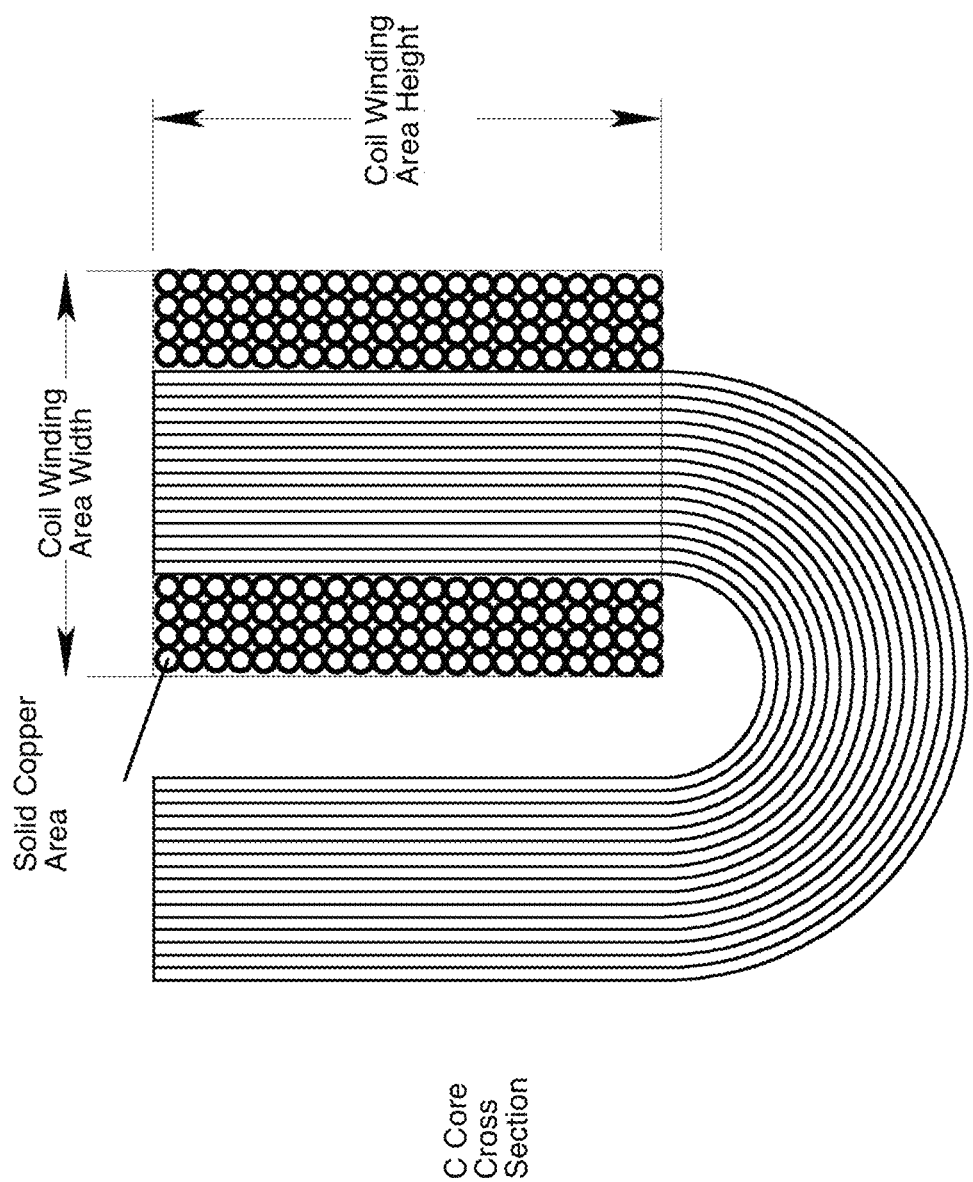
FIG. 2D shows a diagram showing a cross section of an exemplary C core and fill factor.

In such implementations, for example, a fundamental design rule is to expose the maximum amount of bare copper at any given instant to rotor magnetic fields. Each gauge and type of insulated motor wire offers a certain fill factor for a given core size. Using the cross-sectional area of the wire and insulation from its data sheet, divided into the available winding window area reveals how may half turns. Multiply the amount of bare copper in the wire cross-section by this number, and divide that by the window area, for the fill factor. Calculating for a range of wire types and gauge, compare all the combinations and select the highest fill factor with the lowest DC resistance, and the maximum corresponding number of turns. This guarantees maximum performance from the coil, for a certain size C core. FIG. 2D shows a diagram of an exemplary C core and fill factor. The diagram illustrates a cross section of C core laminations and one coil, and the winding cross-sectional area.

For some exemplary embodiments of the EiP wave machine using 16-gauge wire, for example, the fill factor is 0.66 (⅔) for a total number of windings of 96 per C core leg. If 14-gauge square wire is used, the fill factor is 0.85 with 60 turns per leg. The one with the highest fill factor and lowest DC resistance (DCR), which exposes the maximum amount of copper to rotor magnetic fields, is best for generating. However, the one with the highest number of windings and lowest fill factor is best for motoring. Since EiP technology involves motoring and generating, the optimum formula for a given core size may be found through testing of the two best designs. Table 2-1 shows the various combinations of wire size that fit the exemplary C core legs, along with corresponding wire turns, fill factor, and total DCR.

TABLE 2-1

Wire Size and Fill Factor Combinations

| Wire Gauge and Type | # Turns per Leg | Fill Factor | DCR |
|---|---|---|---|
| #10 | 25 | .70 | .0294 Ω |
| #12 Square | 32 | .72 | .0560 Ω |
| #12 | 32 | .56 | .0672 Ω |
| #14 Square * | 60 | .85 | .150 Ω |
| #14 | 60 | .66 | .166 Ω |
| #16 ** | 96 | .66 | .404 Ω |
| #18 | 148 | .65 | 1.02 Ω |
| #20 *** | 205 | .62 | 2.6 Ω |

* Lowest DCR with highest fill factor.
** Highest winding number with lowest DCR.
*** Maximum windings for best MMF using this example core size.

2.3.2. Radial Expansion

The exemplary EiP wave machine optimizes the magnet and winding formula for one C core size, for a modular structure that can be replicated for a larger radius of magnetic rotor.

The rotor is geometrically resized for more power, at certain increments that fit installed modules. For much larger rotors, or other applications, like a wind machine rotor, or a powered propeller for a ship, the optimal magnet/inductor size may differ.

Figure 2E:
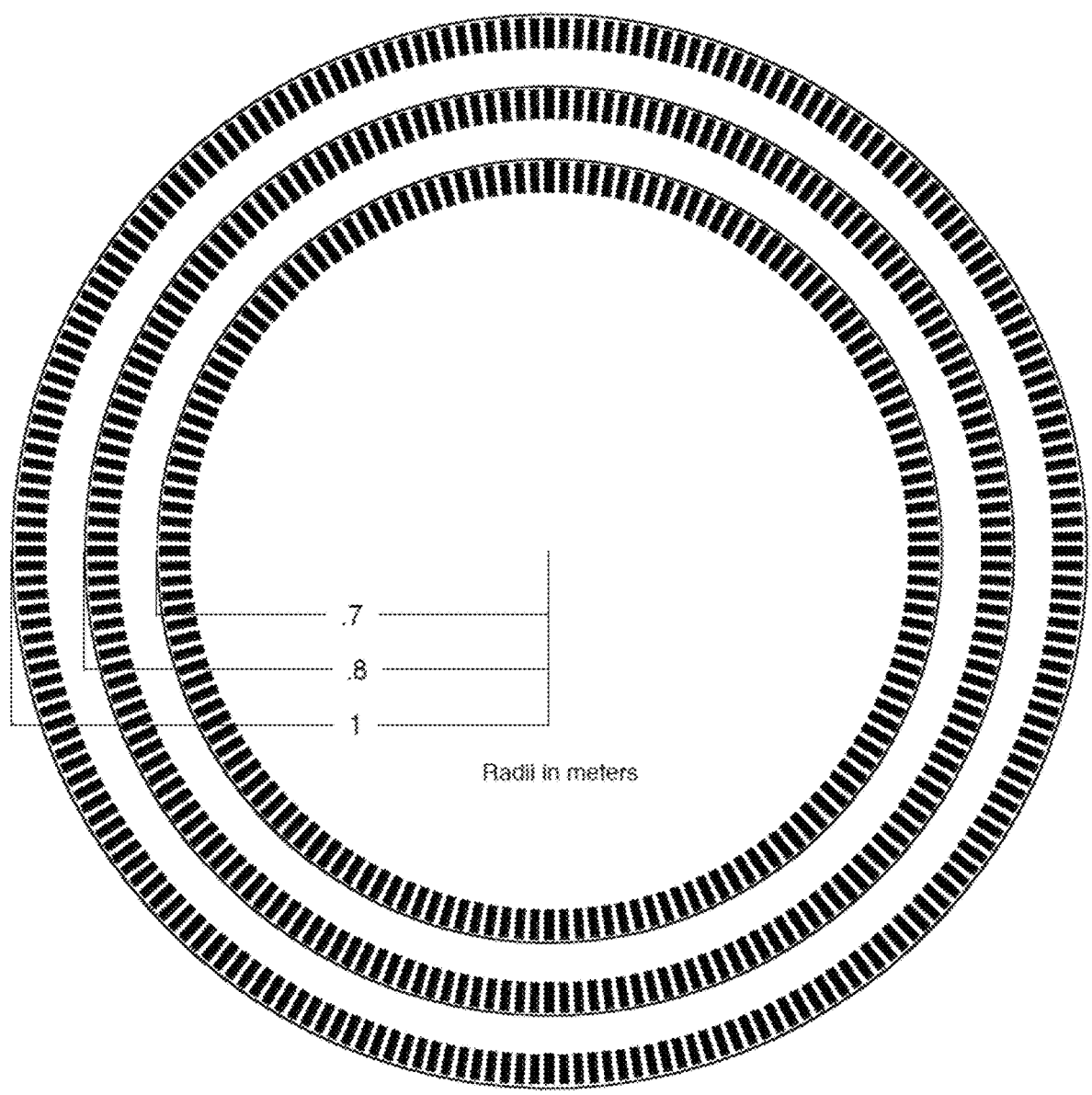
FIG. 2E shows a diagram of an exemplary magnetic rotor expansion using identical magnets and pole pitch.

Increasing the size of magnets and cores with machine radius is one way to increase electromagnetic power. But, losses from eddy currents in larger inductors present an upper limit to inductor size. Balancing all factors produces a set of components for a PMLSM with optimum power output. These smaller PMLSMs are replicated for radial expansion providing the most dramatic increase in total power. Once a PMLSM size has been chosen, simply using a longer magnetic track that fits more PMLSMs (e.g., minimum 4 means adding 32 magnets), expands the size and power of an EiP machine. This technique allows the creation of very large radius rotors. For magnet and inductor sizing used in the exemplary embodiment of the EiP wave machine, every integer multiple of 32 magnets expands the rotor radius by approximately five inches, accommodating four additional PMLSMs. The pole pitch remains constant for each configuration. Using this technique, EM torque matches or exceeds mechanical torque as the radius expands, along with more magnetic poles to maintain synchronous operation at slower speed. FIG. 2E shows a diagram of an exemplary magnetic rotor expansion using identical magnets and pole pitch. The diagram illustrates magnetic rotor expansion, for additional 32 magnets of the size.

2.4. EiP Oscillation

The EiP oscillation is self-sustaining, representing all of combined electrical and kinetic energy in an EiP machine, where rotor speed and DC link voltage periodically rise and fall to maintain power balance. As rotor speed increases, either from reduced load or high airflow, total energy potential increases. As the rotor decelerates under load, it is hyper-sensitized to sudden changes in airflow speed that bolster energy uptake. When total energy is greater than load, rotor speed moves up and down under EiP oscillation, at fixed DC link voltage. EiP oscillation also applies to spontaneous networks of EiP wave machines, when storing and sharing power on the grid.

2.4.1. Van Der Pol Model

The EiP oscillation follows the Van Der Pol Model, where a parasitic oscillation draws in energy from the system in which it occurs. The Van Der Pol model is characterized by the following differential equation, Equation 2-2, which represents the Van Der Pol Differential Equation:

$$x''+x=\varepsilon(1-x^2)x' \text{ for } \varepsilon>0 \quad \text{(Eq. 2-2)}$$

Equation 2-2 produces one periodic solution: a relaxation oscillation with a stable limit cycle. In the disclosed EiP technology, x represents a continuous function for EiP machine power, and c corresponds to the period of oscillation. The period is locked to harmonics of rotor speed: at a dead stop, x equals zero and E is infinite. As rotor speed increases, x increases while decreases (but always >>one). When the non-linear term $\varepsilon(1-x^2)$ x' reaches the singularity where the periodic solution to the equation is found (for a given ε), an oscillation with a stable limit cycle occurs. The limit cycle is attracting toward the singularity, in this case drawing energy from the system in which it occurs. At rotor operating speeds (larger ε) the single periodic solution to the Van Der Pol equation describes a relaxation oscillation that quickly jumps from a smooth curve to another and back again, as depicted in FIG. 2F.

Figure 2F:
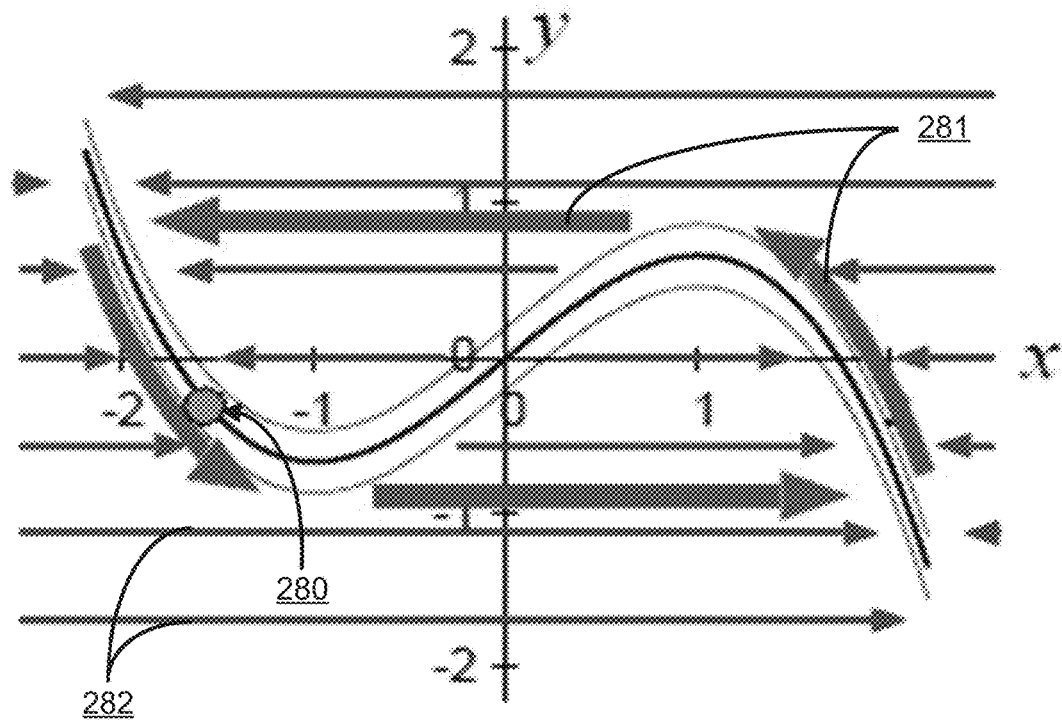
FIG. 2F shows a diagram of van der pol oscillation.

FIG. 2F shows a plot of Van Der Pol oscillation limit cycle. The plot shows the attractor for oscillation limit cycle, where the dot 280 follows the wide arrows 281 from the smooth curved part to the peak then quickly across to the start of a new half cycle. The thin arrows 282 indicate the proportions of energy drawn from the system in which the oscillation occurs.

2.4.2. Relaxation Oscillation Period

The Van Der Pol oscillation period T can be broken down into two parts: smooth and quick, as shown in the following equation, Equation 2-3, which represents the Van Der Pol Oscillation Period:

$$T=(3-2 \log 2)\varepsilon+\eta(\varepsilon^{-1/3})$$

Smooth+Quick  (Eq. 2-3)

In the disclosed EiP technology, for example, the smooth part represents energy from airflow and inertia, while the quick part represents power injected to maintain rotor speed. The period is locked to a harmonic of rotor magnetic transition speed. Since total energy is a function of time, the relative amount of injected power required is very small within a single cycle (e.g., linear log function vs. negative cubic exponential function). EiP technology maintains this relationship over the full range of rotor speeds (e.g., smaller £), where a greater portion of the oscillation period is powered by inertia as rotation speed increases.

2.4.3. Negative Resistance Oscillator

Figure 2G:
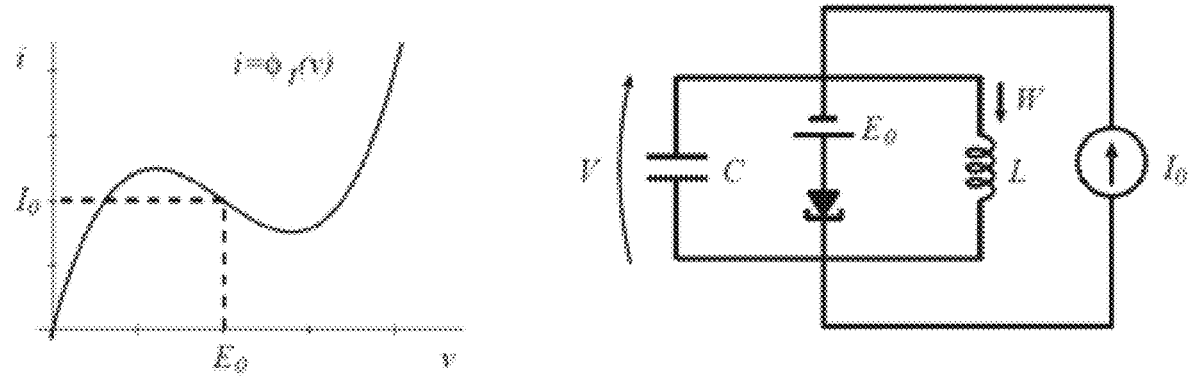
FIG. 2G shows a diagram of an exemplary negative resistance oscillator.

For example, the Van Der Pol model was developed by observing the oscillations from an electronic circuit for the negative resistance oscillator, as shown in the diagram of FIG. 2G. FIG. 2G shows a diagram of an exemplary negative resistance oscillator of the present technology. This exemplary circuit oscillates at a specific frequency based on L and C. At this frequency, the oscillation is self-sustaining and attracting. In the negative resistance oscillator, $E_O$ from the tunnel diode is drawn along with $I_O$ from the battery supply to power the oscillation. The capacitor and inductor store enough energy to power the quick part of the oscillation period.

2.4.4. EiP Oscillator

Figure 2H:
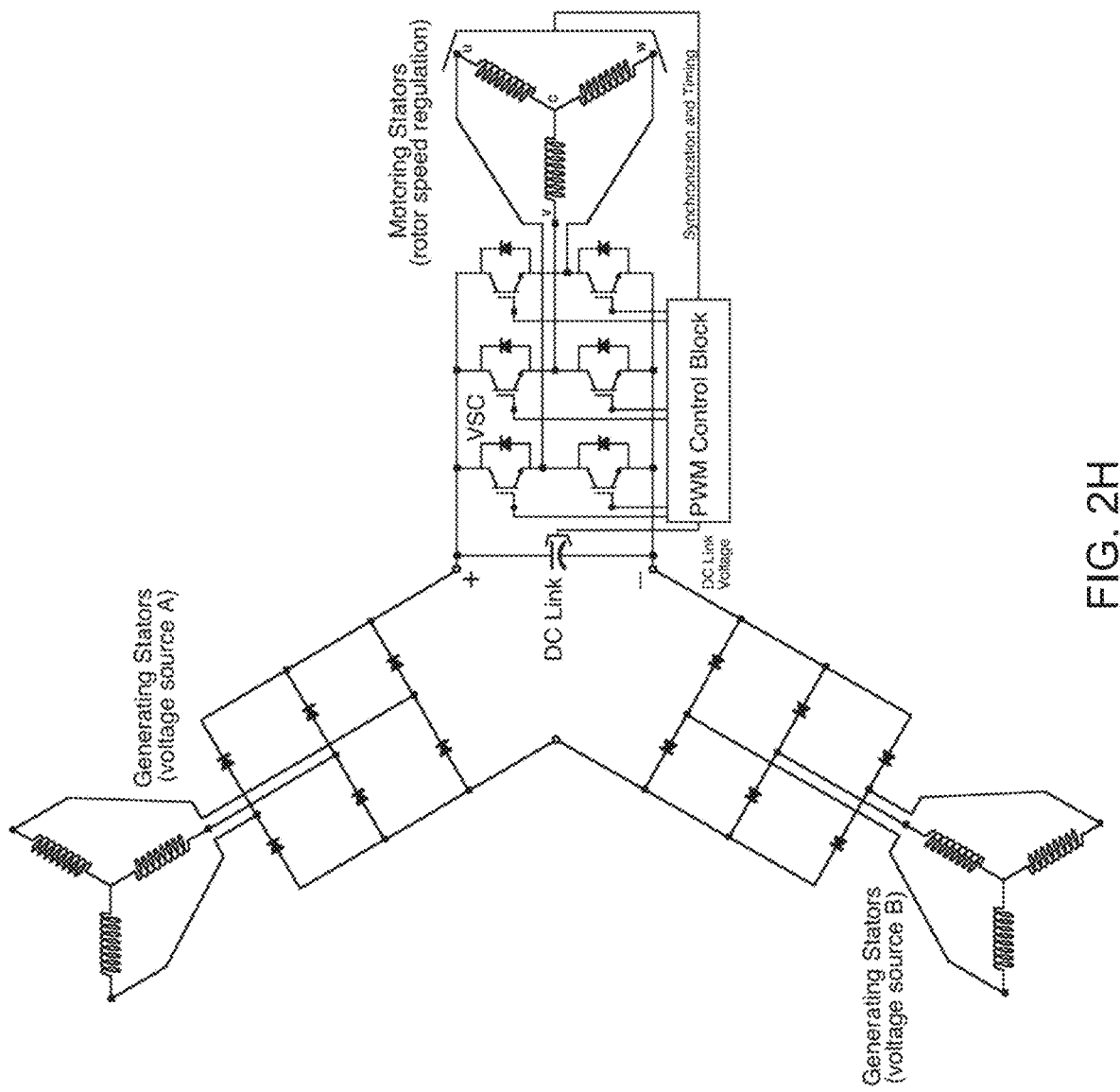
FIG. 2H shows a pseudo-schematic of an exemplary minimal EiP oscillator.

The minimum amount of circuitry required for an EiP oscillator may be more complex. The EiP wave machine is wired to produce necessary DC voltage using identical stator inductors. The output of three-phase rectifier circuits are stacked in series, with each one producing DC equivalent to peak AC voltage with small amount of ripple at 6x AC frequency plus non-sinusoidal currents. Motoring stators are powered by a fraction of output voltage which is fed back to the DC bus of a VSC. Intelligent control of the VSC is done by analyzing ripple currents and performing rotor flux estimation techniques. EiP oscillation occurs when generating stators sustain motoring stators, while the rotor is powered by direct torque control. FIG. 2H shows a pseudo-schematic of an exemplary minimal EiP oscillator, where power from a minimum number of generating stators connect with motoring stators.

The drawing of FIG. 2H shows a minimum number of generating PMLSMs with rectifiers, enough to support the DC link for the voltage sourced converter (VSC) circuit in the motoring PMLSM. Rotor magnetic fields pass through the generator phases, at a certain speed the DC link voltage is always higher than required by the motoring VSC. The EiP oscillation sustains the DC link, with net zero torque, along with a substantial amount of kinetic energy from accumulated rotor inertia. Change in rotor speed represents energy potential equal to the electrical load offset by wave energy uptake. During EiP oscillation, periodic fluctuation in rotor speed at constant DC link voltage powers all connected loads along with the oscillation, drawing in energy from inertia, in a similar way to the Van Der Pol model. EiP oscillation continues indefinitely until rotor speed drops below a certain threshold, where external power can be introduced to sustain oscillation if the EiP machine is networked with others.

The exemplary EiP architecture is flexible and adaptable to a wide variety of large radius electrical machines, from motors to generators. For example, EiP oscillator modules can be stacked where the total number of stators is divided into motoring and generating groups depending on what the application requires. The EiP wave machine can be operated strictly as a generator, which is able to produce maximum voltage for long wire runs to shore. So, only one PMSLM is used for motoring inertia control, for example, while all others are stacked for maximum DC voltage from a given radius machine. The EiP oscillator and VSC architecture as applied to the exemplary EiP wave machine are described in further detail in Section 4.

2.5. EiP Operating Modes

The disclosed technology includes three operating modes: coasting, motoring, or generating. Diode rectifier bridges attached to each stator produce a DC voltage that increases with rotor speed: with no load attached, the "coasting" operating mode. Parallel transistor switches control the rectifier as a VSC, to produce positive torque that speeds up the rotor: "motoring" mode. Negative electromagnetic torque from electrical loading slows the rotor: "generating" mode. A fourth operating mode is defined when parallel PMLSMs are motoring and generating: "oscillating" mode. EiP technology includes these operating modes to provide software a feedback mechanism for networking and fine-tuning of the system, as summarized in Table 2-2.

TABLE 2-2

EiP PMLSM Operating Modes

| Mode | Definition | Indication |
|---|---|---|
| 0 | Coasting | Voltage rises with rotor speed until motoring or generating. |
| 1 | Motoring | High instantaneous torque power for startup and speed regulation. |
| 2 | Generating | Power production when electrical loads produce negative torque. |

TABLE 2-2-continued

EiP PMLSM Operating Modes

| Mode | Definition | Indication |
|---|---|---|
| 3 | Oscillating | One PMLSM motoring while two or more are generating, creating the conditions for EiP oscillation. |

2.5.1. EiP Mode Control

Each motoring PMLSM operates from a set of parameters, some for control, others for status. A central controller device globally initializes motor parameters on startup, then monitors status parameters to determine the operating mode. Running autonomously, and in parallel, PMLSM electronic control happens much faster than air speed and load changes, so there is ample time to monitor operating modes and fine-tune parameters. Under heavy loading and higher rotor speed, for example, all PMLSMs are in generator mode, and slow the rotor. Under reduced load and absence of airflow, one PMLSM may switch to motoring to keep up rotor speed while another is generating. When an individual PMLSM controller encounters an exception to parameter settings, like rotor overspeed with no load, it will coast until normal limits are restored.

At a certain point, the balance of power lets EiP oscillation take control. The random interactions of all installed PMLSMs allow the EiP oscillation to naturally arise from chaotic and turbulent operating conditions, like any non-linear phenomenon. Once oscillating, the EiP machine has greater power potential, backed by the natural behaviors of parasitic oscillation described above.

To configure the EiP wave machine for greater power uptake, for example, more PMLSMs are dedicated to motoring. For installations with greater airflow availability, only one PMLSM is used for motoring, while all others are dedicated to generating.

All motoring PMLSMs in an EiP wave machine can share a common network hardware connection, like RS485, for parameter configuration and monitoring. Remote monitoring software receives packets of data, with the operating mode as header along with other real-time information, e.g., voltage, current, temperature, etc. Over time, the configuration is fine tuned to obtain maximum energy from the installed location, using EiP operating mode packets.

2.5.2. Networked EiP Wave Machine Operating Modes

In an EiP wave machine spontaneous network, operating mode/status packets provide a way to synch up with other machines on a common grid segment. The EiP operating mode has a fractal quality, with self-similarity at the module, machine, and network levels. On the network, EiP modes indicate the following:

Mode 0—Coasting, or offline.
Mode 1—Motoring, accepting incoming grid power.
Mode 2—Generating, providing power for the grid.
Mode 3—Oscillating, indicating surplus stored power.

For more information refer to the "System Architecture" and "Programming" sections of this patent document.

2.5.3. PMLSM Motor Parameters

Each PMLSM can be controlled like a rotary three-phase machine in a factory environment. For example, manufacturers of three-phase drives define a set of parameters for fine-tuning of machine operations. The first three parameters are determined from the size of inductors, with values calculated using coil formulas or by direct measurement. The motor nameplate frequency represents the nominal synchronous AC input frequency. PM pole pitch is the distance between pole pairs in the magnetic track. The motor force constant and PM flux linkage are calculated using the equations in the "Power Calculations" section (Section 2.6).

2.5.4. Energy Balance Through Simple Speed and Voltage Regulation

Figure 2I:
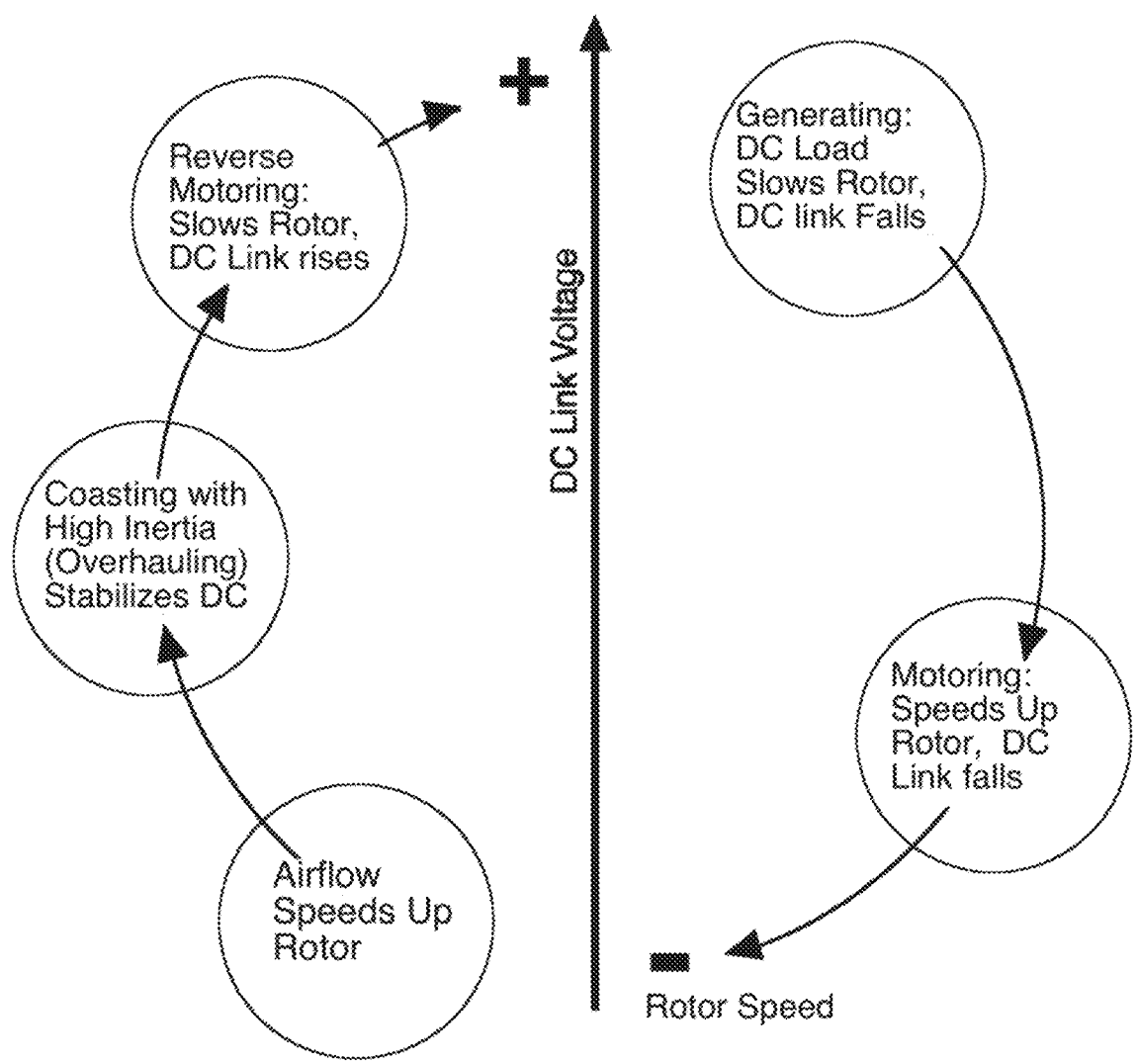
FIG. 2I shows an exemplary diagram depicting the essential EiP energy imbalance.

Once up and spinning, the DC link voltage reaches a level where autonomous voltage and speed regulation in the motoring PMLSM takes hold. Rotor speed is regulated by the PMLSM, using forward and reverse motoring operations. Electrical loading of the DC link and airflow uptake occurs at random moments, while motoring torque regulates rotor speed, to maintain the DC link voltage as shown in FIG. 2I. FIG. 2I shows an exemplary diagram depicting the essential EiP energy imbalance.

The disclosed EiP technology actively manages the differential imbalance between wave energy uptake, inertia, and load, through quick motoring operations in response. As rotor speed increases from wave energy uptake and/or forward motoring, excess energy from inertia (overhauling) builds up to a point where greater loading is required to lower the DC link voltage. PMLSM motoring maintains rotor speed (and inertia) while lowering the DC link voltage. Electrical loading on the DC link drops the voltage and decreases rotor speed, while high inertia tends to keep the rotor at speed. PMLSM regulation operations provide instant thrust force in both directions, managing rotor movement to keep the DC link at a constant level while delivering power to loads. When inertia plus wave energy is greater than electrical loading, DC link voltage can no longer be maintained, and the essential imbalance becomes chaotic, allowing the EiP oscillation to naturally manifest as periodic rotor speed and/or DC link voltage fluctuations.

2.6. Power Calculations

This section provides equations for determining total power of an EiP wave machine: from inertial, electromagnetic, and wave sources.

2.6.1. Rotational Inertia

The exemplary EiP machine magnetic rotor can include a flywheel where the stored energy equals the sum of kinetic energy of individual mass elements, which can be calculated using the following equation, Equation 2-4: Magnetic Rotor Kinetic Energy Equation:

$$KE_R = 1/2 I_R \omega^2 \quad \text{(Eq. 2-4)}$$

where: $I_R$=Magnetic rotor moment of inertia, which is the ability to resist changes in rotational velocity, in this case, to maintain rotor speed under sudden changes in electrical loading; and where: $\omega$=Rotational velocity (rpm) of the rotor.

The magnetic rotor element is basically a hollow cylinder of uniform density with thick walls, for which the moment of inertia can be calculated using the following equation, Equation 2-5: Magnetic Rotor Moment of Inertia Equation:

$$I_R = 1/2 m(r_1^g + r_1^2) \quad \text{(Eq. 2-5)}$$

where: m=Rotor mass in Kg; $r_1$=Inner rotor radius; and $r_2$=Outer rotor radius.

However, the magnetic rotor element is actually formed in three layers, one of which is of different density. For a precise determination of the moment of inertia from the density of materials, use the following equation, Equation 2-6: Magnetic Rotor Layer Moment of Inertia Equation:

$$I_L = 1/2 \pi \rho h (r_2^4 - r_1^4) \quad \text{(Eq. 2-6)}$$

where: $\rho$=Rotor layer material density in Kg/m³; and h=Rotor layer thickness in meters.

The entire rotor inertia is the sum of the inertias for each layer, plus instantaneous airflow force. Note that as the radius increases, inertia exponentially increases. Traditional flywheels for energy storage and production operate using a small radius with low moment of inertia that spins at extreme speeds. Unlike high-speed flywheels, the EiP machine leverages a large radius and high moment of inertia, which operates only slow speed. In both cases, total energy storage increases with the square of angular velocity. In the EiP flywheel, high inertia means that even though it spins slowly, peak power output is naturally enhanced although storage time is less. EiP technology leverages instant power from high inertia for increased total energy storage through electronic oscillation.

2.6.2. Inertial Power in EiP Oscillation

Power from inertia builds up as rotor speed increases. The speed change represents a certain amount of power, as shown in the following equation, Equation 2-7: Total Inertial Power Equation:

$$W = I_R (\Delta rpm \, 2\pi/60)^2 \quad \text{(Eq. 2-7)}$$

where: W=Power in Watt-seconds; $I_R$=Rotor inertia in Kgm²; and $\Delta$rpm=change in angular velocity, as the rotor slows down under load or increases with airflow energy uptake.

The power recovered from inertia is equal to the downward change in rotor speed under electrical load. If the rotor is allowed to slow all the way down, the total power capacity in the rotor is recovered. In the EiP wave machine, the speed is allowed to oscillate up and down, constantly storing and withdrawing inertial power to maintain DC link voltage. As wave energy and electrical loads fluctuate wildly, the rotor slowly speeds up and slows down at a frequency determined by parameter settings for each installed PMLSL. The EiP oscillation amplitude (peak power) corresponds to twice $\Delta$rpm, representing the power in both directions.

2.6.3. Energy Stored In Magnetic Fields

Electromagnetic power in the EiP machine comes from rotor magnetic fields, concentrated by C cores through an air gap, which abruptly pass through copper windings, freeing electrons and inducing current in the coil. As the speed of flux transitions increases, the greater the current density. From the permanent magnets embedded in the rotor, the lines of flux do not weaken over time because of the large amount energy that creates them, as shown by the following equation, Equation 2-8: Magnetic Field Power Equation:

$$W_V = B^2/2\mu \quad \text{(Eq. 2-8)}$$

where: $W_v$=Power stored in magnetic flux; $\mu$=Permeability of the magnetic gap and C core; and B=Flux density of one rotor magnet.

For example, for each rotor magnet, the flux density of NdFeB and high permeability C core produce high energy magnetic fields. Multiplied by the number of magnets in the rotor, total flux reveals a tremendous amount of energy potential, which explains why motoring PMLSMs produce a large electromagnetic torque response from a relatively small input.

2.6.4. Electromagnetic Power and Torque

The mathematical model of each PMLSM is based on equations describing stator voltage, flux linkage, power, and thrust force (torque). Each PMLSM is treated like a rotating four-pole three-phase synchronous machine. The electromagnetic torque and flux linkage of each PMLSM adds up for total power. The model follows the direct-quadrature (d-q) axis convention, using rotor magnetic fields as the rotating frame of reference. When using the d-q frame, the model becomes much simpler, and standard DTC techniques for a rotating machine work perfectly with the linear implementation. Essentially the d-q frame represents the conversion of three phases to two, using only simple equations for flux linkage vs. magnetic frequency.

2.6.4.1. Stator Voltage Calculations

Total power from an EiP machine is the sum the power for each PMLSM. Unregulated stator voltage increases with rotor speed along with total power, calculated using the following equations, Equation 2-9: d-q Frame Stator Voltage Equations:

$$u_d(t) = Ri_d + d\psi_d/dt - \omega\psi_q$$

$$u_q(t) = Ri_q + d\psi_q/dt - \psi_d$$

$$P_{in} = 3/2(u_d i_d + u_q i_q) \qquad \text{(Eq. 2-9)}$$

where R is the wire resistance of stator windings, in is the stator current vector, to is the AC frequency, and $\psi_n$ is the flux linkage vector.

2.6.4.2. Flux Linkage Calculations

Power is transferred between mechanical and electrical domains by interlocked lines of magnetic flux from permanent magnets and copper inductors wrapped around magnetic steel. Flux linkage on d and q axes is calculated using the following equations of Equation 2-10: d-q frame Flux Linkage Equation:

$$\psi_d = L_d i_d + \psi_{PM}$$

$$\psi_q = L_q i_q \qquad \text{(Eq. 2-10)}$$

where $L_n$ is the stator inductance and $\psi_{PM}$ is the permanent magnet flux linkage.

2.6.4.3. Electromagnetic Power and Thrust Force Calculations

EM power represents how much power the EiP machine can generate in response to mechanical power from the rotor. Thrust force is the linear equivalent of instantaneous torque in a rotating machine. From the flux linkage and stator voltage values, EM power and thrust force can be calculated for each PMLSM using the following equations, Equation 2-11: Three-phase Power and Thrust Equations.

$$P_{EM} = 3/2\omega[\psi_{PM} + (L_d - L_q)i_d]i_q$$

$$F_{Thrust} = 3/2\pi/\tau[\psi_{PM} + (L_d - L_q)i_d]i_q \qquad \text{(Eq. 2-11)}$$

where $\tau$ is the PM pole pitch, which is the physical distance between pairs of axially polarized permanent magnets on the magnetic track. In the EiP machine PMLSMs operate in sync with each other around the rotor to form one large machine with the sum of power and thrust.

2.6.5. Mechanical vs. Electromagnetic Torque

On the standard Wells turbine, the central shaft restricts instantaneous torque applied to the generator as the rotor radius is increased; only a fraction of total torque is allowed before twisting or breaking the shaft. In the EiP wave machine, mechanical torque is unlimited by a central shaft, so the transformation to electromagnetic torque is one to one. This means that all rotor torque ($T_{Rotor}$) has an electromagnetic equivalent, where positive mechanical torque from rotor thrust force is offset by negative electromagnetic torque from PMLSM thrust force. The following equations, Equations 2-12 Wind vs. Three-phase Thrust Force Equations, which show the thrust force that can be generated by the rotor and PMLSM with respect to Wells turbine performance coefficients for pressure ($\Psi$), torque ($\Pi$), and efficiency ($\eta$):

$$\Psi = \Delta p/\rho\omega^2 r^2$$

$$\text{Å} = T_{Rotor}/\rho\omega^2 r^5$$

$$\eta = T_{Rotor}\omega/\Delta pQ \qquad \text{(Eq. 2-12)}$$

where: $\rho$=density of air; $\omega$=rotor speed; r=rotor radius; and $T_{Rotor}$=rotor mechanical torque.

Note that when performance coefficients are calculated for a given Wells rotor radius, $T_{Rotor}$ increases dramatically with turbine size, to a point where EiP technology is required to provide electromagnetic torque for rotor speed control.

$$F_{3\text{-}phase\ Thrust} = 3/2\pi/\tau[\psi_{PM} + (L_d - L_q)i_d]i_q \qquad \text{(Eq. 2-13)}$$

where: $\tau$ is the PM pole pitch; $L_n$ is the stator inductance; $\psi_{PM}$ is permanent magnet flux linkage; and $i_n$ is the stator current.

PMLSM thrust force, multiplied by the rotor radius r, defines the torque response which is directly converted to power in balance with $T_{Rotor}$.

3. Mechanical Specification

The mechanical design for the exemplary EiP wave machine includes features and principles including, for example, strength, fault tolerance and reliability in an ocean environment; buildable design using basic fabrication techniques and common raw materials; and a modular and expandable design supporting quick field service and upgrades.

Examples are described and diagrams are shown based on specifications of some exemplary embodiments, e.g., representing a small or minimum size of an exemplary EiP wave machine, which is readily expandable to much greater size and power.

3.1. Mechanical Overview

The exemplary EiP wave machine described in this section includes two mechanical parts: one moving and one stationary. The moving part is the rotor, which can include an integrated Wells turbine hub and blade assembly, high inertia flywheel, and magnetic rotor containing multiple oppositely polarized magnets (e.g., NdFeB bar magnets) laid out as a magnetic track near the outer flywheel circumference. The stationary part can include a housing for rotor bearings, stationary inductors, and electronics.

In some implementations, the exemplary EiP wave machine can be constructed in two halves. Each half provides a housing for a field-serviceable bearing support for one side of the flywheel, and one half stator array with electronics and wiring. The rotor/flywheel assembly can be inserted into one assembled half, with non magnetic shims inserted between magnets and inductors to maintain the proper gap. The other half is installed with shims and both halves are secured. Shims are removed and the two halves are "strapped" together.

3.2. Exemplary EiP Machine Mechanical Design

Figure 3A:
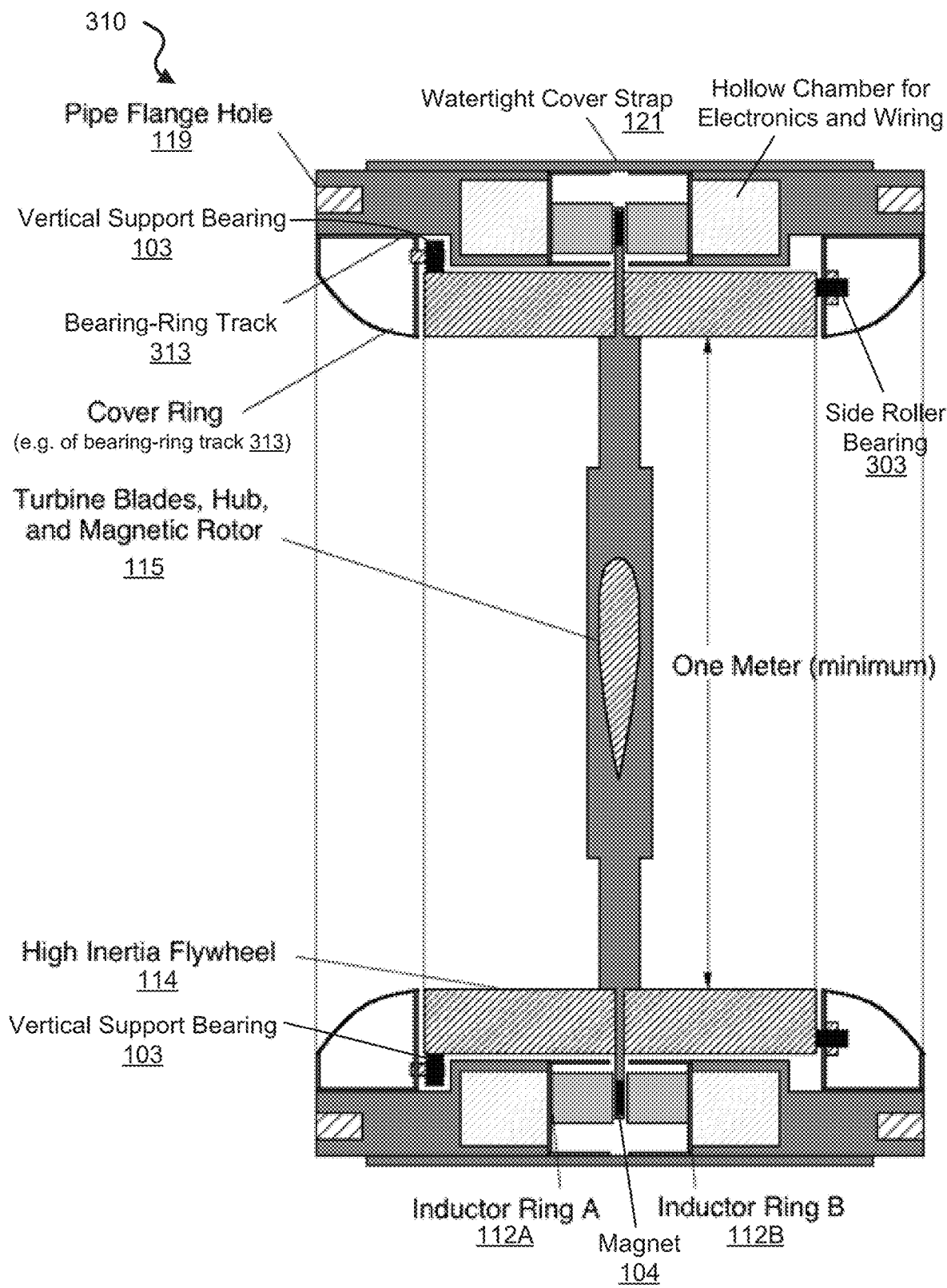
FIG. 3A shows a cross sectional diagram of the exemplary EiP wave machine.

This section describes each part of the exemplary EiP wave machine. The mechanics integrate a Wells turbine rotor and high-inertia flywheel with power generation in a unique design, using only one moving part. Stainless steel rings position stator pairs on each side of the magnetic rotor, and roller bearings guide and support the flywheel edges. For example, the EiP wave machine has no drive shaft. The hollow center provides a clear path for airflow to exit the turbine, for greater pneumatic power efficiency. A fault-tolerant mechanical design eliminates the centralized generator shaft and main bearing. FIG. 3A shows a cross sectional diagram of an electronic inertial power generation unit 310 of an exemplary EiP wave machine, with some of the same or similar features as that shown in FIG. 1B. For example, the electronic inertial power generation unit 310 includes a set of vertical bearings 103 coupled to the side plate of the bearing-ring track 313 and a set of side rollers or bearings 303 that protrude through a hole in the side plate of the bearing-ring track 313, in which the bearing-ring track is mounted to the support base of the frame 111, e.g., by brackets on an opposite side to secure the bearing shaft.

The following description describes some example specifications of subassemblies, e.g., each appearing under its own subheading: rotor and flywheel, inductor rings, housing, and bearing rings.

3.2.1. Rotor/Flywheel Assembly

Figure 3B:
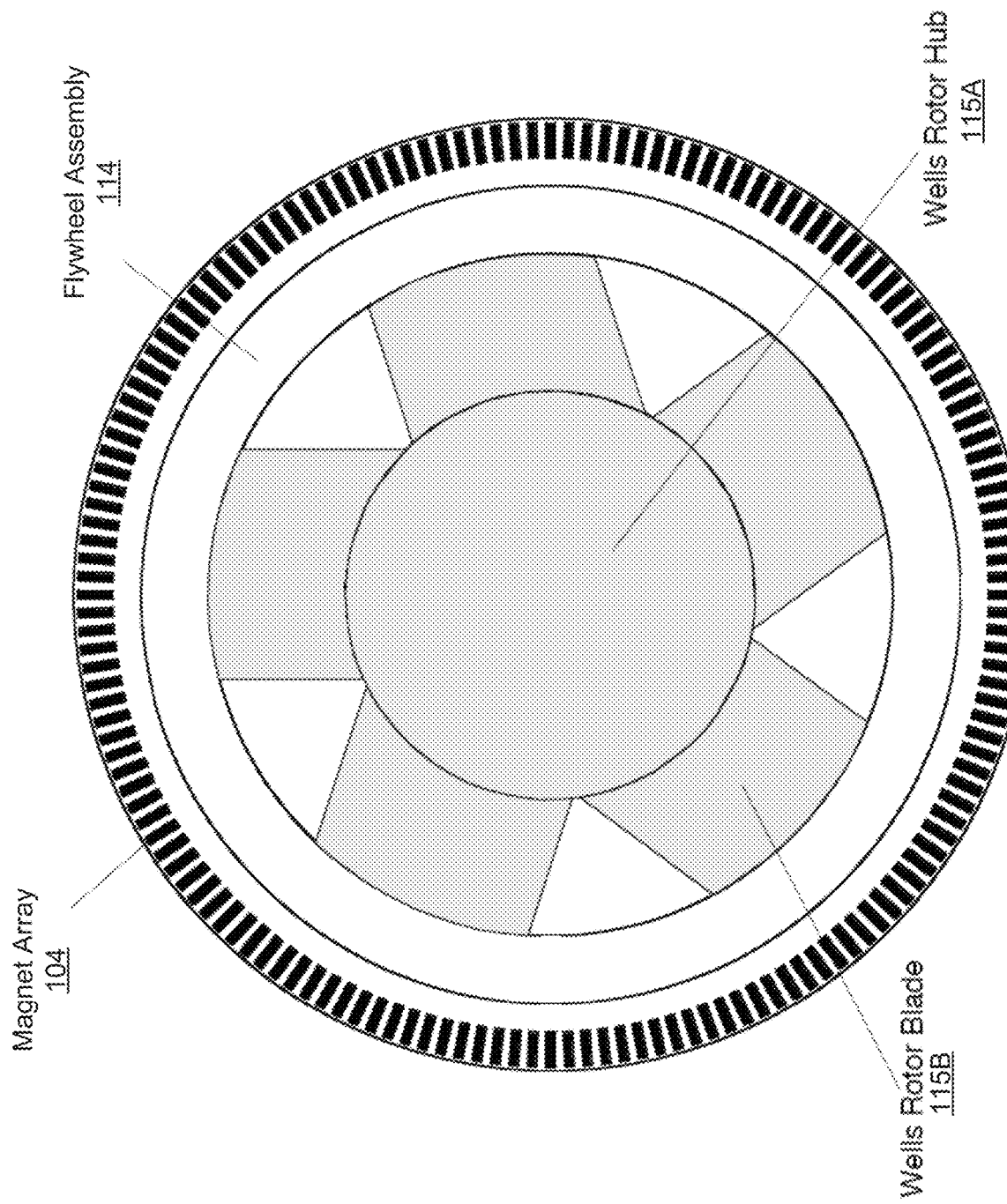
FIG. 3B shows an axial view diagram depicting the exemplary magnetic rotor, high-inertia flywheel, and Wells rotor of an exemplary EiP wave machine.

FIG. 3B shows an axial view diagram depicting the exemplary magnetic rotor, high-inertia flywheel, and Wells rotor of an exemplary EiP wave machine.

The magnetic rotor can be configured as an annulus of magnet thickness, which protrudes from the flywheel, providing an array of permanent magnets around the outer circumference. In some embodiments, for example, neodymium iron boron magnets, of alternating axial polarity, are attached (e.g., can be glued) in place around the magnetic rotor (e.g., using high peel strength epoxy). The array of magnets of the magnetic rotor concentrate axial flux above and below the rotor, while producing minimal radial flux.

In some embodiments, for example, the high inertia flywheel is formed by two thick-walled cylinders made of high density material, with inner part of the magnetic rotor annulus sandwiched in between. This forms a source of inertia for the rotor, to steady rotor speed in an oscillating airflow. For example, the high density material of the flywheel halves can include cast epoxy resin, or an aluminum casting. In some implementations, for example, flywheel halves could also be made of cast concrete. In some implementations, for example, it is also possible to fabricate the flywheel in layers of cut sheet metal of a certain thickness like ½" stainless steel, stacked and bolted together to form a hollow cylinder. The common property is that the high density material should be non-magnetic. The absolute density of material depends on the size of the machine, and what the desired moment of inertia should be.

A Wells-type rotor is attached to the inner radius of the flywheel. In some embodiments, for example, the Wells-type rotor includes a hub with symmetrical airfoils (e.g., NACA 0020) attached, with chord lines parallel to the axis of rotation. It can be of a high solidity design with the inner surface of the flywheel providing endplates for the blades, for maximum pneumatic efficiency.

In contrast, for example, a standard Wells turbine has the hub support a central shaft that drives an inline generator. A nose cone is added to reduce turbulent flows that reduce efficiency. In the disclosed EiP wave machine technology, the hub is a simple disk of greater thickness than rotor blades. Since there is no shaft or generator, air friction on the rotating surface of the flywheel and hub eliminate turbulence on inflow. Outflow is enhanced because the center is open behind the hub, allowing turbulent flows on the backside of the rotor blades to coalesce into a wake vortex, creating a greater pressure drop between input and output.

Figure 3C:
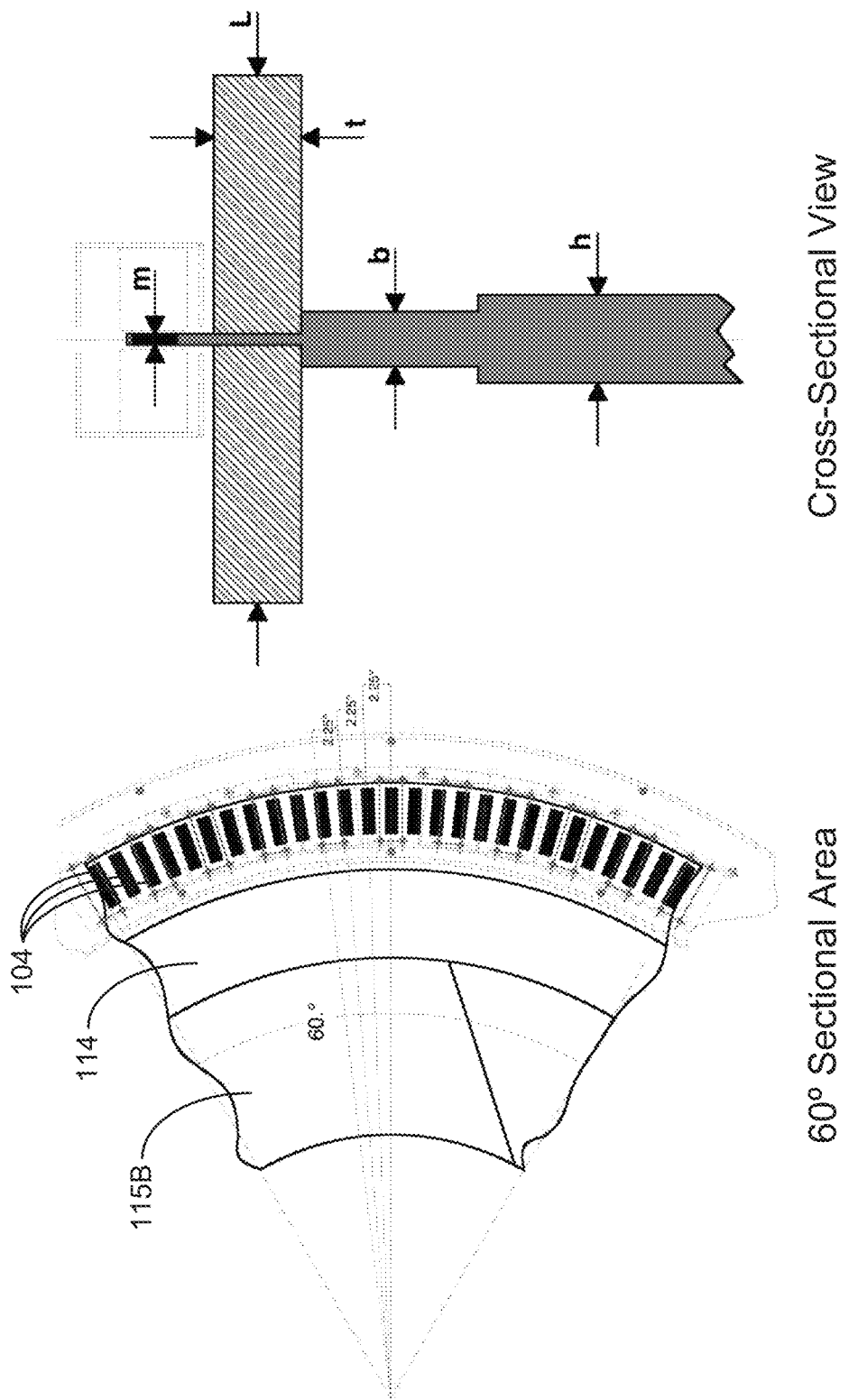
FIG. 3C shows a diagram depicting a 60 degree section of the magnetic array, and a cross section of rotor and flywheel.

In implementations, for example, as the rotor spins, lines of flux rotate like a spinning motor armature, which produces alternating current on series connected stator coils on either side of the magnetic rotor. Since the magnetic array operates at the rotor edge, the magnetic frequency is maximized for a given rotor radius. Voltage increases with flux transition speed, and the AC waveform is sinusoidal, hallmarks of a synchronous machine. Multiple stator pairs instantly derive excitation from rotating magnetic fields in parallel, which is rectified to DC and wired in series for maximum voltage. One module is dedicated to provide motoring thrust force applied to the entire radius for maximum torque in rotor speed regulation operations. FIG. 3C shows a diagram of an example rotor assembly, depicting a 60 degree section of the magnetic array and a cross section of the Wells-type rotor, magnetic rotor, and flywheel.

For example, the hub, blades, and magnetic rotor can be configured as a single machined aluminum casting, with holes for magnets and high peel strength epoxy. Magnets are positioned as shown in the diagram of FIG. 3C. Dimensions shown between arrows are: m equals magnet thickness which defines the size of inductors, b equals blade thickness which determines instantaneous rotor power, h equals rotor hub thickness which can be greater than blade thickness. L and t determine rotor inertia, where t equals outer flywheel radius minus the inner radius which increases inertia exponentially, L is the flywheel length which multiplies inertia. The flywheel can be made in two half cylinders of high density material like steel with the magnetic rotor sandwiched in between, to form a single rotating mass.

3.2.2. Housing

Figure 3D:
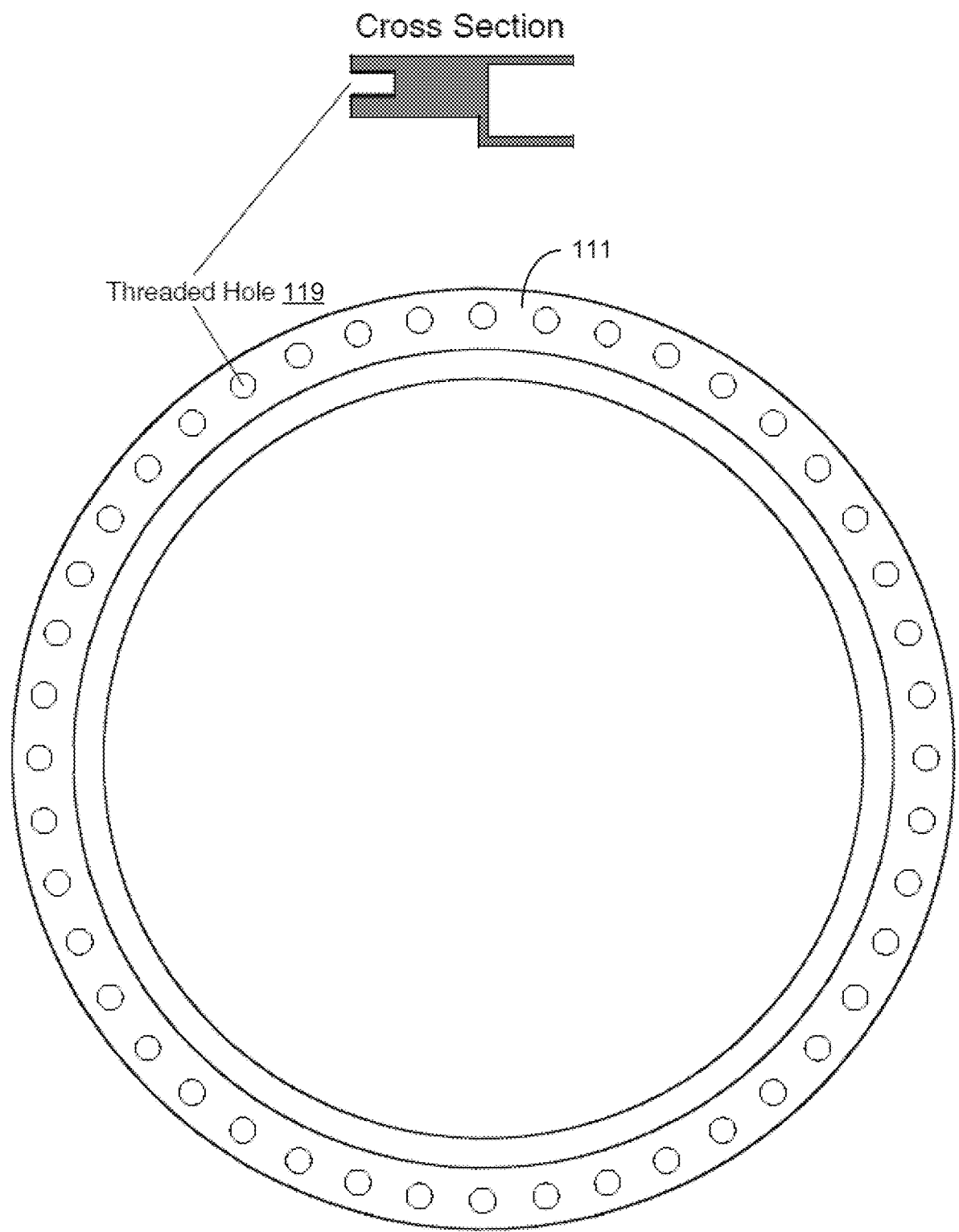
FIG. 3D shows a diagram showing a front and cross-sectional view of an exemplary half of the housing.
Figure 3E:
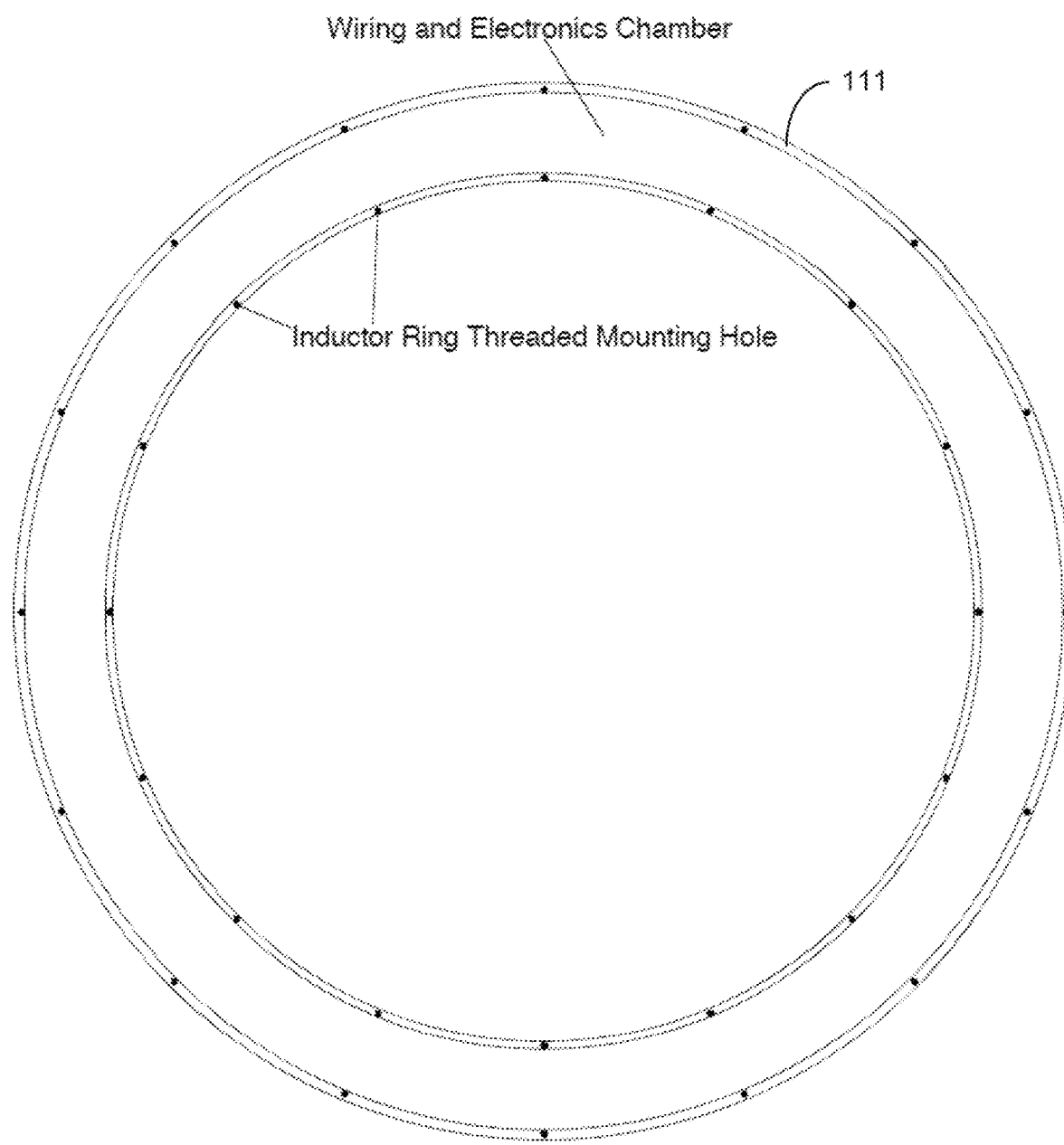
FIG. 3E shows a diagram showing a rear view of an exemplary half of the housing.

The non-rotating part of the exemplary EiP wave machine can be built in two halves, connected by a sealed watertight cover that straps the two halves together to precisely determine the gap between magnetic rotor and stators. Each houses one half of the inductor array plus electronics, and rotor bearings. A set of threaded holes are provided that fits a standard pipe flange bolt pattern. The exemplary embodiment discussed in Section 3 conforms to the ANSI Class 150 DN1200 48" pipe flange. A bearing ring assembly is attached inside the flanged end, the inductor ring is bolted onto the other. A hollow chamber is formed behind the installed inductor ring for wiring and electronics. FIGS. 3D and 3E show diagrams showing one half-housing front view of the frame 111 with pipe flange holes 119 and rear view showing inductor ring mounting holes. FIG. 3D shows a diagram showing a front view and cross-section of an exemplary half of the housing. FIG. 3E shows a diagram showing a rear view of an exemplary half of the housing.

Each housing half can be a machined aluminum casting with walls of a minimum thickness on one end, around a cavity for internal wiring and electronics. The walls contain threaded holes for inductor ring mounting. One half supports electronic circuit boards and rectifier modules, the other supports HVDC power leads and fiber optic network interface connecting with electronics. Wall thickness increases with machine size while the cavity size remains constant, corresponding to the size of inductors. When the radius expands more inductors and electronic modules are added around the cavity, which roughly remains constant in width with respect to machine radius expansion. Wall thickness must be great enough to support dramatic increase in mechanical inertia with radius, along with corresponding amounts of electromagnetic torque response, e.g., in the same manner as expanding ANSI standard pipe and flange thickness to larger diameter.

3.2.3. Inductor Rings

Figure 3F:
FIG. 3F shows a diagram of an exemplary EiP wave machine inductor support ring.

In some embodiments, for example, two circular stainless steel U-channels support an array of inductors, one for each side of the magnetic rotor array. A circular base plate can be laser cut, with curved steel plate welded around inner and outer edges. Holes are provided for inductor sites, along with wiring pass-through holes to electronic mounted on the opposite side. Holes are also provided for mounting to the housing, as shown in the diagram of FIG. 3F which shows the inductor side view of the assembly. FIG. 3F shows a diagram of an exemplary EiP wave machine inductor support ring.

3.2.3.1. Inductor Mechanical Specification

Figure 3G:
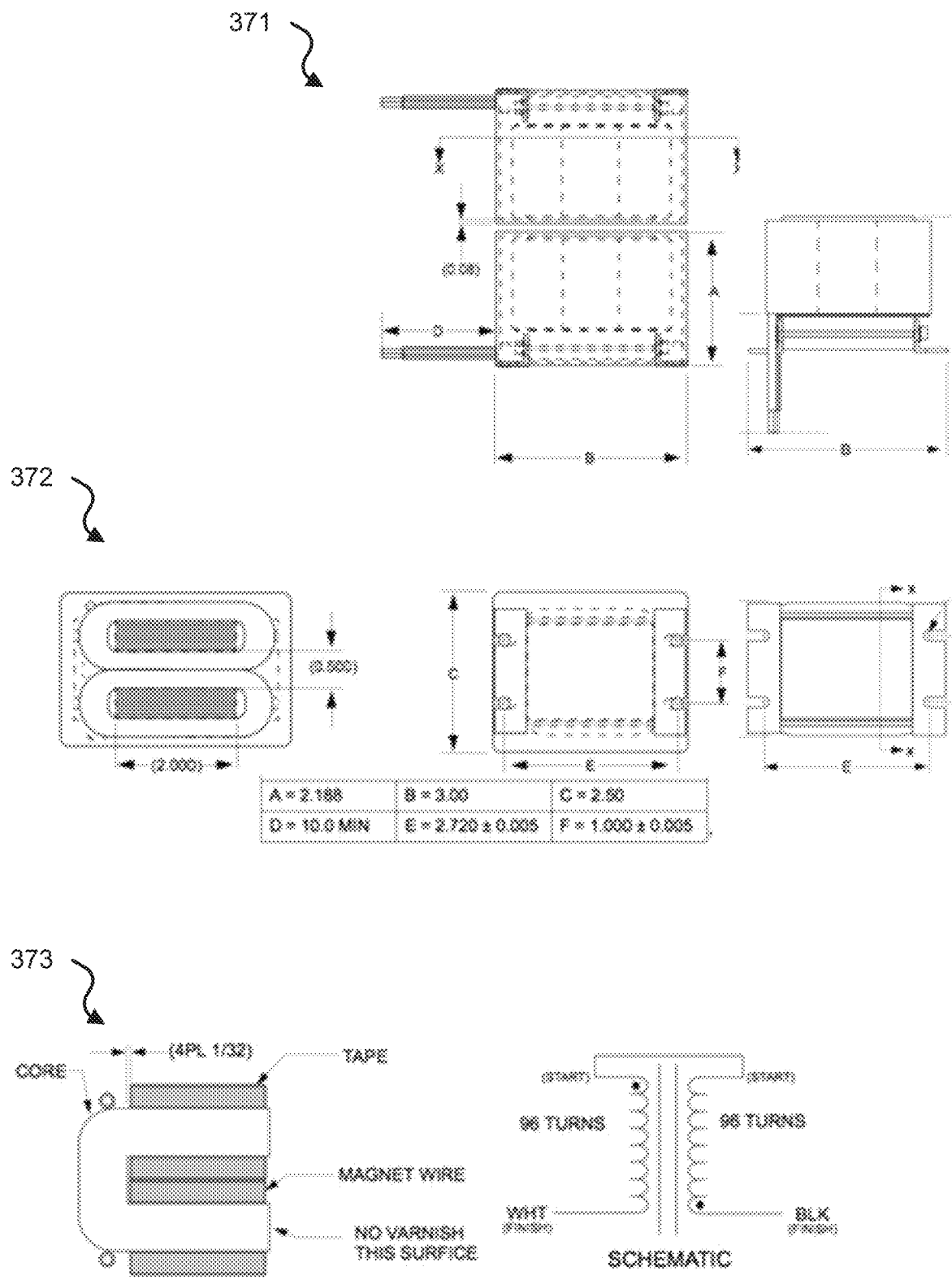
FIG. 3G shows diagrams depicting exemplary inductor specifications of an exemplary EiP wave machine.
Figure 31:
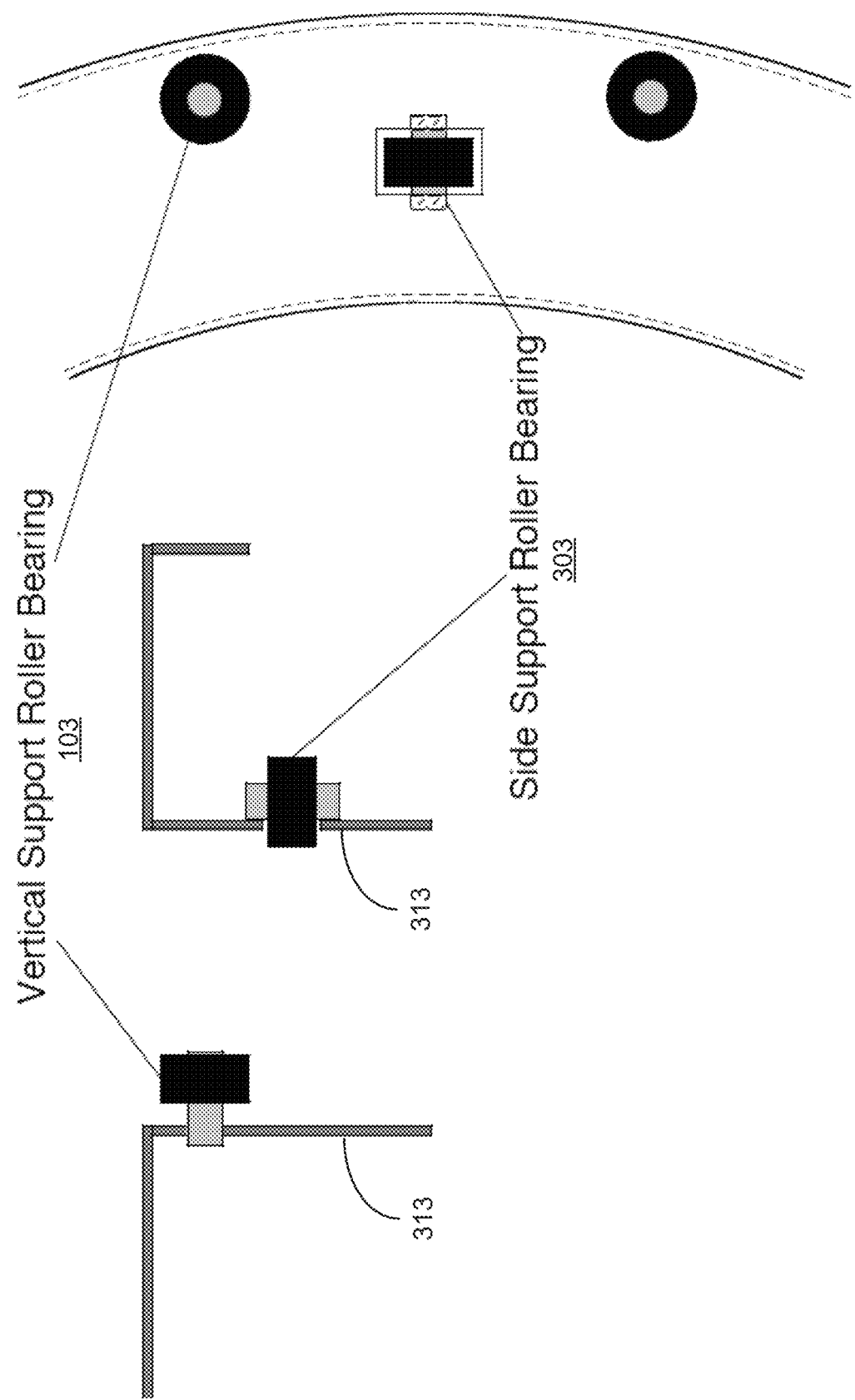

Each inductor in the exemplary EiP machine can be encapsulated in epoxy, to hold the C core in place under strong magnetic forces, and protect windings from harsh environmental conditions. Four threaded inserts supported by "L" brackets in epoxy provide mounting hardware. FIG. 3G shows diagrams depicting example inductor specifications, and how it can be constructed. As shown in FIG. 3G, the graphic 371 shows the outline of the epoxy potting for a pair of inductors, with dotted lines indicating the locations interior parts, and a direct side view of what is inside (e.g., brackets for threaded inserts, C core, and wire leads). The graphic 372 shows the C core and winding area as viewed from the magnet side (core faces), and from the opposite side showing the footprint of the mounting brackets and threaded inserts. It is noted, for example, that the dimensions are all in inches. The graphic 373 shows a cross section of the C core and winding area as viewed from the rotor edge.

Epoxy encapsulation protects the C core and windings from harsh environmental conditions. The EiP machine frame, supporting bearings and inductors, provides drain holes and open vents allow water to quickly enter and exit the inductor operating environment. High-density axial flux lines quickly saturate the C core when pole faces line up, so the magnetic rotor gap need not be too tight. Wiring for the inductors passes through a hole into a sealed compartment around the pipe flange, that contains electronics and wiring. All electrical connections are sealed from the elements in accordance with codes and standards for submersible use.

In the exemplary EiP wave machine, there is a lot of discretion as to how long the C core legs can be configured, e.g., which increases the winding area without affecting the mounting or magnet patterns. For example, by lengthening the core, one can increase the working voltage by adding more windings, and reduce the added resistance (increase power) by using thicker wire, all of which can be accommodated by the increased winding area. Yet, for example, a larger core may lead to increased eddy current losses, and so one may have to increase the doping of the magnetic steel laminates in the core from 3% silicon to a higher value, e.g., like 4 or 5%.

3.2.4. Bearing Rings

Instead of a single bearing controlling a shaft, for example, the EiP wave machine can provide an array of roller bearings that restrict rotor flywheel motion on two axes, such as that shown in FIG. 3A. One set of bearings supports the full weight in rotation, e.g., the vertical support bearings 103, and the other controls side to side motion which maintains proper magnetic gap alignment, e.g., side roller bearings 303. A cover over the bearing ring can be included to create a venturi, e.g., reducing the 1200 mm pipe flange opening to 1000 mm on input and output in this exemplary embodiment of the EiP wave machine. FIG. 3H shows a diagram depicting an exemplary bearing ring as viewed from the flywheel.

In case of a bearing failure, high redundancy takes over the load until scheduled maintenance. Then, the ring cover is removed to expose fasteners into the flange end of the housing for removing the entire ring so that bearings can be easily replaced during field service. Maintenance-free poly roller bearings provide quiet operation under heavy load. These bearings are available from a wide variety of OEM sources, in a variety of sizes, for example. Roller diameters for side bearings determine the magnetic gap between the magnetic rotor and inductors, balanced to fit equally between the inductor rings. Flywheel support bearings are sized for low eccentricity rotation of the magnetic rotor with respect to inductors.

The main roller bearings can be bolted into threaded inserts. The side rollers can be configured to protrude through a laser cut hole in the bearing plate, with custom brackets on the opposite side to secure the bearing shaft. FIG. 3I shows a diagram showing a closer view of the exemplary bearings 103 and 303 and how they attach to the bearing ring 113.

3.2.5. Strap

In some implementations of the EiP wave machine, the machine includes a watertight cover strap that is attachable/detachable to the openings of the base support, and that can be completely sealed to prevent fluid from leaking within. The term "strap" represents a watertight cover that provides the mechanical support required to connect each half housing during final assembly. The strap must solidly hold the machine together using structural components and fasteners appropriate for the size of machine. The strap also provides lift points for hoisting the EiP wave machine during installation, without grabbing the flange ends. The exact structure of the strap depends on machine size, for example, since mechanical forces that affect structural integrity increase exponentially with radius.

4. Electronics Hardware Specification

The disclosed technology is modular at the electrical machine level by breaking down a large array of stators and rectifier electronics into three-phase groups: permanent magnet linear synchronous machines (PMLSMs). Each PMLSM has an integrated three-phase rectifier module, which converts AC to a DC at peak AC voltage. Stators connect in a wye configuration, with each leg electrically isolated from the DC interface, post rectifier. Three or more PMLSMs can be combined as building blocks to create certain configurations of EiP machine. One PMLSM provides a Voltage Sourced Converter (VSC) circuit for motoring and generating, while all others provide simple three-phase diode rectifiers for generating only. For high voltage DC output, generating rectifier DC outputs are wired in series. A DC-DC converter is connected to the HVDC output to provide feedback to the DC link, creating an EiP oscillator.

4.1. Three Phase Diode Bridge Rectifier

Figure 4A:
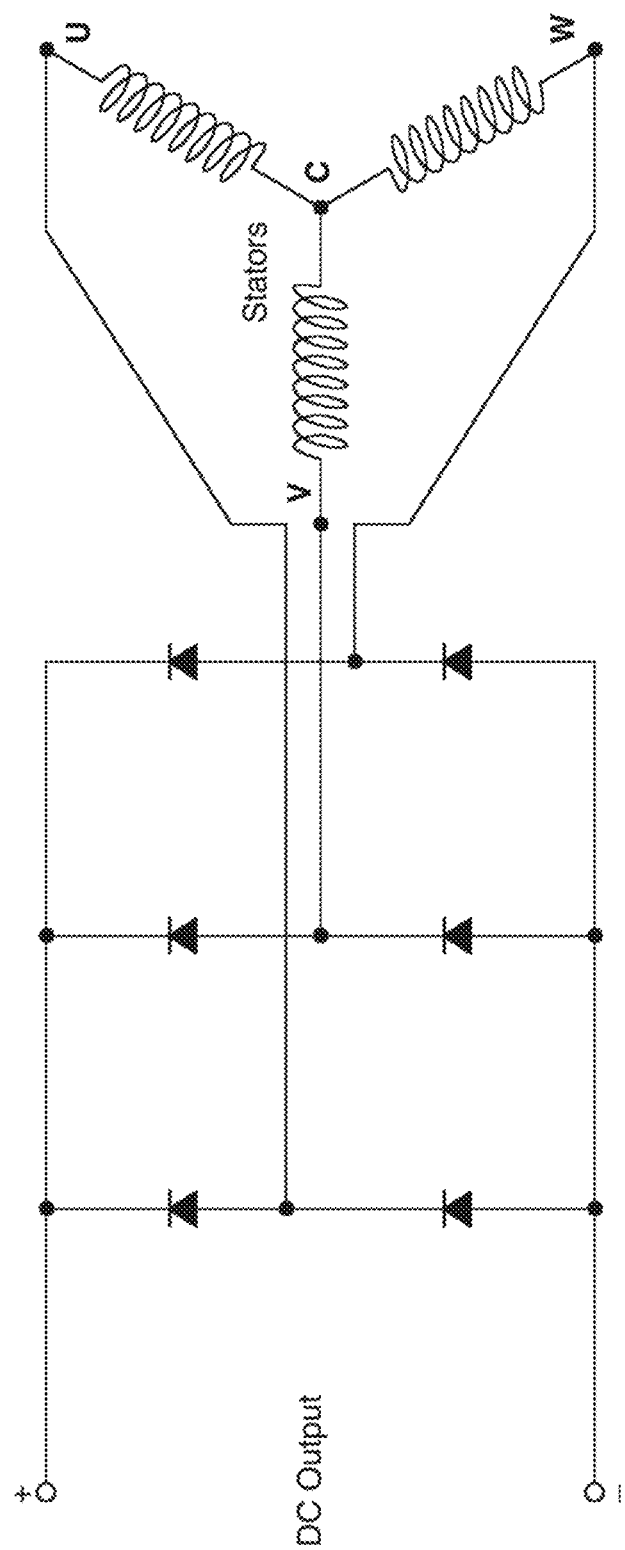
FIG. 4A shows a circuit diagram depicting an exemplary PMLSM diode bridge.

The primary linear electronic building block for a generating PMLSM is a simple six-segment three-phase diode bridge rectifier, as shown in the example of FIG. 4A. FIG. 4A shows a circuit diagram depicting an exemplary PMLSM diode bridge. Diode bridges are stacked in series or parallel for a certain voltage/current configuration on the DC link. Each leg of the wye is an EiP synchronous magnetic circuit, designed to work with industry-standard three-phase rectifier modules.

Stator AC is only allowed to flow in one direction, so when the three AC waveforms are superimposed, it results in roughly a DC voltage that equals peak AC voltage. Ripple is low enough to eliminate the need for filter capacitors. Parallel connections allow one or two stators to fail with continued operation but at a lower voltage with higher ripple. Series or parallel connected modules are unaffected by individual inductor or diode failures.

4.2. Voltage Sourced Converter (VSC)

Figure 4B:
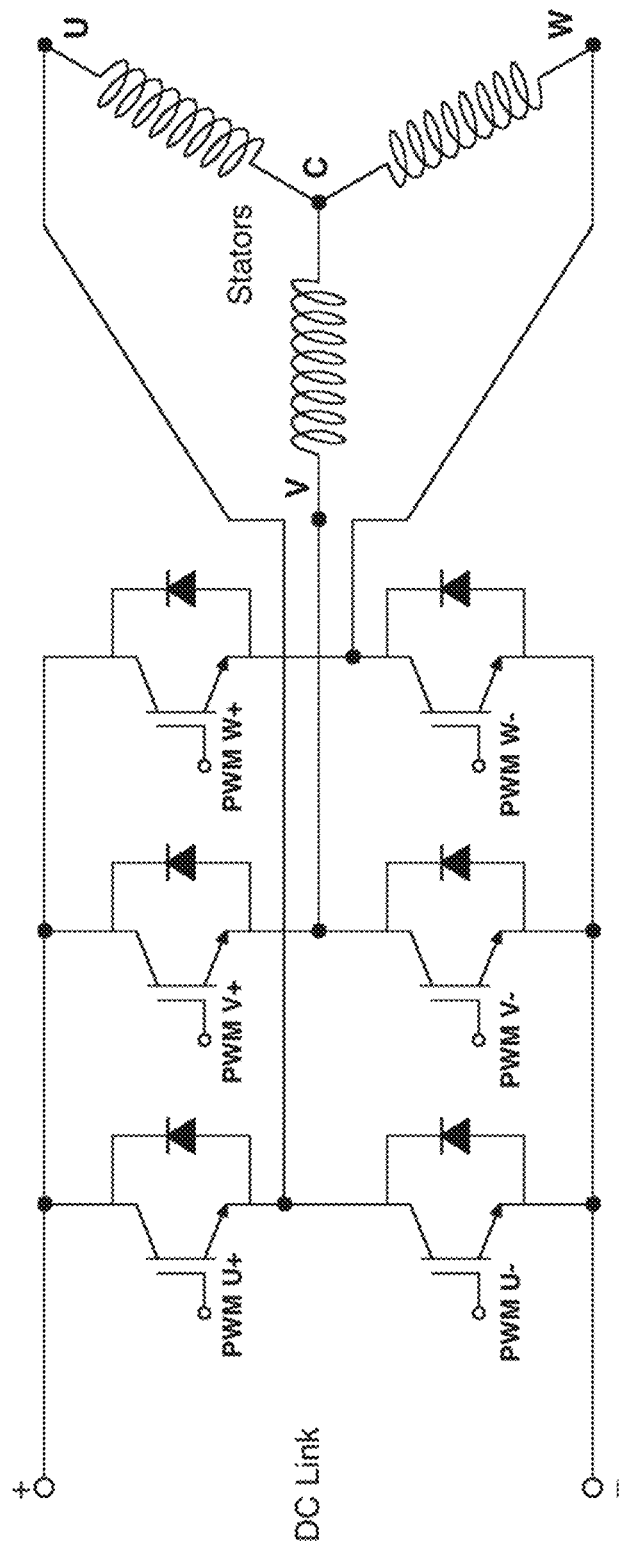
FIG. 4B shows a schematic diagram showing the exemplary VSC and PMLSM stators.

For motoring modules, an industry-standard three-phase module called a voltage sourced converter (VSC) is required. The VSC circuit places semiconductor valves like the insulated gate bipolar transistor (IGBT) in parallel with each diode in a three-phase rectifier, to become a controlled rectifier/inverter. In a three-phase group, packaged for industrial use, the circuit is commonly called a variable frequency drive (VFD). IGBTs are controlled by pulse width modulation (PWM) of gate signals for motoring and generating operating modes, turning variable voltage and frequency three-phase AC power into a fixed DC link voltage when generating, or inverting DC link power to three-phase AC power of variable voltage and frequency for motoring. When the IGBTs are inactive, the rotor simply coasts and the circuit reverts to a three-phase rectifier. FIG. 4B shows a schematic diagram showing the exemplary VSC and PMLSM stators.

PWM-controlled IGBTs provide power factor and phase control for each stator leg. PWMs are provided by an intelligent controller part, which generates waveforms on the IGBT gates that regulate the flow of current through IGBTs. Software control of the rectifier uses rotor flux estimation techniques based on real-time analysis of ripple currents on the DC side by a digital signal processor. All timing and feedback is derived from rotor flux/stator estimations, e.g., eliminating outboard speed sensors.

VSC controller electronics are powered by a separate low-voltage supply, which is easily battery-backed. When the supply is removed, all IGBTs go to a high impedance state, and the circuit becomes a simple passive rectifier. Diodes completely isolate stators in the reverse direction from the DC link voltage. This removes the threat of cascading breakdown if a fault occurs, where a diode becomes an open circuit if current is too high, and the stator leg is completely cut out of the circuit.

4.2.1. Power Factor Control

PWM control of IGBT gates adjusts the power angle between reactive and resistive parts of stator interactions with the magnetic rotor, providing power factor control. The PWM controller monitors AC frequency using sensorless techniques, for rotor speed indication. Rotor speed corresponds to total power potential speed regulation defines power limits.

4.2.2. Power Regulation Through Motoring

Airflow from wave energy uptake accelerates the rotor, which raises the DC link voltage. Electrical loading on the DC link decelerates the rotor and lowers DC link voltage. Each PMLSM with VSC regulates speed by forward and reverse motoring using integrated PWM control. When rotor inertia is high, braking by reverse motoring (generating) causes DC link to rise. Forward motoring causes DC link to drop (by loading) while rotor accelerates. When motoring and generating, the rotor speeds up and slows down while DC voltage remains constant. At maximum rotor speed, the DC voltage is allowed to fluctuate.

4.2.3. High Frequency PWM Support

The PWM carrier frequency is thousands of times greater than generator frequency. In the EiP machine, for example, smaller silicon steel C cores allow maximization of PWM frequency, for high speed and higher resolution control. If a high frequency is chosen, for example 16 KHz, switching harmonics can produce eddy current losses in large monolithic cores. Discrete core segments, built with 3% silicon steel laminates, naturally operate at higher frequencies with low losses, so PWM frequency is maximized.

4.2.4. Off-the-Shelf Industry Standard Variable Frequency Drive Compatibility

VSC technology is fairly mature, where a variety of modular industrial VFDs are available from various manufacturers off-the-shelf, and programmed to fit PMLSM motor parameters. EiP technology can use the standard VFD as the electronics hardware platform. For example, in some embodiments of the EiP wave machine, the machine can be fabricated for faster time-to-market, in which the machine contains one off-the-shelf VSC for a motoring PMLSM, while all others use diode bridges. A grid-tie inverter connected to the DC link creates an EiP wave machine grid interface that conforms to standards.

In some embodiments of the EiP wave machine, custom VSCs are integrated into every PMLSM in the wave machine frame, with built in cycloconversion for direct grid-compatible AC.

4.2.5. Electronic Mechanical Compensation

High-speed electronic control of instantaneous PMLSM thrust force allows tight control of large and loose mechanical systems. The EiP wave machine is subject to random mechanical forces from airflow and magnetics that cause undesirable vibrations. With electronic control that is stronger and faster than mechanics, precise regulation compensates for periodic vibrations like torque ripple, maintaining smooth and quiet rotor motion. For example, torque ripple is an artifact of the EiP modular magnetic design, where the linearization of a rotary machine lacks the mechanical stabilization of a central shaft. A smoothing algorithm in the VSC simulates control from the central shaft by cancelling and neutralizing torque ripple in real-time.

4.3. Exemplary EiP Wave Machine Oscillator Architecture

Figure 4C:
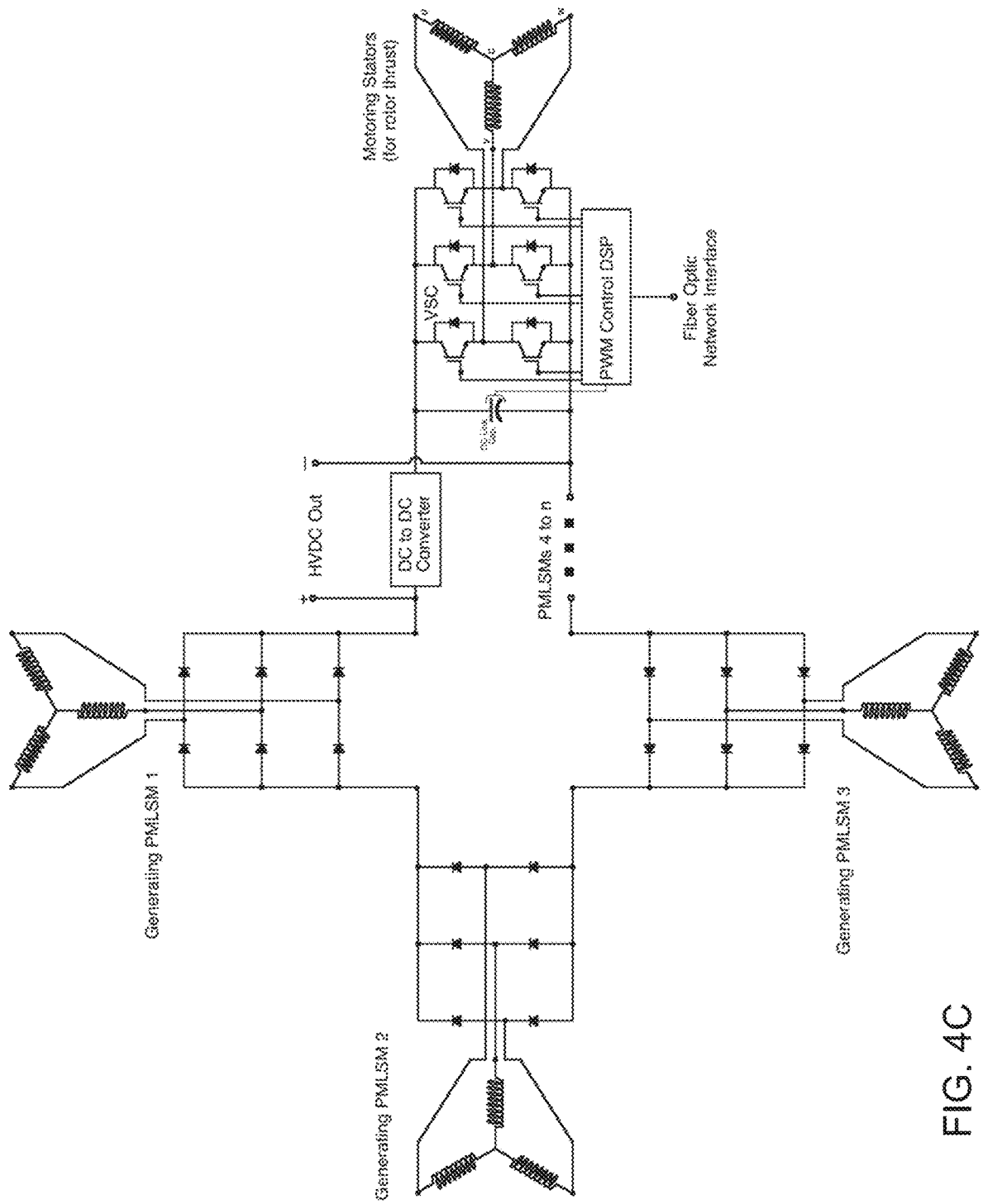
FIG. 4C shows a schematic diagram of an exemplary the EiP oscillator for the exemplary EiP wave machine.

In various embodiments, the inductors in the EiP machine are the same size, so two or more (e.g., all) generating PMLSMs with a diode bridge must be connected in series for high voltage DC output. The resulting circuit is the EiP oscillator, where the output of three or more PMLSMs in series, drive one PMLSM with a VSC through a voltage to voltage converter from the HVDC to VSC DC link. This provides essential feedback for EiP oscillation and defines the electronic circuitry for the EiP wave machine. EiP technology breaks down a complex array of stators and electronics into an EiP oscillator configuration, to form a synchronous generator of any size. One PMLSM controls rotor inertia (speed) using motoring thrust in either direction, maintaining a nominal speed window within which EiP oscillation occurs. The control interface is a fiber optic connection to the embedded digital signal processor (DSP) in the motoring PMLSM. FIG. 4C shows a schematic diagram of an exemplary EiP oscillator for an EiP wave machine.

4.3.1. Networked Control and Monitoring Interface

For external control, a fiber optic control network interface provides a way to organize multiple EiP wave machines, through a central controller device. The controller interacts with the user and other EiP wave machines connected to the onshore DC aggregation point, through network commands.

5. System Architecture

The EiP wave machine is designed to operate within the context of a distributed generation system. The generation system can include an array of EiP wave machines interfaced with an array of OWC devices along the length of a breakwater (e.g., off-shore array), connected to a common power aggregation point onshore where power is managed for grid intertie. In some implementations, for example, the generation system can include an array of EiP wind machines located on-shore and connected to the common power aggregation point. The grid side connects to other distributed generation stations in the area via shared transmission grid. This section discloses example embodiments of an EiP power generation system and describes how EiP technology advances the idea of distributed generation, which has been around since the late 1970s. However, several technical issues have prevented its widespread adoption. For example, power quality—Multiple generators on a common grid causes out of step conditions from poor synchronization, with excessive electrical noise and harmonics. For example, power oscillations—Interconnected rotating machines independently speed up and slow down under changes in load, causing uncontrollable, destructive and non-linear behaviors like parasitic oscillations. For example, maintenance and reliability—Decentralization of power sources means more potential points of failure that need to be serviced. For example, noise and air pollution—Backup gensets all over town, using fossil fueled internal combustion engines, drive generators at high RPM, which is loud and toxic.

5.1. Distributed Generation and the Disclosed Wave Power Technology

The disclosed technology provides all of the critical building blocks for distributed generation in a marine renewable energy network, solving all of the technical problems described above through the following. For example, networked hi-speed self-commutating converter electronics for sharing power at the DC level, delivering seamless power regardless of resource availability and system load. For example, oscillation when multiple generators interconnect is a resource that enhances capture and storage of renewable energy, allowing rotor speed to fluctuate by design. For example, fault tolerant, redundant, modular design, where operation continues, although at lower power, when individual components fail; network monitoring detects maintenance issues for service during scheduled intervals, so power disruptions to local consumers are eliminated during extreme weather events. For example, massively parallel architecture where EiP wave machines operate with EiP wind machines, solar panels, and fuel cells onshore; transparent reliability eliminates the need for a noisy backup genset, placing dirty and noisy power plants away from residential areas (closer to bio-fuel sources e.g., dairy farm, sewage treatment facility, garbage dump).

5.1.1. Exemplary EiP Distributed Generation Station

Figure 5A:
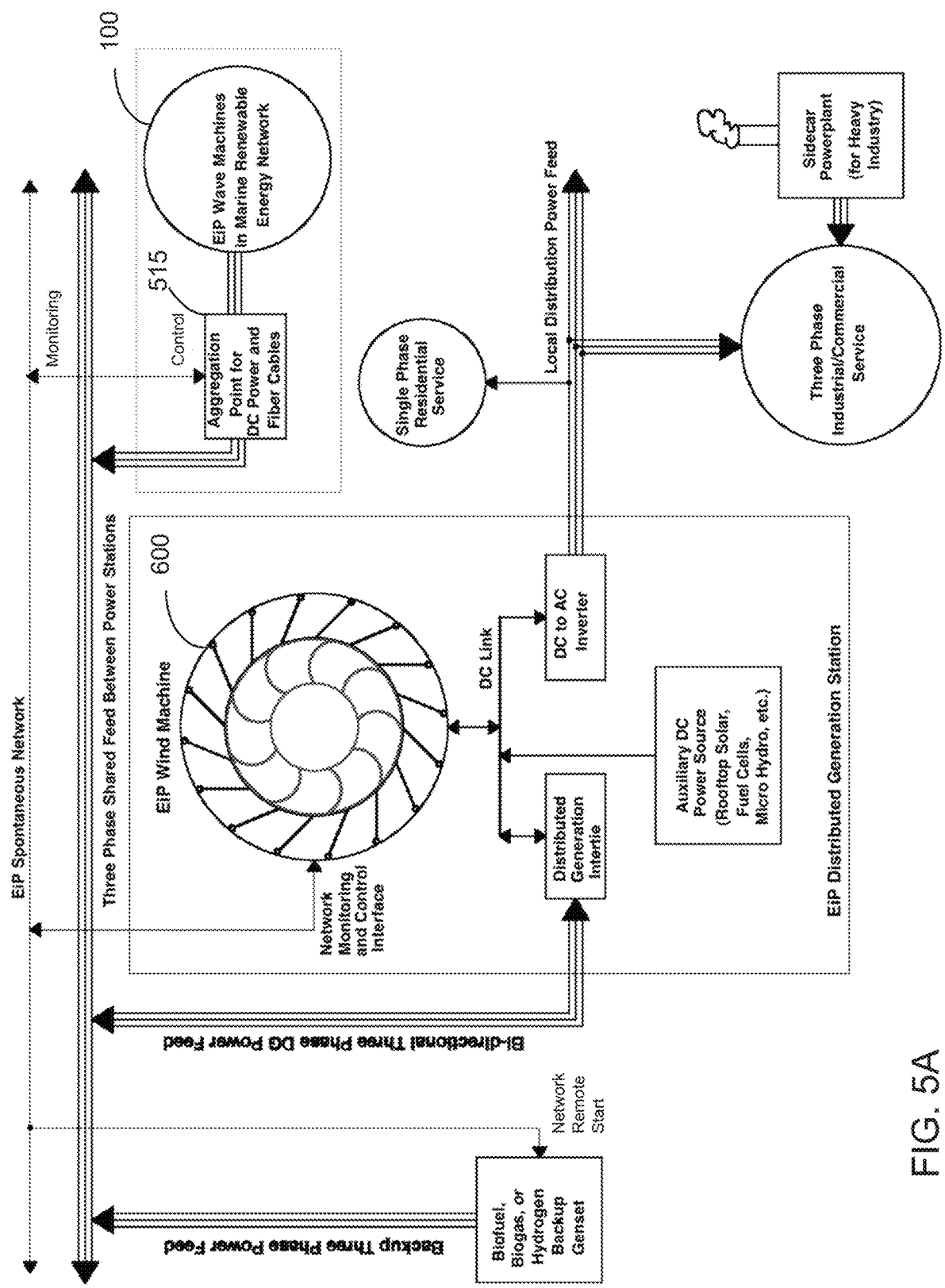
FIG. 5A shows a diagram of an exemplary EiP distributed generation system architecture.
Figure 5B:
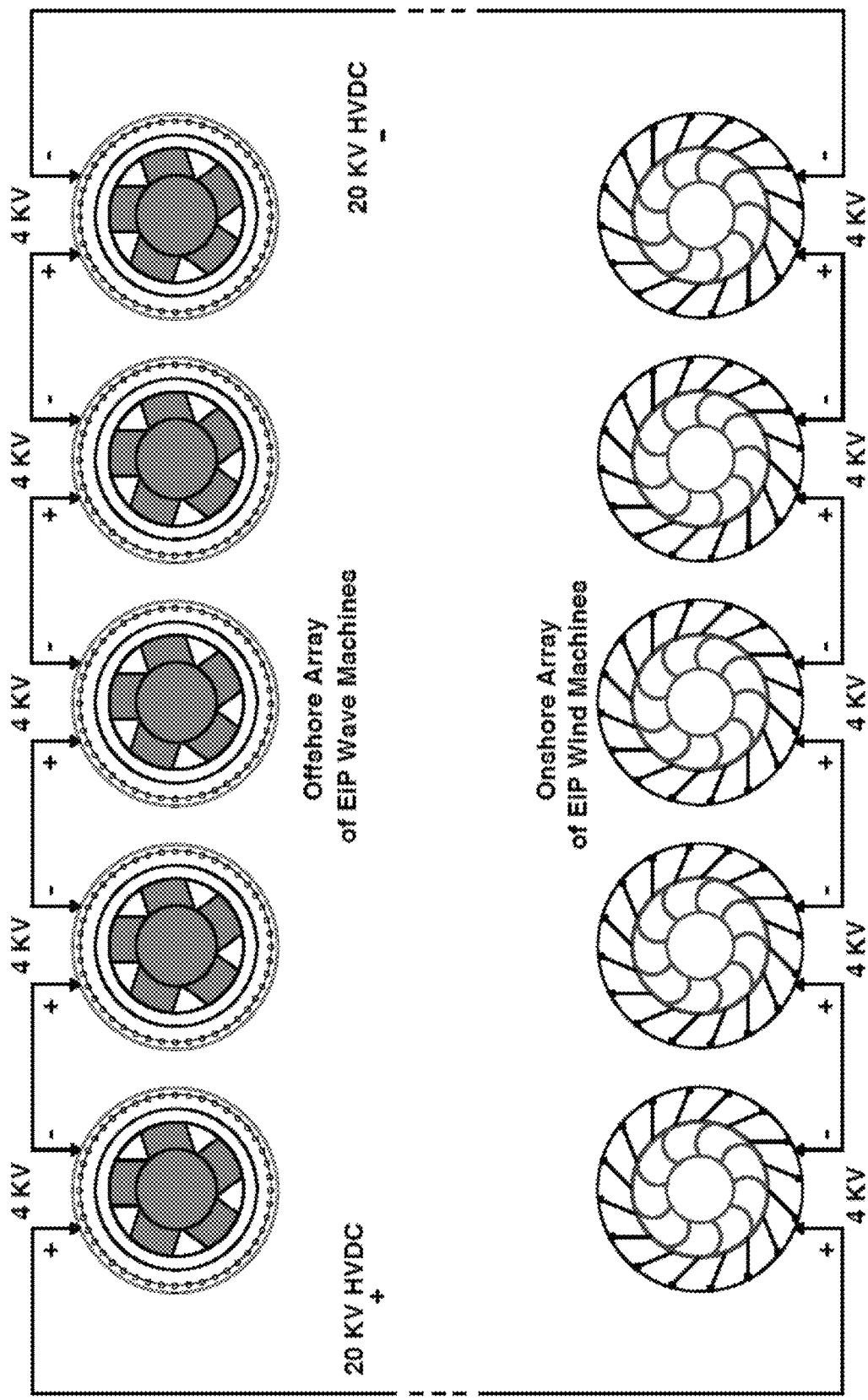
FIG. 5B shows a diagram of an exemplary EiP high voltage DC transmission system.

Onshore, as part of a 100% renewable power grid, the EiP Distributed Generation Station, which in some embodiments can include the exemplary EiP wind machine as its centerpiece, receives power from the offshore marine renewable energy network and prepares it for local power distribution, along with other power sources and storage, as shown in the diagram of FIG. 5A. FIG. 5A shows a diagram of an exemplary EiP distributed generation system architecture. The system includes one or more EiP wave machines 100 interfaced with corresponding OWCs, in which the EiP wave machines provide the converted electrical energy to an aggregation point 515. For example, the aggregation point 515 can include energy storage units and electrical and optical communication links (e.g., DC power cables and fiber optic cables) to transfer the energy to the power network, e.g., including other aggregation points, facilities, power generators and distribution centers, etc. For example, FIG. 5B shows a group of EiP wave machines, located offshore, and wired in series to create a high voltage DC line to the shore-side aggregation point, which in this example includes an array of EiP wind machines. The exemplary EiP wind machines can be tapped individually and connected to synchronous inverters for distribution to EiP distributed generation stations through the disclosed three phase shared power feeds between various points on the network.

The exemplary EiP wave machine can be integrated with EiP wind technology (i.e., one or more EiP wind machines 600) in the EiP distributed generation system, e.g., to extract useful energy from gusty and turbulent urban wind conditions in an urban setting onshore. As with the EiP wave machines 100, the EiP wind machines 600 are not only power generators but also operate as energy converters, where high inertia backs up raw energy produced from wind and auxiliary sources with temporary storage from which consumer power is sourced. EiP spontaneous networking technology links up with EiP wave machines 600 offshore to fully integrate and fine tune all power sources.

The EiP distributed generation station creates compact islands of reliable and uninterrupted power, ideal for hi-technology. For example, the system architecture provides shared three-phase power between stations, which may be subject to disruptions, while distribution lines to consumers are isolated from the shared side, so network-wide disturbances have no effect on rate payers. This provides instant backup when faults occur, for example a powerline severed by a falling tree. The "Distributed Generation Intertie" block includes rectifiers that convert incoming AC to DC (e.g., equal to peak AC voltage), connecting grid energy to the DC link. Generated AC is returned through a synchronous inverter on the DC link.

5.1.2. Using Oscillation as a Storage Mechanism

Whenever multiple sources of electrical generation are interconnected, oscillations are commonplace. Generators speed up and slow down under changes in load, feeding back power surges and sags on one another to create parasitic oscillations. As a primary design feature, EiP technology converts the oscillation phenomenon into a resource that improves the capture, storage, and delivery of renewable energy.

EiP machines decouple the generator rotor angle from power delivery and interconnect at the DC level, allowing rotor speed to fluctuate in "transient stability": rotor operates at variable speed that is allowed to oscillate, normally a catastrophic failure mode when multiple generators connect out of step at the AC level. Changes in load and resource can naturally occur without storing or shedding excess power. An electronic inverter delivers the power providing instantaneous power factor control and correction, which determines how much power is actually consumed (resistive or "active" power) vs. power for magnetic fields required to transmit and distribute it (reactive power).

For network-wide storage enhancement, several (at least four) EiP distributed generation stations, operating in parallel on the shared grid segment, bounce excess inertial power between each other, causing rotor speed to go up and down in a system-wide oscillation that sustains itself under base load. Since total inertia increases exponentially, slight changes in each EiP machine's rotor speed represent a large reservoir of potential energy network-wide, which is shuttled between EiP distributed generation stations.

Natural oscillation is self-sustaining, drawing energy from the environment in which it occurs, overcoming frictional forces and drag that would otherwise cause rotor speed to slow, extending storage time toward infinity. Power oscillations on the grid are commonplace, difficult to control, and impossible to eliminate, consuming useful generated power. EiP technology simply converts this common non-linear phenomenon into a storage device; a hallmark of sustainability.

Once EiP oscillation takes hold, and spotty renewable power sources fail to provide enough energy, less backup power from the shared grid is required to sustain oscillation, along with all loads present on the local distribution grid. Total inertia provides the greater power source, using only a slight amount of backup power to keep electronics running in each EiP machine. This provides further improvement in grid efficiency, well beyond unity power factor operation.

5.1.3. Isolating Disturbances On Transmission Lines From Consumer Power

EiP distributed generation architecture places power generation near the point of use. In this way, raw power (of low quality and reliability) from remote sources like marine renewable energy, does not directly affect consumer power. Distant power is received in raw form and regenerated as DC power by EiP each distributed generation station sharing the transmission line. Then, electronic inverters provide AC to local consumers. One inverter need not power a whole distribution system. Each consumer circuit can have its own inverter, sharing a common DC connection in the EiP distributed generation station. A tightly regulated and totally reliable power service is the result, which never fails from falling power lines.

5.2. Marine Renewable Energy Network

Ocean waves contain vast energy, with wave fronts hundreds of miles long. But a single OWC installation captures only a differential amount of an infinite resource. To create utility scale power requires a network of OWC powerplants, integrating power from wave fronts all along the coast. Through EiP technology, EiP wave machines form spontaneous networks that maximize energy extraction along the entire wave front. FIG. 5B shows how the offshore EiP wave machines connect in series to form a high voltage DC (HVDC) transmission system, in combination with an array of onshore EiP wind machines, to form the marine renewable energy network. Offshore and onshore, steady voltage regulation is provided by EiP oscillation between all wave and wind machines. In this scenario, there are no losses associated with transformers, simply direct connected HVDC. Onshore, each EiP wind machine provides a way to tap into transmitted power without transformers, directly to the DC links of PMLSMs grouped as EiP oscillators. Unlike transformer based HVDC transmission, which is naturally lossy, power is reinforced by the combined EiP oscillation of offshore and onshore EiP machines to increase the total energy of the transmission system.

EiP technology is fractal by design. At all levels, from PMLSM modules to clusters of EiP wave machines, there is self-similarity in basic structures and relationships. Clusters of EiP wave machines form spontaneous networks in groups of three or more, sharing common power connections with nearby OWC sites, linked by a high-speed fiber optic connection. Groups of clusters form clusters in a wide area network. The fractal expansion of modular structures presents no limits to the size and scope of a marine renewable power generating system, which is adaptable to natural geometries of shorelines. The prime focus of marine renewable energy network design is to be part of a vibrant and productive near-shore marine environment, without harm to the local ecosystem and all who depend on it. The fractal nature of EiP technology resembles how native ecosystems are constructed, in a self-organizing way.

5.2.1. EiP Spontaneous Networking

EiP spontaneous networking, embedded in each EiP wave machine, allows hi-speed control and monitoring system-wide, based on real-time feedback from all other EiP machines in the network. EiP spontaneous networking protocol contains timing signals presented as data, in a constant stream that operates like a hardware cache rather than a send-acknowledge protocol. One each EiP machine is operating at speed, it uses timing signals from the network to fully synchronize operations with all others, in parallel real-time, sensing pending power faults and taking corrective action for system-wide power regulation.

In some examples of EiP spontaneous networking, for example, a minimum of four EiP wave machines, sharing their remote control and monitoring interfaces over a fiber connection with low latency, self organize to form an EiP spontaneous network around the aggregation point. EiP machines use power semiconductor technology rather than transformers, they can link in parallel at high voltage with low loss over buried power lines. The combined current and inertial storage of many EiP wave machines increases local grid capacity and stability, through instant sharing of power with maximum efficiency in an EiP spontaneous network. On the EiP spontaneous network, groups of four EiP wave machines link up as "clusters", to form one segment of the marine renewable energy network, segments link to form clusters of clusters, expanding the network to generate power from the local shoreline with maximum efficiency and least environmental impact. Through EiP technology, efficiency and stability increase with system size, while fitting into the local ecosystem.

5.2.2. EiP Network Nodes and Clusters

In this example, an EiP spontaneous network requires at least four EiP wave machines to form a network. Each EiP wave machine is a network "node". Groups of four nodes form "clusters" on the network, organized in direct association with the local terrain. Net connections are tetrahedral, with three network paths from node to node. Clusters form groups of clusters, encompassing a wider geographical area.

5.2.3. Hardware Cache Line-Based Network Protocol

EiP network protocol operates like a hardware cache, where the structuring of data in the bit stream controls packet switching, at the node level. The stream is synchronous with embedded timestamp. All participating nodes follow the protocol, enforced by hardware. Any non-conforming transactions are ignored and overwhelmed by the whole network.

Each EiP wave machine broadcasts its current status to the network, then listens for others who share the same DC connection. Each EiP wave machine is calibrated to its location, through common natural references from a geographic information system (GIS), from which a unique identifier on the network is created. Like any self-organizing system in nature, groups of nearby EiP wave machines coalesce, from which all derive control signals for local power management. EiP protocol operates without centralized addressing, providing a live picture of real-time renewable power conditions across a wide area. Each node monitors system conditions from its own localized perspective, and provides instantaneous compensation for network-wide disruptions. EiP spontaneous networking creates a power web that eliminates grid lossiness from transformers and long transmission lines, through a softer approach based on localized timely power control, rather than brute force reactive power from huge powerplants.

The network is always operating at maximum speed and data throughput. While idle, the network data contains a diagnostic test pattern, indicating current network status and power conditions. Once running the network is always fully loaded with real-time data. Each node waits for the correct time slot for sending commands and status, overwriting existing data without disrupting others.

5.2.4. Private Channel for Power Providers

Each EiP machine has access to a slot in the data stream for encrypted private transactions on the network. Other machines of common ownership use the private channel to meter and monitor for billing purposes. All EiP machines group in a spontaneous way for maximum energy efficiency, while many distributed private monitoring and billing systems can manage monetary and statistical operations without affecting service quality.

5.3. EiP Synchronous Power Web

In combination with distributed generation stations, with EiP wind machines, solar panels, and fuel cells onshore, for example, the marine renewable energy network of EiP wave machines can produce 100% renewable energy in any conditions, storm or calm, day or night. This is accomplished by a slow buildup of inertia, which is quickly released for brief moments as needed to help maintain inertia in other EiP machines in the network. Over time, enough inertia accumulates to power necessary loads indefinitely, as excess inertia is shared by a "ping pong" effect. Hydrogen for fuel is created from water and excess power, and stored. As conditions dictate, fuel cells sustain DC voltage and inertia in all connected EiP machines.

5.3.1. Linking EiP Spontaneous Networks for Wide Area Energy Sharing

EiP spontaneous networks that share a data connection while operating on separate grid segments link up to create a synchronous power web over a large landscape. This solves the problem where the wind is blowing during off peak times, and excess energy must be stored for peak times, even during calm. Through each spontaneous network, EiP wave machines share excess energy in a grid segment wide EiP oscillation, which provides a vast storehouse of energy.

When EiP spontaneous networks link up to form a power web, distant transmission lines between can be allowed to operate wildly, as disturbances are relayed by high speed data links and compensated for in advance. The synchronous power web acts like a power filter, stabilizer, and battery for distant power generation from random renewable sources, without the need for flexible cogeneration, for maximum airflow power in the energy mix.

5.4. EiP Wind Machine

Figure 6A:
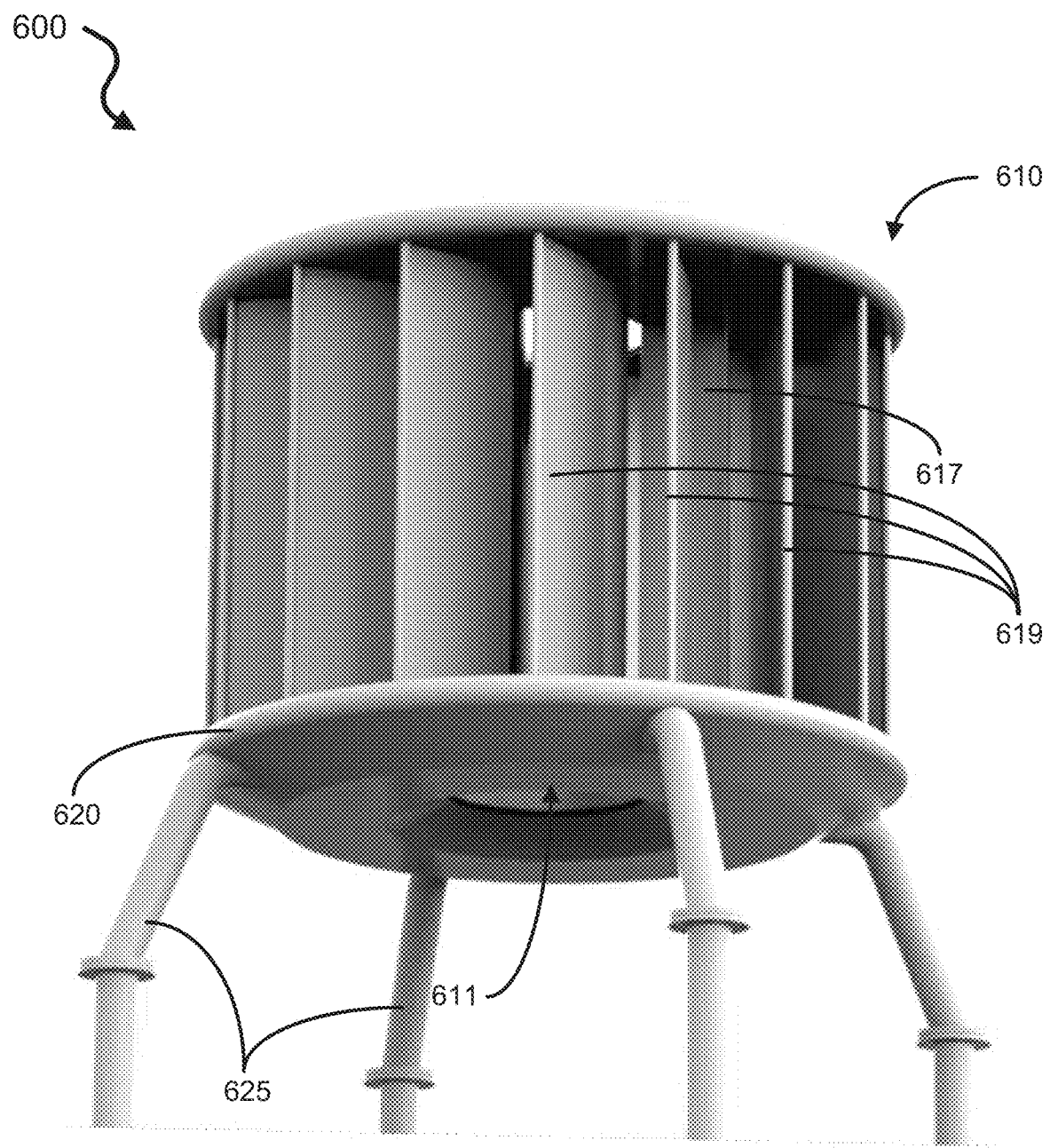
FIGS. 6A and 6B show three-dimensional schematics of an exemplary wind power generator, referred to as the electronic inertial power (EiP) wind machine.
Figure 6B:
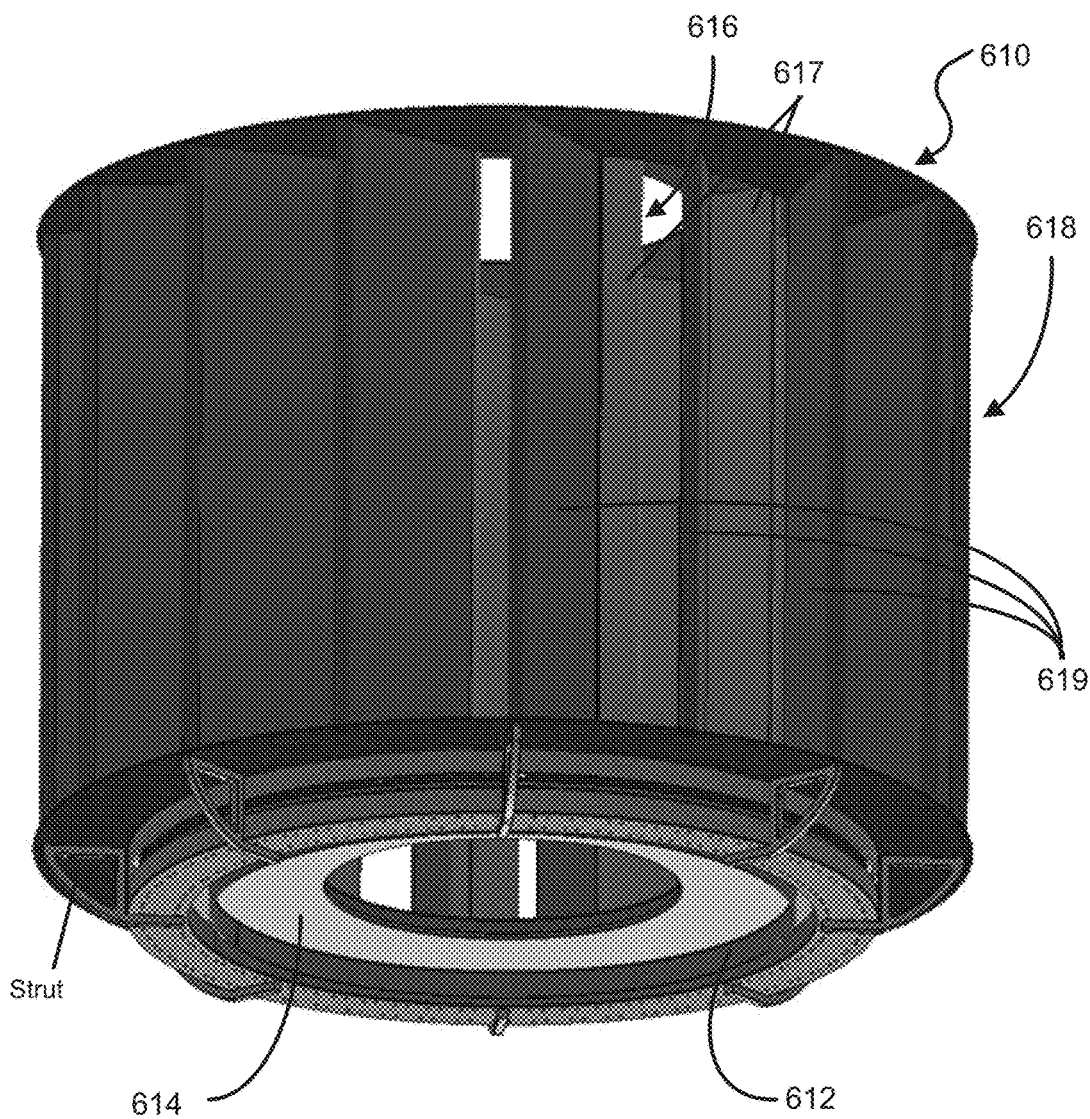
Figure 6C:
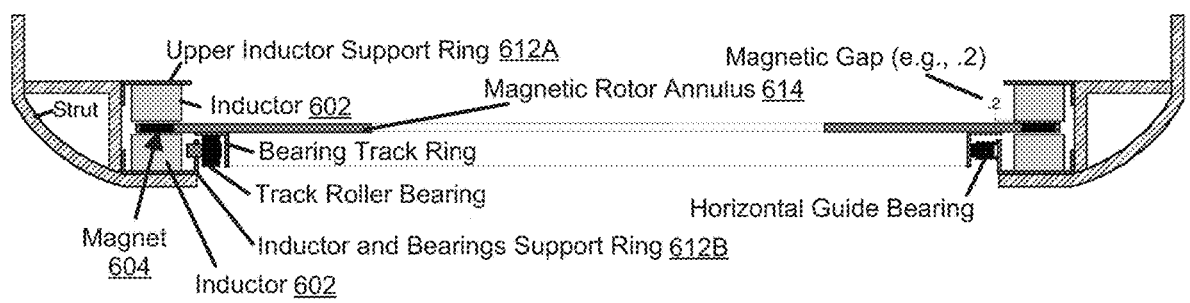
FIG. 6C shows a cross sectional diagram depicting the lower portion of an exemplary EiP wind machine.

FIGS. 6A and 6B show three-dimensional views of an exemplary EiP wind machine 600. FIG. 6C shows a cross-sectional diagram of the lower portion of the EiP wind machine 600. The EiP wind machine 600 includes a support base 620 to support an electronic inertial power generation unit 610 of the disclosed technology. The support base 620 can include a plurality of struts positioned along the outside region of a base frame, which supports the electronic inertial power generation unit 610. In some implementations, for example, the support base 620 can include a plurality of legs 625 to raise the support base 620, and thereby the EiP wind machine 600, to a desired height. The electronic inertial power generation unit 610 includes an annulus ring track 612 able to attach to the base support 620 and structured to provide a circular track around which a circular array of inductors 602 (e.g., inductor coils) is located. For example, the inductors 602 of the array are fixed in position in the annulus ring track 612 over the support base 612 in a circular array. The electronic inertial power generation unit 610 includes rollers (e.g., track roller bearings) placed in the circular track of the annulus ring track 612 to roll in the circular track to move around the annulus ring track 612. In some embodiments, for example, the annulus ring track 612 includes an upper inductor support ring 612A that contains the upper half of the inductor array, and the annulus ring track 612 includes a lower inductor and bearings support ring 612B, which contains the lower half of the inductor array. In some implementations, for example, the struts of the support base 620 are attached to the upper and lower support rings 612A and 612B to provide a gap (e.g., a fraction of an inch (e.g., ⅛ in) to a half of an inch, such as 0.2 in.) for a magnetic rotor annulus to rotate between the upper and lower inductors contained in the upper and lower support rings 612A and 612B.

The electronic inertial power generation unit 610 includes an annulus ring rotor 614 placed on the annulus ring track 612 and engaged to the rollers along the circular track of the annulus ring track 612. For example, in some implementations as shown in FIG. 6C, the annulus ring rotor 614 is configured between the upper support ring 612A and the lower support ring 612B of the annulus ring track 612, in which the lower support ring 612B includes the rollers (e.g., track roller bearings) that support a bearing track ring of the annulus ring rotor 614. For example, the bearing track ring can be structured to have two faces perpendicular to one another, such that one face is engaged with the rollers (e.g., track roller bearings) of the annuls ring track 612, and the other perpendicular face extends downward from the annulus ring rotor 614's lower surface. For example, the annulus ring track 612 can include horizontal rollers (e.g., horizontal guide bearings) that engage the perpendicular portion of the bearing track ring (e.g., roll about the perpendicular track of the bearing track ring) to guide the rotation of the annulus ring rotor 614 to maintain its position in the x-y plane as it rotates with respect to the inductor arrays of the annulus ring track 612. The annulus ring rotor 614 can rotate relative to the an annulus ring track 612, e.g., by operation of rolling motion of the rollers in the circular track, without having a rotary shaft in the center of the annulus ring rotor for rotating the annulus ring rotor 614. The annulus ring rotor 614 is structured to include separate magnets 604 evenly spaced from one another on the annulus ring rotor 614 (e.g., on an outer peripheral of the annulus ring rotor 614) to move through the circular array of inductor coils (e.g., between the upper and lower inductor arrays) as the annulus ring rotor 614 rotates over the annulus ring track 612, e.g., so that the relative motion between the magnets and the inductor coils causes generation of electric currents in the inductor coils.

The electronic inertial power generation unit 610 includes a cylindrical wind rotor assembly 616 located above and coupled to the annulus ring rotor 614, e.g., which forms a unified assembly, to rotate with the annulus ring rotor 614 relative to the annulus ring track 612. The wind rotor assembly 616 is structured to include a plurality of wind rotor blades 617 (e.g., wind-deflecting blades) that are spaced from one another and arranged in a circle around the wind rotor assembly 616 to form a hollow central cylindrical interior space for containing a wind vortex formed from deflecting of the received wind by the wind-deflecting blades 617. The wind rotor assembly 616 is operable to convert received wind, e.g., received from any direction, into a rotation of the unified assembly relative to the annulus ring track 612, thus causing conversion of the wind energy into the electric currents in the inductor coils, and thereby producing electrical energy. For example, in some implementations of the wind rotor blades 617, the wind-deflecting blade can have a structure including a curved blade portion to deflect the received wind into a wind vortex inside a hollow central region of the cylindrical wind rotor assembly. For example, the curved blade portion in each wind-deflecting blade can have a geometry of a portion of a cylinder. For example, the curved blade portion in each wind-deflecting blade can include a geometry of one third of a cylinder.

As shown in the diagrams of FIGS. 6A and 6B, the electronic inertial power generation unit 610 can include a cylindrical wind stator assembly 618 that is configured in a fixed position relative to the support base 620 and the annulus ring track 612. The wind stator assembly 618 includes stator wind-receiving fins 619, e.g., arranged in a circle that is outside of and encloses the cylindrical wind rotor assembly 616. The stator wind-receiving fins 619 are structured to direct received wind from any direction inwards and towards the wind-deflecting blades 617 of the cylindrical wind rotor assembly 616. The stator wind-receiving fins 619 and the wind-deflecting blades 617 are structured to collectively and efficiently convert the received wind into a rotation of the cylindrical wind rotor assembly. In some embodiments of the wind stator assembly 618, for example, the stator wind-receiving fin 619 include a pipe or rod having a curved outer edge as a first interface of the wind power generator with the received wind. For example, the stator wind-receiving fin can include a fin portion that is slanted in orientation with respect to a radial direction of the cylindrical wind stator assembly and is configured to receive and direct wind into the wind-deflecting blades of the cylindrical wind rotor assembly. For example, the fin portion can be configured to be slanted in orientation with respect to a radial direction of the cylindrical wind stator assembly at 45 degrees.

For example, the stator wind-receiving fins 619 can include a fin portion formed of a metal or metallic alloy, e.g., such as an aluminum fin portion. In some embodiments, for example, the stator wind-receiving fins 619 and the wind-deflecting blades 617 are configured so that a radial dimension of the cylindrical wind stator assembly 618, a radial dimension of the cylindrical wind rotor assembly 616, and a radius of the hollow central cylindrical interior space 611 in the center of the cylindrical wind rotor assembly 616 are substantially the same. For example, the cylindrical wind stator assembly 618 can be configured to have an outer diameter greater than a length of the cylindrical wind stator assembly along a cylindrical axis of the cylindrical wind stator assembly. In some embodiments, for example, the number of the stator wind-receiving fins 619 of the cylindrical wind stator assembly 618 can be configured to be greater than a number of the wind-deflecting blades 617 of the cylindrical wind rotor assembly 616. In some embodiments, for example, each wind-deflecting blade 617 includes a curved blade portion, and the stator wind-receiving fins 619 are slanted in orientation with respect to respective radial directions of the cylindrical wind stator assembly 618 to direct received wind towards a concave side of the curved blade portion of each wind-deflecting blade 617.

Referring to FIG. 6C, for example, the electronic inertial power generation unit 610 can be structured such that the inductor coils in the circular array of inductor coils are configured into independent inductor modules that operate independently from one module to another, in which example, each inductor module can include (1) three adjacent inductor coils that are connected to one another to form a 3-phase inductor module to so that the phases of the three adjacent inductor coils are separated by one third of a cycle to collectively produce an AC output current from three currents respectively generated by the three adjacent inductor coils, and (2) a rectifier circuit coupled to receive the AC output current and to produce a DC output voltage. For example, the rectifier circuit of an inductor module can include a three-phase diode bridge rectifier circuit formed of six diodes.

In some implementations, for example, the electronic inertial power generation unit 610 can be structured such that the inductor coils in the circular array of inductor coils are configured as independent inductor modules that operate independently from one module to another, in which each inductor module includes (1) three adjacent inductor coils that are connected to one another to form a 3-phase inductor module to so that the phases of the three adjacent inductor coils are separated by one third of a cycle to collectively produce an AC output current from three currents respectively generated by the three adjacent inductor coils, and (2) a rectifier circuit coupled to receive the AC output current and to produce a DC output voltage; and in which the inductor modules are configured as independent inductor module groups where each inductor module group includes 3 or more inductor modules, the inductor modules within each inductor module group are coupled to produce an inductor module group output, and different inductor module groups are separated and operate independently from one to another.

For example, each inductor module group can include a mode-switching circuit in a selected inductor module in the inductor module group and coupled to a rectifier circuit of the selected inductor module to inactivate the rectifier circuit to allow the selected inductor module to operate in an AC mode for producing an AC output or to activate the rectifier circuit to allow the select inductor module to operate in an DC mode for producing an DC output, and a control circuit coupled to the mode-switching circuit to control the operation the mode-switching circuit in switching the selected inductor module between the AC mode and the DC mode. For example, each inductor module group can include a sensing circuit coupled in the selected inductor module in the inductor module group that senses a rotation condition of the cylindrical wind rotor assembly based on timing and magnitudes of currents in the inductor coils within the selected inductor module and, based on the sensed rotation condition, the control circuit is configured to control the AC mode operation of the selected inductor module in response to the received wind condition to accelerate or decelerate the rotation of the cylindrical wind rotor assembly so that the rotation of the cylindrical wind rotor assembly varies dynamically with received wind condition to maximize an efficiency in converting the received wind power into electricity.

In some implementations, for example, each inductor coil can include a first half inductor coil part that includes a first magnetic core and a first conductor wire coil that winds around the first magnetic core, and a second half inductor coil part that includes a second magnetic core and a second conductor wire coil that winds around the second magnetic core, in which the first and second half inductor coil parts are positioned at opposite sides of a plane in which the magnets in the outer peripheral of the annulus ring rotor rotate to position the magnets between the first and second half inductor coil parts. In some implementations, for example, each of the first and second half inductor coil parts can include a C shaped magnetic core having two terminal ends that interface with the magnets in the outer peripheral of the annulus ring rotor, and two adjacent magnets in the outer peripheral of the annulus ring rotor are placed in opposite magnetic orientations with respect to each other. For example, the C shaped magnetic core can be configured to have the two terminal ends spaced from each other by a spacing of two adjacent magnets in the outer peripheral of the annulus ring rotor.

In some implementations, for example, the control circuit can include a digital signal processor that is programmed with software to control, based on the sensed rotation condition from the sensing circuit, the AC and DC modes of operation of the selected inductor module in the inductor module group. In some implementations, for example, the control circuit can be configured to control the inductor coils within the selected inductor module to cause the rotation of the cylindrical wind rotor assembly to be in a coasting mode which maintains a constant speed of the rotation of the cylindrical wind rotor assembly at a given received wind condition and produces a DC output of the wind power generator, a motoring mode which speeds up the rotation of the cylindrical wind rotor assembly while reducing a DC output of the wind power generator, or a generating mode which slows down the rotation of the cylindrical wind rotor assembly while increasing the a DC output of the wind power generator. In some implementations, for example, the control circuit is configured to control, based on the sensed rotation condition from the sensing circuit, the selected inductor module to operate in or switch to one of the coasting mode, the motoring mode, or the generating mode to dynamically synchronize operation of the wind power generator to the received wind condition and a load condition that draws power from the wind power generator.

In a quiet, strong, and unimposing form, the EiP wind machine 600 converts wind (e.g., rooftop wind) into stable electric power, from a single moving mass rotating inside a stationary one. Wind enters the machine 600 from all sides, and exits through the top and bottom of the hollow core 611. The electronic inertial power generation unit 610 of the EiP wind machine 600 has no central shaft or mechanical connections other than wind, only electrical and networking interfaces.

Rapidly rotating lines of magnetic flux from permanent magnets in the rotor generate electric power as they pass between stationary inductors. In some embodiments, for example, the EiP wind machine 600 can be configured to be approximately six feet in diameter, supporting eighty magnetic pole pairs (160 magnets). This exemplary embodiment represents a minimum practical size of EiP wind machine. EiP technology is scalable to much larger size and power.

Additional examples of the EiP wind machine and information pertaining to the EiP wind technology are disclosed in PCT Patent Application No. PCT/US2015/041204, entitled "DIRECT WIND ENERGY GENERATION" and filed on Jul. 20, 2015, which is incorporated by reference in its entirety as part of the disclosure in this patent document.

6. Programming Considerations

The disclosed technology can include programming of EiP machine networks, including PMLSM parameters and EiP spontaneous network data structure. An exemplary EiP program environment can include DC network and parameters, spontaneous network and cache line structure, and power web cache line, etc.

6.1. PMLSM Parameter Programming

In some implementations, EiP programming may depend on manufacturer specifications. For example, in some implementations, an exemplary EiP wave machine can use Allen Bradley Powerflex 40 3-phase motor controllers.

6.2. EiP Spontaneous Networking Data Structure

EiP spontaneous networking data structure, which is applied to networking tools and techniques for three-phase industrial motor networks, represents a cache line on the EiP spontaneous network that each EiP wave machine constantly updates with current operating data. The EiP data structure (e.g., EiP Spontaneous Networking Data Structure) can include a time stamp, machine identifier, and operating mode.

EXAMPLES

The following examples are illustrative of several embodiments of the present technology. Other exemplary embodiments of the present technology may be presented prior to the following listed examples, or after the following listed examples.

In one example of the present technology (example 1), a wave power generator device to interface to an oscillating water column for converting marine wave power into electricity includes a tube including a support base on each end of the tube; a stator assembly including a circular array of inductor coils fixed in position in a cavity of the support base, an annular ring track coupled to the support base in the cavity and configured to provide a circular track around which the circular array of inductor coils is located, and bearings placed on a circular annular bearing-ring track attached to the support base, the bearings operable to roll to allow a surface in contact with the bearings to move with respect to the annular bearing-ring track; and a rotor assembly including an annular cylinder flywheel structured to form a hollow interior and an outer cylindrical wall having a wide thickness to provide the annular cylinder flywheel with a high inertia, a turbine rotor attached to the annular cylinder flywheel at a particular plane along the hollow interior, the turbine rotor structured to include a disk and a plurality of blades protruding from the disk that pass through the outer cylinder wall of the annular cylinder flywheel into a cavity, and an array of magnets arranged to be evenly spaced and of alternating axial polarity from one another protruding from the outer cylindrical wall of the annular cylinder flywheel such that the magnets move through the circular array of inductor coils as the annular cylinder flywheel rotates with respect to the annular ring track so that the relative motion between the magnets and the inductor coils causes generation of electric currents in the inductor coils, in which the rotor assembly is engaged to the bearings on the circular annular bearing-ring track so that the annular cylinder flywheel is operable to rotate relative to the annular ring track by rolling motion of the bearings when airflow from wave energy enters the hollow interior of the rotor assembly and causes the turbine rotor to rotate for conversion of the wave energy into the electric currents in the inductor coils, and in which the tube encases the rotor assembly and the stator assembly.

Example 2 includes the wave power generator device of example 1, in which the rotor assembly is configured without a rotary shaft in the center of the rotor assembly for rotating the rotor assembly.

Example 3 includes the wave power generator device of example 1, in which the rotor assembly is configured to have a diameter of at least 1 meter.

Example 4 includes the wave power generator device of example 1, in which the hollow interior of the annular cylinder flywheel is structured to provide a path for airflow to exit the rotor assembly.

Example 5 includes the wave power generator device of example 1, in which the tube is structured to include a pipe flange structure to allow attachment of the device to the oscillating water column.

Example 6 includes the wave power generator device of example 1, in which the tube is structured to form a set of threaded holes configured to fit a standard pipe flange bolt pattern.

Example 7 includes the wave power generator device of example 1, the device further including an electronic module configured in a sealed compartment of the tube positioned proximate and electrically coupled to the circular array of inductor coils to receive the electric currents from the inductor coils.

Example 8 includes the wave power generator device of example 1, in which the rotor assembly is operable to slowly spin based on an airflow to initially drive the turbine rotor and cause the rotor assembly to rotate, such that during slow rotation of the rotor assembly magnetic flux circulates at high speed through the through the circular array of inductor coils to generate AC electric power.

Example 9 includes the wave power generator device of example 8, in which the generated AC electric power includes pure sinusoid AC power, in which voltage and frequency of the AC electric power increases with increasing speed of the rotor assembly to provide synchronous power.

Example 10 includes the wave power generator device of example 9, the device further including a plurality of electronic modules configured in a sealed compartment of the tube positioned proximate and electrically coupled to the inductor coils to receive the synchronous power, in which the electronic modules are wired together in series to provide a high voltage DC output.

Example 11 includes the wave power generator device of example 1, in which the array of magnets includes 160 magnets with 80 magnetic pole pairs.

Example 12 includes the wave power generator device of example 1, in which the inductor coils in the circular array are configured into independent inductor modules that operate independently from one module to another, in which each inductor module includes (i) three adjacent inductor coils that are connected to one another to form a 3-phase inductor module to so that the phases of the three adjacent inductor coils are separated by one third of a cycle to collectively produce an AC output current from three currents respectively generated by the three adjacent inductor coils, and (ii) a rectifier circuit coupled to receive the AC output current and to produce a DC output voltage.

Example 13 includes the wave power generator device of example 12, in which the rectifier circuit of an inductor module includes a three-phase diode bridge rectifier circuit formed of six diodes.

Example 14 includes the wave power generator device of example 1, in which the inductor coils in the circular array are configured as independent inductor modules that operate independently from one module to another, in which each inductor module includes (i) three adjacent inductor coils that are connected to one another to form a 3-phase inductor module to so that the phases of the three adjacent inductor coils are separated by one third of a cycle to collectively produce an AC output current from three currents respectively generated by the three adjacent inductor coils, and (ii) a rectifier circuit coupled to receive the AC output current and to produce a DC output voltage, and in which the inductor modules are configured as independent inductor module groups where each inductor module group includes 3 or more inductor modules, the inductor modules within each inductor module group are coupled to produce an inductor module group output, and different inductor module groups are separated and operate independently from one to another.

Example 15 includes the wave power generator device of example 14, in which each inductor module group includes a mode-switching circuit in a selected inductor module in the inductor module group and coupled to a rectifier circuit of the selected inductor module to inactivate the rectifier circuit to allow the selected inductor module to operate in an AC mode for producing an AC output or to activate the rectifier circuit to allow the select inductor module to operate in an DC mode for producing an DC output, and a control circuit coupled to the mode-switching circuit to control the operation the mode-switching circuit in switching the selected inductor module between the AC mode and the DC mode.

Example 16 includes the wave power generator device of example 15, in which each inductor module group further includes a sensing circuit coupled in the selected inductor module in the inductor module group that senses a rotation condition of the rotor assembly based on timing and magnitudes of currents in the inductor coils within the selected inductor module and, based on the sensed rotation condition, the control circuit is configured to control the AC mode operation of the selected inductor module in response to the received airflow condition to accelerate or decelerate the rotation of the rotor assembly so that the rotation of the rotor assembly varies dynamically with a received airflow condition of compressed air within the rotor assembly to maximize an efficiency in converting wave power into electricity.

Example 17 includes the wave power generator device of example 16, in which the control circuit includes a digital signal processor that is programed with software to control, based on the sensed rotation condition from the sensing circuit, the AC and DC modes of operation of the selected inductor module in the inductor module group.

Example 18 includes the wave power generator device of example 16, in which the control circuit is configured to control the inductor coils within the selected inductor module to cause the rotation of the rotor assembly to be in (i) a coasting mode which maintains a constant speed of the rotation of the rotor assembly at a given received airflow condition and produces a DC output of the wave power generator device, (ii) a motoring mode which speeds up the rotation of the rotor assembly while reducing a DC output of the wave power generator device, or (iii) a generating mode which slows down the rotation of the rotor assembly while increasing the a DC output of the wave power generator device.

Example 19 includes the wave power generator device of example 18, in which the control circuit is configured to control, based on the sensed rotation condition from the sensing circuit, the selected inductor module to operate in or switch to one of the coasting mode, the motoring mode, or the generating mode to dynamically synchronize operation of the wave power generator device to the received airflow condition and a load condition that draws power from the wave power generator device.

Example 20 includes the wave power generator device of example 1, in which each inductor coil includes a first half inductor coil part that includes a first magnetic core and a first conductor wire coil that winds around the first magnetic core and a second half inductor coil part that includes a second magnetic core and a second conductor wire coil that winds around the second magnetic core, and the first and second half inductor coil parts are positioned at opposite sides of a plane in which the magnets of the outer cylindrical wall of the annular cylinder flywheel rotate to position the magnets between the first and second half inductor coil parts.

Example 21 includes the wave power generator device of example 20, in which each of the first and second half inductor coil parts includes a C shaped magnetic core having two terminal ends that interface with the magnets of the outer cylindrical wall of the annular cylinder flywheel, and two adjacent magnets of the outer cylindrical wall of the annular cylinder flywheel are placed in opposite magnetic orientations with respect to each other.

Example 22 includes the wave power generator device of example 21, in which the C shaped magnetic core is configured to have the two terminal ends spaced from each other by a spacing of two adjacent magnets on the outer cylindrical wall of the annular cylinder flywheel.

Example 23 includes the wave power generator device of example 1, in which the array of magnets are attached on a surface of an annular ring structure protruding from the outer cylindrical wall of the annular cylinder flywheel, such that the annular ring structure extends between the annular ring track such that the magnets are aligned with the circular arrangement of the array of inductor coils.

Example 24 includes the wave power generator device of example 1, in which the outer cylinder wall of the annular cylinder flywheel includes two thick-walled cylinders made of a high density material.

Example 25 includes the wave power generator device of example 1, in which the support base includes an opening on each side of the tube, and the device further includes a detachable cover to allow access to the interior of the device and to provide a watertight seal of the tube.

In one example of the present technology (example 26), a wave power generator device includes a tube frame including a hollow interior and a first support base and a second support base on each end of the tube frame, in which the first and second support bases are arranged to form a cavity along the peripheral of the tube frame; an array of inductor coils positioned at in the cavity for each of the first and second support bases; a plurality of bearings coupled to each of the first and second support base operable to roll to allow a surface in contact with the bearings to move with respect to the inductor coils; an annular flywheel structured to include an outer cylindrical wall adjacent to the first and second support bases, the outer cylinder wall having a wide thickness to provide the annular flywheel with a high inertia; a turbine rotor attached to the annular flywheel at a particular plane of the hollow interior, the turbine rotor structured to include a disk and a plurality of blades protruding from the disk, in which the turbine rotor is coupled to the outer cylinder wall of the annular flywheel; and an array of magnets arranged to be evenly spaced and of alternating axial polarity from one another, the array of magnets coupled to and protruding from the outer cylinder wall of the annular flywheel and located in the cavity of each of the first and second support bases in a gap between the inductor coils, in which rotation of the annular flywheel causes the magnets to move through gap between the inductor coils such that the relative motion between the magnets and the inductor coils causes generation of electric currents in the inductor coils, in which the wave power generator device is structured to be interfaced with an oscillating water column, such that airflow expelled from the oscillating water column caused from wave energy is able to enter the hollow interior of the wave power generation device and affect rotation of the turbine rotor for conversion of the wave energy into the electric currents in the inductor coils.

Example 27 includes the wave power generator device of example 26, in which the tube frame includes a bearing-ring track attached to the first and second support bases and coupled to the bearings to present the bearings such that they rotationally engage the surface of the outer wall of the annular flywheel.

Example 28 includes the wave power generator device of example 26, in which the generation of the electric currents in the in the inductor coils of the wave power generator is based on rotation of the annular flywheel on the bearings at least initially caused by oscillating airflow into and out of the hollow interior to initiate rotation of the turbine rotor in one direction, such that electric currents are produced based on the interaction of magnetic fields from the magnets with the inductor coils during the rotation of the annular flywheel.

Example 29 includes the wave power generator device of example 26, in which the wave power generation device is interfaced with an oscillating water column that is operable to receive water waves to produce outward airflow from the oscillating water column as a result of the received water waves, such that the outward airflow is fed into the wave power generation device to affect the rotation of the turbine rotor for conversion of the wave energy into the electric currents in the inductor coils.

Example 30 includes the wave power generator device of example 26, in which the wave power generator device is configured without a rotary shaft in the center of the hollow interior or attached to the turbine rotor for rotating the turbine rotor.

Example 31 includes the wave power generator device of example 26, in which the hollow interior is structured to provide a path for the airflow to enter and exit the wave power generator device.

Example 32 includes the wave power generator device of example 26, in which the tube frame is structured to include a pipe flange structure to allow attachment of the wave power generator device to an oscillating water column.

Example 33 includes the wave power generator device of example 26, in which the tube frame is structured to form a set of threaded holes configured to fit a standard pipe flange bolt pattern to attach the wave power generation device to the oscillating water column.

Example 34 includes the wave power generator device of example 26, the device further including an electronic module configured in a sealed compartment of the first and second support bases positioned proximate and electrically coupled to the array of inductor coils to receive the electric currents from the inductor coils.

Example 35 includes the wave power generator device of example 26, in which the annular flywheel is operable to slowly spin based on the airflow to initially drive the turbine rotor and cause the annular flywheel to rotate, such that during slow rotation of the annular flywheel magnetic flux circulates at high speed through the through the array of inductor coils to generate AC electric power.

Example 36 includes the wave power generator device of example 35, in which the generated AC electric power includes pure sinusoid AC power, in which voltage and frequency of the AC electric power increases with increasing speed of the rotor assembly to provide synchronous power.

Example 37 includes the wave power generator device of example 36, the device further including a plurality of electronic modules configured in a sealed compartment of the of the first and second support bases positioned proximate and electrically coupled to the inductor coils to receive the synchronous power, in which the electronic modules are wired together in series to provide a high voltage DC output.

In one example of the present technology (example 38), a method for generating electricity from water wave energy includes receiving water waves into an oscillating water column to produce an outward airflow from the oscillating water column as a result of the received water waves; receiving the outward airflow into an interior of a wave power generator device to affect rotation of a rotator assembly in the wave power generator device, the device including a stator assembly and the rotor assembly encased within a tube structure having a base frame at each end of the tube structure, the stator assembly including a circular array of inductor coils in a fixed position with respect to the base frame in the cavity and a plurality of bearings coupled to the base frame, and the rotor assembly including a turbine rotor having a central hub and peripheral blades coupled to an annular flywheel that is engaged with the bearings and an array of magnets arranged to be evenly spaced and of alternating axial polarity from one another protruding outwardly from the annular flywheel and between the circular array of inductor coils; and generating electrical power at the wave power generator device based on rotation of the annular flywheel on the bearings at least initially caused by oscillating airflow into and out of the interior of the rotor assembly to initiate rotation of the turbine rotor in one direction, such that electric currents are produced based on the interaction of magnetic fields from the magnets with the inductor coils during the rotation of the annular flywheel, in which the rotation steadily continues in absence of or reduced wave energy from the water waves.

Example 39 includes the method of example 38, in which the receiving the water waves by the oscillating water column includes receiving successive waves create an oscillating air flow into and out of the wave power generator device while the rotor assembly continues the rotation in a constant direction and at a regulated speed fortified by the annular flywheel's inertia and electronic interactions to generate a steady electrical power output.

Example 40 includes the method of example 38, further including transferring the generated electrical power to a power aggregation point of a power network, a power storage device, or a power consuming device.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the embodiments and implementations described in the specification, together with the drawings, be considered exemplary, where exemplary means an example. As used herein, the singular forms "a", "an" and "the" are intended to include the plural forms as well, unless the context clearly indicates otherwise. Additionally, the use of "or" may include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A wave power generator device, comprising:
   a frame including a support base and an opening to an interior of the frame, the frame operable to receive an airflow through the opening, wherein the airflow received in the frame is caused by a water wave;
   a stator assembly including an array of inductor coils fixed in position with respect to the support base, and a plurality of bearings operable to roll to allow an object in contact to move with respect to the array of inductor coils; and
   a rotor assembly including a flywheel having a hollow interior and an outer wall to provide the flywheel with a high inertia, a turbine rotor attached to the flywheel and including a disk and a plurality of blades protruding from the disk, and an array of magnets arranged on the outer wall of the flywheel to be of alternating axial polarity from one another such that the magnets move with respect to the inductor coils as the flywheel rotates with respect to the stator assembly, such that the relative motion between the magnets and the inductor coils causes generation of electric currents in the inductor coils, wherein the rotor assembly does not include a rotary shaft in a center of the disk,
   wherein the rotor assembly is engaged with the bearings of the stator assembly such that the flywheel is operable to rotate by rolling of the bearings when the received airflow enters the hollow interior of the rotor assembly and causes the turbine rotor to rotate for conversion of the wave energy into the electric currents in the inductor coils.

2. The wave power generator device of claim 1, wherein the rotor assembly is configured to have a diameter of at least 1 meter.

3. The wave power generator device of claim 1, wherein the hollow interior of the flywheel is structured to provide a path for the airflow to exit the rotor assembly.

4. The wave power generator device of claim 1, wherein the device is attached to a water column that receives the water wave to cause the airflow.

5. The wave power generator device of claim 1, wherein the frame includes a set of threaded holes along an outer surface of the support base to fit a standard pipe flange bolt pattern.

6. The wave power generator device of claim 1, wherein the support base includes openings on two opposing sides of the frame leading to the interior of the frame, and wherein the device further comprises a detachable cover for covering the openings and provide a watertight seal of the frame.

7. The wave power generator device of claim 1, further comprising:
   an electronic module electrically coupled to the array of inductor coils to receive the electric currents from the inductor coils.

8. The wave power generator device of claim 1, wherein the rotor assembly is operable to slowly spin based on an initial airflow to initially drive the turbine rotor and cause the rotor assembly to rotate, such that, during slow rotation of the rotor assembly, magnetic flux circulates at high speed through the through the array of inductor coils to generate AC electric power.

9. The wave power generator device of claim 8, wherein the generated AC electric power includes pure sinusoid AC power, wherein voltage and frequency of the AC electric power increases with increasing speed of the rotor assembly to provide synchronous power.

10. The wave power generator device of claim 9, the device further comprising:
    a plurality of electronic modules electrically coupled to the inductor coils to receive the synchronous power, wherein the electronic modules are wired together in series to provide a high voltage DC output.

11. The wave power generator device of claim 1, wherein the inductor coils are configured in independent inductor modules that operate independently from one module to another,
    wherein each inductor module includes (i) three adjacent inductor coils that are connected to one another to form a three-phase inductor module so that the phases of the three adjacent inductor coils are separated by one third of a cycle to collectively produce an AC output current from three currents respectively generated by the three adjacent inductor coils, and (ii) a rectifier circuit coupled to receive the AC output current and to produce a DC output voltage.

12. The wave power generator device of claim 11, wherein the independent inductor modules are configured as independent inductor module groups where each inductor module group includes three or more inductor modules, the inductor modules within each inductor module group are coupled to produce an inductor module group output, and different inductor module groups are separated and operate independently from one to another.

13. The wave power generator device of claim 12, wherein each inductor module group includes:
    a mode-switching circuit in a selected inductor module in the inductor module group and coupled to the rectifier circuit of the selected inductor module to inactivate the rectifier circuit to allow the selected inductor module to operate in an AC mode for producing an AC output or to activate the rectifier circuit to allow the select inductor module to operate in a DC mode for producing a DC output, and
    a control circuit coupled to the mode-switching circuit to control operation of the mode-switching circuit in switching the selected inductor module between the AC mode and the DC mode.

14. The wave power generator device of claim 13, wherein each inductor module group further includes:
    a sensing circuit coupled in the selected inductor module in the inductor module group to sense a rotation condition of the rotor assembly based on timing and magnitudes of currents in the inductor coils within the selected inductor module, and, based on the sensed rotation condition, the control circuit is configured to control an AC mode operation of the selected inductor module in response to a received airflow condition to accelerate or decelerate the rotation of the rotor assembly so that the rotation of the rotor assembly varies dynamically with an airflow condition of compressed air within the rotor assembly to maximize an efficiency in converting wave power into electricity.

15. The wave power generator device of claim 14, wherein the control circuit includes a digital signal processor that is programmed with software to control, based on the sensed rotation condition from the sensing circuit, the AC and DC modes of operation of the selected inductor module in the inductor module group.

16. The wave power generator device of claim 14, wherein the control circuit is configured to control the inductor coils within the selected inductor module to cause the rotation of the rotor assembly to be in (i) a coasting mode which maintains a constant speed of the rotation of the rotor assembly at a certain airflow condition or range of airflow conditions and produces a DC output of the wave power generator device, (ii) a motoring mode which speeds up the rotation of the rotor assembly while reducing a DC output of the wave power generator device, or (iii) a generating mode which slows down the rotation of the rotor assembly while increasing the DC output of the wave power generator device.

17. The wave power generator device of claim 16, wherein the control circuit is configured to control, based on the sensed rotation condition from the sensing circuit, the selected inductor module to operate in or switch to one of the coasting mode, the motoring mode, or the generating mode to dynamically synchronize operation of the wave power generator device to an airflow condition and a load condition that draws power from the wave power generator device.

18. The wave power generator device of claim 1, wherein each inductor coil includes a first half inductor coil part that includes a first magnetic core and a first conductor wire coil that winds around the first magnetic core, and a second half inductor coil part that includes a second magnetic core and a second conductor wire coil that winds around the second magnetic core, wherein the first and second half inductor coil parts are positioned at opposite sides of a plane in which the magnets of the outer wall of the flywheel rotate to position the magnets between the first and second half inductor coil parts.

19. The wave power generator device of claim 18, wherein each of the first and second half inductor coil parts includes a C-shaped magnetic core having two terminal ends that interface with the magnets of the outer wall of the flywheel, and two adjacent magnets of the outer wall of the flywheel are placed in opposite magnetic orientations with respect to each other.

20. The wave power generator device of claim 19, wherein the C-shaped magnetic core is configured to have the two terminal ends spaced from each other by a spacing of two adjacent magnets on the outer wall of the flywheel.

21. The wave power generator device of claim 1, wherein the outer wall of the flywheel includes two or more walls.

22. The wave power generator device of claim 21, wherein at least one of the two or more walls of the outer wall includes a thickness of at least ½ inch.

23. The wave power generator device of claim 1, wherein the outer wall of the flywheel includes a high-density material comprising one or more of a stainless steel, aluminum, an epoxy resin, or concrete.

24. The wave power generator device of claim 1, wherein the generation of the electric currents in the inductor coils is based on rotation of the flywheel engaged with the bearings at least initially caused by the received airflow in the rotor assembly to initiate rotation of the turbine rotor in one direction, such that flywheel is operable to rotate without continuous airflow caused by waves so that the electric currents are produced based on the interaction of magnetic fields from the magnets with the inductor coils during the rotation of the flywheel including during absence of airflow.

25. The wave power generator device of claim 24, wherein the rotor assembly is operable to continue a rotation in a constant direction at a regulated speed fortified by the flywheel's inertia and by electronic control to generate a steady electrical power output.

26. The wave power generator device of claim 1, wherein the wave power generator device is interfaced with a power network, a power storage device, or a power consuming device to transfer the generated electrical power to a power aggregation point of the power network, the power storage device, or the power consuming device.

* * * * *

UNITED STATES PATENT AND TRADEMARK OFFICE
CERTIFICATE OF CORRECTION

Page 1 of 2

PATENT NO. : 10,851,759 B2
APPLICATION NO. : 16/684909
DATED : December 1, 2020
INVENTOR(S) : Steve Burkle It is certified that error appears in the above-identified patent and that said Letters Patent is hereby corrected as shown below:

In the Specification

In Column 20, Line 8, delete "c" and insert -- $\varepsilon$ --, therefor.

In Column 20, Line 10, delete "E" and insert -- $\varepsilon$ --, therefor.

In Column 20, Line 11, delete "while" and insert -- while $\varepsilon$ --, therefor.

In Column 20, Line 34, delete "$T=(3-2 \log 2)\varepsilon + \eta(\varepsilon^{-1/3})$" and insert -- $T = (3 - 2 \log 2) \varepsilon + \eta (\varepsilon^{-1/3})$ --, therefor.

In Column 20, Line 46, delete "£)," and insert -- $\varepsilon$), --, therefor.

In Column 23, Line 44, delete "$KE_R = 1/2 I_R \omega^2$" and insert -- $KE_R = 1/2\ I_R\ \omega^2$ --, therefor.

In Column 23, Line 55, delete "$I_R = 1/2m(r_1^g + r_1^2)$" and insert -- $I_R = 1/2m(r_1^2 + r_1^2)$ --, therefor.

In Column 25, Lines 12-16, delete "
$$u_d(t) = R_{id} + d\psi_d/dt - \omega\psi_q$$
$$u_q(t) = Ri_q + d\psi_q/dt - \psi_d$$
$$P_{in} = 3/2(u_d i_d + u_d i_d)$$
" and insert
$$u_d(t) = Ri_d + d\psi_d/dt - \omega\psi_q$$
$$u_q(t) = Ri_q + d\psi_q/dt - \omega\psi_d$$
$$P_{in} = 3/2\ (u_d i_d + u_d i_d)$$
--, therefor.

Signed and Sealed this
Second Day of March, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,851,759 B2

In Column 25, Line 67, delete "to is" and insert -- $\omega$ is --, therefor.

$$Å = T_{Rotor}/\rho\omega^2 r^5$$

In Column 26, Lines 1-3, delete "$\eta = T_{Rotor}\omega/\Delta p Q$" and insert -- $\Pi = T_{Rotor} / \rho \omega^2 r^5$ $\eta = T_{Rotor} \omega / \Delta p Q$ --, therefor.